(12) United States Patent
Mineyama

(10) Patent No.: US 7,143,429 B2
(45) Date of Patent: Nov. 28, 2006

(54) PROGRAM INFORMATION PROVIDING APPARATUS AND METHOD, PROGRAM RECORDING PRESET SYSTEM AND METHOD, AND PROGRAM RECORDING SYSTEM AND METHOD

(75) Inventor: Toru Mineyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 1159 days.

(21) Appl. No.: 09/872,239

(22) Filed: Jun. 1, 2001

(65) Prior Publication Data

US 2002/0042916 A1 Apr. 11, 2002

(30) Foreign Application Priority Data

Jun. 2, 2000 (JP) ............................. 2000-166735

(51) Int. Cl.
*G06F 3/00* (2006.01)
*G06F 13/00* (2006.01)
*H04N 5/445* (2006.01)

(52) U.S. Cl. ..................... 725/58; 725/112; 725/133
(58) Field of Classification Search ................. 725/58, 725/80, 133, 112
See application file for complete search history.

(56) References Cited

U.S. PATENT DOCUMENTS

| 5,988,078 | A | * | 11/1999 | Levine | 715/721 |
| 5,990,927 | A | * | 11/1999 | Hendricks et al. | 725/132 |
| 6,047,327 | A | * | 4/2000 | Tso et al. | 709/232 |
| 6,437,836 | B1 | * | 8/2002 | Huang et al. | 348/734 |
| 6,526,577 | B1 | * | 2/2003 | Knudson et al. | 725/40 |
| 6,618,858 | B1 | * | 9/2003 | Gautier | 725/132 |
| 6,925,567 | B1 | * | 8/2005 | Hirata | 713/189 |
| 2002/0032907 | A1 | * | 3/2002 | Daniels | 725/51 |
| 2002/0046407 | A1 | * | 4/2002 | Franco | 725/110 |
| 2005/0028208 | A1 | * | 2/2005 | Ellis et al. | 725/58 |
| 2005/0204388 | A1 | * | 9/2005 | Knudson et al. | 725/58 |

* cited by examiner

*Primary Examiner*—Vivek Srivastava
*Assistant Examiner*—Farzana E. Hossain
(74) *Attorney, Agent, or Firm*—Finnegan, Henderson, Farabow, Garrett & Dunner, L.L.P.

(57) ABSTRACT

The invention is intended to facilitate the recording presetting of programs from a remote site. A program information providing apparatus having a storage section for storing program information, which is attribute information about a program, and a program chart, the program information and the program chart being sent via a network in response to a request from a portable terminal apparatus, the program information providing apparatus comprising: a search section for searching the storage section for the program information in response to a program recording preset request from the portable terminal apparatus to which the program table has been sent; a program recording preset script generating section for generating a program recording preset script, which is a control command for causing a recording apparatus to record a user-specified program listed in the program chart to a recording medium, and a sending section for sending the generated script.

196 Claims, 40 Drawing Sheets

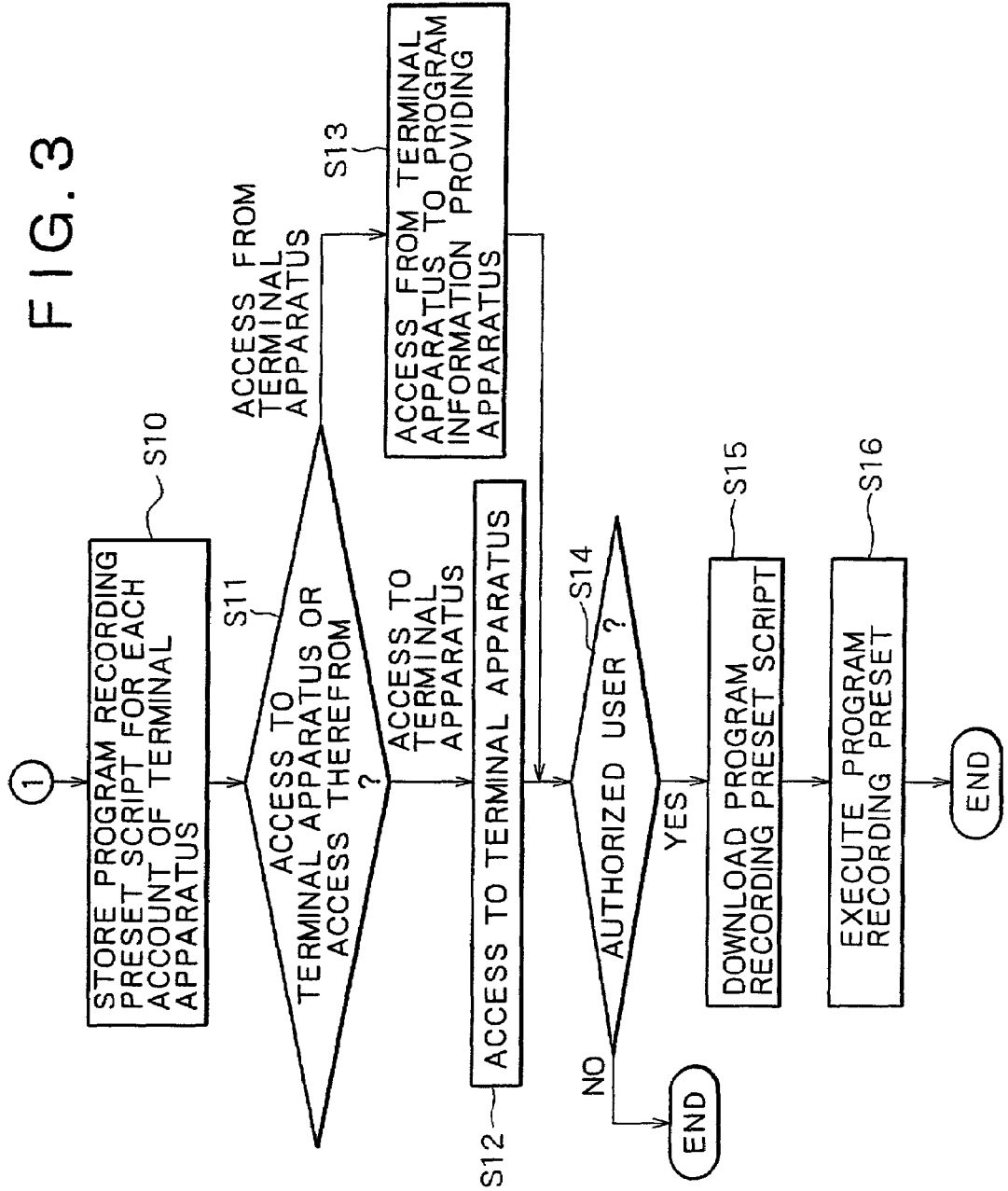

FIG. 4

| | 20:00 | | 21:00 | | 22:00 | |
|---|---|---|---|---|---|---|
| AAA GENERAL CH1 | 0 PROFESSIONAL WRESTLING [PRESET] | | 0 FRIDAY DRAMA [PRESET] | | 0 LA2 Next Week [PRESET] | |
| BBB EDUCATION CH2 | 0 FEATURE PROGRAM | | 0 FOREIGN FILM [PRESET] | | | |
| CCC TV CH3 | 0 MUSIC [PRESET] | 30 HOBBY [PRESET] | 0 GREAT NATURE [PRESET] | | 0 BOWLING [PRESET] | 30 CUTE ANGEL KENT [PRESET] |
| DDD TV CH4 | 0 QUIZ SHOW [PRESET] | | 0 THEATER [PRESET] | | | |
| EEE TV CH5 | 0 NEWS [PRESET] | 30 OLYMPIC GAMES [PRESET] | 0 WORLD SOCCER [PRESET] | | 0 (FRENCH MOVIE UNTIL 24:00) [PRESET] | |
| FFF TV CH6 | 0 FISHING [PRESET] | 30 NEWS&SPORTS [PRESET] | 0 RUINS EXPLORATION [PRESET] | | 0 OVERSEAS TRAVEL INFORMATION [PRESET] | |
| GGG TV CH7 | 0 JAPANESE FILM [PRESET] | | | | 0 USE DIGITAL VIDEO NEWS 100% [PRESET] | [PRESET] |
| HHH TV CH8 | 0 COUNT DOWN [PRESET] | | 0 FEATURING NEW CARS | | 0 22:00 DRAMA [PRESET] | |
| III TV CH9 | 0 NEWS/STOCK PRICES [PRESET] | 30 SCIENCE [PRESET] | 0 THEATER [PRESET] | | 0 YESTERDAY'S NEWS [PRESET] | |
| JJJ TV CH10 | 0 CHALLENGE [PRESET] | | 0 SWORD OF ○○ [PRESET] | 30 ××2/4 [PRESET] | 0 NYOO [PRESET] | |

FIG. 5

```
FILE(F) EDIT(E) VIEW(V) GO(G) COMMUNICATOR(C) HELP(H)

BACK   NEXT   RELOAD   HOME   SEARCH   GUIDE   PRINT

BOOKMARK  LOCATION: [            ]                    LINKS

DEAR CUSTOMER,
    station:EEE TV
    year:2000
    month:09
    date:01
    start:21:00
    end:22:00
    program-title:WORLD SOCCER
    program-subtitle:JAPAN Vs. GERMANY
    Infrd:3
    device id:1
THIS PROGRAM HAS BEEN NORMALLY RECORDED.

[DEVICE CHANGE]    [CONFIRM PRESET]

DOCUMENT:COMPLETED
```

FIG. 6

| | | | | |
|---|---|---|---|---|
| FILE(F) EDIT(E) VIEW(V) GO(G) COMMUNICATOR(C) HELP(H) | | | | |

BACK  NEXT  RELOAD  HOME  SEARCH  GUIDE  PRINT  SECURITY  STOP

BOOKMARK  LOCATION: [          ]  ▽ ○ LINKS

THE FOLLOWING DEVICES ARE AVAILABLE FOR
THE PROGRAM RECORDING PRESET BY YOU:

| DEVICE ID | DEVICE TYPE | MAKER | MODEL | DEFAULT |
|---|---|---|---|---|
| 1 | DV | ○△□× | S△D-D01 | ◎ |
| 2 | VTR | ○△□× | D◯R-1000 | |
| 3 | DVD | ○△□× | D□P-F11 | |

DO YOU WANT THIS DEVICE TO REGISTER AS DEFAULT ?

[YES]   [NO]

FIG. 8

```
FILE(F) EDIT(E) VIEW(V) GO(G) COMMUNICATOR(C) HELP(H)
  BACK  NEXT  RELOAD  HOME  SEARCH  GUIDE  PRINT  SECURITY  STOP
BOOKMARK  LOCATION:                                          LINKS

YOU CURRENTLY PRESET THE FOLLOWING
ITEMS FOR PROGRAM RECORDING:

CHANNEL   START TIME             END TIME              TITLE
CH3       2000/09/01 22:30:00    2000/09/01 23:00:00   CUTE ANGEL KENT
CH5       2000/09/01 20:00:00    2000/09/01 20:30:00   NEWS
CH9       2000/09/01 20:30:00    2000/09/01 21:00:00   SCIENCE
CH5       2000/09/01 21:00:00    2000/09/01 22:00:00   WORLD SOCCER

DELETE    BACK

DOCUMENT: COMPLETED
```

FIG. 14

FILE(F) EDIT(E) MAIL BOX(X) MESSAGE(M) REMOVE(R) SPECIAL(S) TOOL(T) WINDOW(W) HELP(H)

To:
From:
subject: Program Infomation
Cc:
Bcc:
Attached:

YOU HAVE PRESET THE ITEMS BELOW FOR RECORDING.
TO CHANGE THE RECORDING DEVICE, CLICK THE CORRESPONDING ADDRESS.

| CHANNEL | START TIME | END TIME | | TITLE |
|---|---|---|---|---|
| CH3 | 2000/09/01 22:30:00 | 2000/09/01 23:00:00 | | CUTE ANGEL KENT |
| | http://www.○○.com/MyMail/DevChange/DevChange_1234_3_20000901223000200009012230000.rev | | | |
| CH5 | 2000/09/01 20:00:00 | 2000/09/01 20:30:00 | | NEWS |
| | http://www.○○.com/MyMail/DevChange/DevChange_1234_5_20000901200000200009012030000.rev | | | |
| CH9 | 2000/09/01 20:30:00 | 2000/09/01 21:00:00 | | SCIENCE |
| | http://www.○○.com/MyMail/DevChange/DevChange_1234_9_20000901203000200009012100000.rev | | | |
| CH5 | 2000/09/01 21:00:00 | 2000/09/01 22:00:00 | | WORLD SOCCER |
| | http://www.○○.com/MyMail/DevChange/DevChange_1234_5_20000901210000200009012200000.rev | | | |

PRESS F1 KEY TO DISPLAY HELP.

FIG.21

INTERNET ENTERTAINMENT RomPass IS HERE
→
https://www.rompass.com/imode/remote/index.html?LoginID=1234567

Visit MAIL

NORMAL PROGRAM CHART
(FOR STATION SELECTION)

FIG. 36

```
<infra> INFRA INFORMATION (GROUND WAVE, SKY PERFEC TV, BS-D, ETC.) </infra>
<station> STATION NAME </station>
<year> BROADCAST YEAR </year>
<month> BROADCAST MONTH </month>
<date> BROADCAST DATE </date>
<start> BROADCAST START TIME </start>
<end> BROADCAST END TIME </end>
<title> PROGRAM TITLE </title>
<explanation> PROGRAM EXPLANATION </explanation>
<info> OTHER INFORMATION </info>
<command> OPERATION COMMAND </command>
<version> Access Protocol Version INFORMATION </version>
```

```
<GPOperation>
    <TV Program>
    <infra>**</infra>
    <station>**</station>

</TVProgram>

<TVProgram>

</TVProgram>
</GPOperation>
```

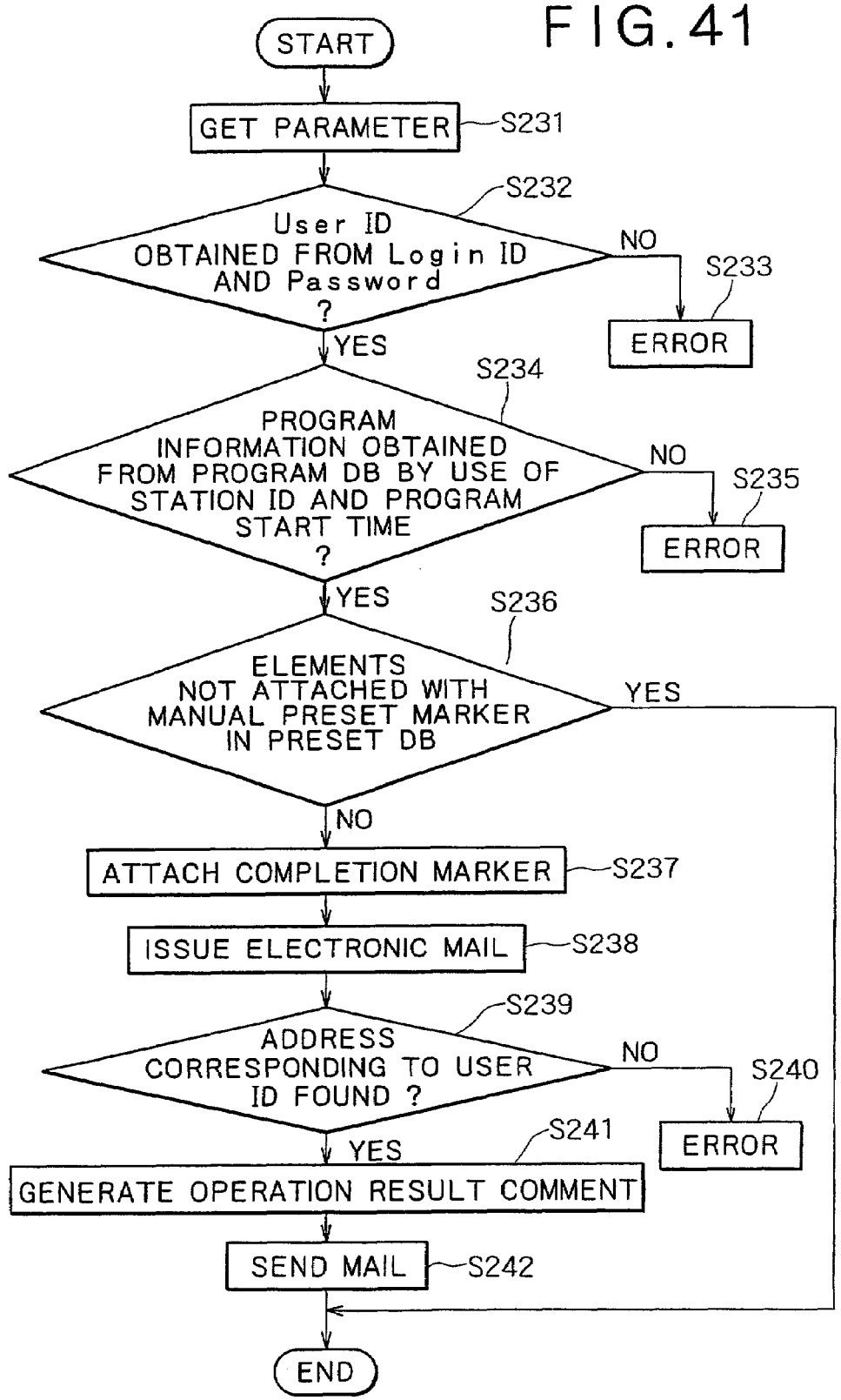

PROGRAM INFORMATION PROVIDING APPARATUS AND METHOD, PROGRAM RECORDING PRESET SYSTEM AND METHOD, AND PROGRAM RECORDING SYSTEM AND METHOD

BACKGROUND OF THE INVENTION

The present invention relates generally to a program information providing apparatus and method, a program recording preset system and method, and a program recording system and method which are suitably for use in presetting the recording of programs on a recording apparatus at a remote site from a portable terminal apparatus connected thereto via a network.

Techniques that program recording preset is performed on a program recording apparatus for recording broadcast programs on a recording medium via a telephone circuit so that the recording is started at preset timing, are known.

The program recording apparatus on which the recording preset of programs can be made at a remote site has an interface for connecting the program recording apparatus to a telephone line and a signal conversion processing section for converting a program select signal inputted from a telephone into a signal for controlling the recording preset by this program recording apparatus. For presetting program recording, a user telephones to the program recording apparatus to send input items for program recording preset such as additional information including program channel number, program start and end times, and recording mode to the program recording apparatus as a number select signal of the telephone by pressing pushbutton. The interface of the program recording apparatus receives the number select signal. The signal conversion processing section converts the received number select signal into a program recording preset control signal, thereby presetting program recording.

A technique is also known in which the preset for program recording is inputted for causing a PC (Personal Computer) having a receiver for receiving programs and a HDD (Hard Disk Drive) for recording received programs to record program from a portable terminal apparatus including a portable PC or a PDA (Personal Digital Assistant) via a network such as the Internet. First, a user establishes an Internet session between a portable terminal apparatus including a portable PC or a PDA and a portable PC at a remote site. Through this session, the controller of the portable PC or PDA causes a Web browser installed therein to display an input screen which prompts the user to enter predetermined input items necessary for program recording preset. The user enters the input items including the information about a program to be recorded from that portable terminal apparatus.

However, the above-mentioned known technique of presetting program recording on a program recording apparatus from a telephone requires a dedicated recording apparatus equipped with a signal conversion apparatus for converting a number select signal of a telephone into a program recording preset control signal. Besides, using pushbutton for entering such information for presetting program recording as program channel number, program start and end times, and recording mode is significantly bothersome and time consuming.

Also, presetting program recording on a PC at a remote site from a portable PC or a PDA requires the user to enter information about a program to be recorded from the portable PC or the PDA, thereby presenting a problem of significantly bothersome and time-consuming entry operations.

SUMMARY OF THE INVENTION

It is therefore an object of the present invention to provide a program information providing apparatus and method, a program recording preset system and method, and a program recording system and method which facilitate simple operations for presetting program recording at a remote site.

To achieve the above object, according to a first aspect of the present invention, there is provided a program information providing apparatus having storage means for storing program information, which is attribute information about a program, and a program chart, the program information and the program chart being sent to a first terminal apparatus in response to a request from the first terminal apparatus for sending the program information and the program chart via a network, the program information providing apparatus comprising: searching means for searching the storage means for the program information in response to a program recording preset request from the first terminal apparatus to which the program chart has been sent; program recording preset script generating means for generating, on the basis of the program information retrieved by the searching means, a program recording preset script, which is a control command for controlling a recording apparatus to record a specified program listed in the program chart to a recording medium; and sending means for sending the program recording preset script generated by the program recording preset script generating means to a second terminal apparatus.

According to a second aspect of the present invention, there is provided a program information providing method for storing in storage means program information, which is attribute information about a program, and a program chart and, in response to a request from a first terminal apparatus, sending the program information and the program chart to the first terminal apparatus via a network, the program information providing method comprising the steps of: searching the storage means for the program information in response to a program recording preset request from the first terminal apparatus to which the program chart has been sent; generating, on the basis of the program information retrieved in the searching step, a program recording preset script, which is a control command for controlling a recording apparatus to record a specified program listed in the program chart to a recording medium; and sending the program recording preset script generated in the program recording preset script generating step to a second terminal apparatus.

According to a third aspect of the present invention, there is provided a program recording preset system comprising a first terminal apparatus for requesting to send program information, which is attribute information about a program, and a program chart, a program information providing apparatus having storage means for storing the program information and the program chart and sending the program information and the program chart to the first terminal apparatus upon request therefrom, and a second terminal apparatus for presetting recording of a specified program listed in the program chart sent to the first terminal apparatus, the first terminal apparatus, the program information providing apparatus, and the second terminal apparatus being interconnected by a network, wherein: the first terminal apparatus includes: display means for displaying the received program information and program chart; input means for inputting a program recording preset request; and first sending means for sending the program recording preset request inputted through the input means; the program information providing apparatus includes: first receiving means for receiving the program recording preset request from the first terminal apparatus; searching means for searching, in response to the program recording preset request received by the first receiving means, the storage means for the program information; second sending means for sending the program information retrieved by the searching means to the first terminal apparatus; program recording preset script generating means for generating, on the basis of the program information retrieved by the searching means, a program recording preset script, which is a control command for recording the program listed in the program chart to a recording medium; and third sending means for sending the program recording preset script generated by the program recording preset script generating means; and the second terminal apparatus includes: second receiving means for receiving the program recording preset script supplied from the third sending means of the program information providing apparatus; and signal converting means for converting the program recording preset script received by the second receiving means into a program recording preset control signal.

According to a fourth aspect of the present invention, there is provided a program recording preset method for a program recording preset system having a first terminal apparatus for requesting to send program information, which is attribute information about a program, and a program chart, a program information providing apparatus having storage means for storing the program information and the program chart and sending the program information and the program chart to the first terminal apparatus upon request therefrom, and a second terminal apparatus for presetting recording of a specified program listed in the program chart sent to the first terminal apparatus, the first terminal apparatus, the program information providing apparatus, and the second terminal apparatus being interconnected by a network: the program recording preset method in the first terminal apparatus comprising the steps of; displaying the received program chart, inputting a program recording preset request for a program shown in the program chart, and sending the inputted program recording preset request to the program information providing apparatus; the program recording preset method in the program information providing apparatus comprising the steps of; receiving the program recording preset request from the first terminal apparatus, searching, in response to the received program recording preset request, the storage means for the program information, sending the retrieved program information to the first terminal apparatus, generating, on the basis of the retrieved program information, a program recording preset script, which is a control command for recording the program listed in the program chart to a recording medium by recording means, and sending the generated program recording preset script; and the program recording preset method in the second terminal apparatus comprising the steps of: receiving the program recording preset script sent from the program information providing apparatus, and converting the received program recording preset script into a program recording preset control signal.

According to a fifth aspect of the present invention, there is provided a program recording system comprising a first terminal apparatus for requesting to send program information, which is attribute information about a program, and a program chart, a program information providing apparatus having storage means for storing the program information and the program chart and sending the program information and the program chart to the first terminal apparatus upon request therefrom, a second terminal apparatus for presetting recording of a specified program listed in the program chart sent to the first terminal apparatus, and a recording apparatus for recording the program to a recording medium in response to the program recording preset to the second terminal apparatus, the first terminal apparatus, the program information providing apparatus, the second terminal apparatus, and the recording apparatus being interconnected by a network, wherein: the first terminal apparatus includes: display means for displaying the received program information and program chart; input means for inputting a program recording preset request; and first sending means for sending the program recording preset request inputted through the input means; the program information providing apparatus includes: first receiving means for receiving the program recording preset request from the first terminal apparatus; searching means for searching, in response to the program recording preset request received by the first receiving means, the storage means for the program information; second sending means for sending the program information retrieved by the searching means to the first terminal apparatus; program recording preset script generating means for generating, on the basis of the program information retrieved by the searching means, a program recording preset script, which is a control command for recording the program listed in the program chart to a recording medium; and third sending means for sending the program recording preset script generated by the program recording preset script generating means; the second terminal apparatus includes: second receiving means for receiving the program recording preset script supplied from the third sending means of the program information providing apparatus; signal converting means for converting the program recording preset script received by the second receiving means into a program recording preset control signal; and fourth sending means for sending the program recording preset control signal converted by the signal converting means; and the recording apparatus includes: third receiving means for receiving the program recording preset control signal sent from the third sending means of the second terminal apparatus; fourth receiving means for receiving the program listed in the program chart, recording means for recording the program received by the fourth receiving means to the recording medium; and control means for drivingly controlling, in response to the program recording preset control signal received by the third receiving means, the recording means to record the program received by the fourth receiving means to the recording medium.

According to a sixth aspect of the present invention, there is provided a program recording method for a program recording system having a first terminal apparatus for requesting to send program information, which is attribute information about a program, and a program chart, a program information providing apparatus having storage means for storing the program information and the program chart and sending the program information and the program chart to the first terminal apparatus upon request therefrom, a second terminal apparatus for presetting recording of a specified program listed in the program chart sent to the first terminal apparatus, and a recording apparatus for recording the program to a recording medium in response to the program recording preset to the second terminal apparatus, the first terminal apparatus, the program information providing apparatus, the second terminal apparatus, and the recording apparatus being interconnected by a network: the program recording method in the first terminal apparatus comprising the steps of: displaying the received program chart; inputting a program recording preset request for a program shown in the program chart; and sending the inputted program recording preset request to the program information providing apparatus; the program recording method in the program information providing apparatus comprising the steps of: receiving the program recording preset request from the first terminal apparatus; searching, in response to the received program recording preset request, the storage means for the program information; sending the retrieved program information to the first terminal apparatus; generating, on the basis of the retrieved program information, a program recording preset script, which is a control command for recording the program listed in the program chart to a recording medium; and sending the generated program recording preset script; the program recording method in the second terminal apparatus comprising the steps of: receiving the program recording preset script supplied from the program information providing apparatus; converting the received program recording preset script into a program recording preset control signal; and sending the converted program recording preset control signal; and the program recording method in the recording apparatus comprising the steps of: receiving the program recording preset control signal sent from the second terminal apparatus; receiving the program listed in the program chart; and recording the received program to the recording medium, in response to the program recording preset control signal.

According to a seventh aspect of the present invention, there is provided a program information providing apparatus having first storage means for storing a plurality of items of program information, which is attribute information about a program and sending the plurality of items of program information to a first terminal apparatus via a network, the program information providing apparatus comprising: electronic mail generating means for generating a program introducing electronic mail message attached with at least one item of program introducing information for introducing the program of the plurality of items of program information stored in the first storage means; address generating and attaching means for generating a program recording preset address to be linked with any one of the plurality of items of program information stored in the first storage means and attaching the generated program recording preset address to the program introducing electronic mail message generated by the electronic mail generating means for each item of the program introducing information; first sending means for sending the program introducing electronic mail message attached with the program recording preset address by the address generating and attaching means to the first terminal apparatus at a predetermined time; searching means for searching the first storage means for specified one of the plurality of items of program information in accordance with access input information inputted to the program recording preset address; program recording preset script generating means for generating, on the basis of the retrieved program information, a program recording preset script, which is a control command for causing a recording apparatus to record the program to a recording medium; and second sending means for sending the program recording preset script generated by the program recording preset script generating means to a second terminal apparatus.

According to an eighth aspect of the present invention, there is provided a program information providing method for storing a plurality of items of program information, which is attribute information about a program and sending the stored program information to a first terminal apparatus via a network, the program information providing method comprising the steps of: generating an electronic mail message attached with at least one item of program introducing information for introducing the program of the stored plurality of items of program information; generating a program recording preset address to be linked with any one of the stored plurality of items of program information, attaching the generated program recording preset address to the generated program introducing electronic mail message for each item of the program introducing information; sending the program introducing electronic mail message attached with the program recording preset address to the first terminal apparatus; searching for specified one of the plurality of items of program information in accordance with access input information inputted to the program recording preset address; generating, on the basis of the retrieved program information, a program recording preset script, which is a control command for causing a recording apparatus to record the program to a recording medium; and sending the generated program recording preset script to a second terminal apparatus.

According to a ninth aspect of the present invention, there is provided a program recording preset system comprising a program information providing apparatus having first storage means for storing a plurality of items of program information, which is attribute information about a program and sending the plurality of items of program information stored in the first storing means, a first terminal apparatus for receiving the program information sent from the program information providing apparatus, and a second terminal apparatus for recording presetting of a program having the program information sent to the first terminal apparatus as the attribute information, the program information providing apparatus, the first terminal apparatus, and the second terminal apparatus being interconnected by a network, wherein the program information providing apparatus comprising: electronic mail generating means for generating an electronic mail message attached with at least one item of program introducing information for introducing the program of the plurality of items of program information stored in the storage means; address generating and attaching means for generating a program recording preset address to be linked with any one of the plurality of items of program information stored in the first storage means and attaching the generated program recording preset address to the program introducing electronic mail message generated by the electronic mail generating means for each item of the program introducing information; first sending means for sending the program introducing electronic mail message attached with the program recording preset address by the address generating and attaching means to the first terminal apparatus; searching means for searching the storage means for specified one of the plurality of items of program information in accordance with access input information inputted for accessing the address; program recording preset script generating means for generating, on the basis of the retrieved program information, a program recording preset script, which is a control command for causing a recording apparatus to record the program to a recording medium; and second sending means for sending the program recording preset script generated by the program recording preset script generating means; the first terminal apparatus comprising: first receiving means for receiving the program introducing electronic mail message sent from the first sending means of the program information providing apparatus; first display means for displaying the program introducing electronic mail message received by the first receiving means; input means for inputting access input information for accessing the program recording preset address attached to the program introducing electronic mail message received by the first receiving means; and third sending means for sending the access input information inputted from the input means; and the second terminal apparatus comprising: second receiving means for receiving the program recording preset script sent from the second sending means of the program information providing apparatus; and signal converting means for converting the program recording preset script received by the second receiving means into a program recording preset control signal.

According to a tenth aspect of the present invention, there is provided a program recording preset method for a program recording preset system comprising a program information providing apparatus storing a plurality of items of program information, which is attribute information about a program and sending the plurality of items of program information, a first terminal apparatus for receiving the program information sent from the program information providing apparatus, and a second terminal apparatus for recording presetting of the program having the program information sent to the first terminal apparatus as the attribute information, the program information providing apparatus, the first terminal apparatus, and the second terminal apparatus being interconnected by a network, wherein the program recording preset method in the program information providing apparatus comprising the steps of: generating an electronic mail message attached with at least one item of program introducing information for introducing the program of the stored plurality of items of program information; generating a program recording preset address to be linked with any one of the stored plurality of items of program information; attaching the generated program recording preset address to the program introducing electronic mail message for each item of program introducing information to the program information providing apparatus; and sending the program introducing electronic mail message attached with the program recording preset address to the first terminal apparatus at a predetermined time; the program recording preset method in the first terminal apparatus comprising the steps of: receiving the program introducing electronic mail message; displaying the received program introducing electronic mail message; inputting access input information for accessing the program recording preset address attached to the received program introducing electronic mail message; and sending the inputted access input information to the program information providing apparatus; the program recording preset method in the program information providing apparatus comprising the steps of: searching for specified one of the stored plurality of items of program information in accordance with access input information inputted to the program recording preset address; generating, on the basis of the retrieved program information, a program recording preset script, which is a control command for causing a recording apparatus to record the program to a recording medium; and sending the generated program recording preset script to the second terminal apparatus; and the program recording preset method in the second terminal apparatus comprising the steps of: receiving the program recording preset script; and converting the received program recording preset script into a program recording preset control signal.

According to an eleventh aspect of the present invention, there is provided a program recording system having a program information providing apparatus storing a plurality of items of program information, which is attribute information about a program and sending the plurality of items of program information, a first terminal apparatus for receiving the program information from the program information providing apparatus, a second terminal apparatus for recording presetting of the program having the program information sent to the first terminal apparatus as the attribute information, and a recording apparatus for recording the program to a recording medium in accordance with the program recording preset to the second terminal apparatus. The program information providing apparatus, the first terminal apparatus, the second terminal apparatus, and the recording apparatus are interconnected by a network. The program information providing apparatus comprises electronic mail generating means for generating an electronic mail message attached with at least one item of program introducing information for introducing the program of the plurality of items of program information stored in the storage means; address generating and attaching means for generating a program recording preset address to be linked with any one of the plurality of times of program information stored in the storage means and attaching the generated program recording preset address to the program introducing electronic mail message generated by the electronic mail generating means for each item of the program introducing information; first sending means for sending the program introducing electronic mail message attached with the program recording preset address by the address generating and attaching means to the first terminal apparatus; searching means for searching the storage means for specified one of the plurality of items of program information in accordance with access input information inputted in order to make an access to the program recording preset address; program recording preset script generating means for generating, on the basis of the retrieved program information, a program recording preset script, which is a control command for causing a recording apparatus to record the program to a recording medium; and second sending means for sending the program recording preset script generated by the program recording preset script generating means to the second terminal apparatus. The first terminal apparatus comprises first receiving means for receiving an electronic mail message from the first sending means of the program information providing apparatus; first display means for displaying the electronic mail message received by the first receiving means; input means for inputting access input information for accessing the program recording preset address attached to the electronic mail message received by the first receiving means; and third sending means for sending the access input information inputted through the input means. The second terminal apparatus comprises second receiving means for receiving the program recording preset script supplied from the second sending means of the program information providing apparatus; signal converting means for converting the program recording preset script received by the second receiving means into a program recording preset control signal; and fourth sending means for sending the program recording preset control signal converted by the signal converting means. The recording apparatus comprises third receiving means for receiving the program recording preset control signal sent from the fourth sending means of the second terminal apparatus; fourth receiving means for receiving the program listed in the program chart; recording means for recording the program received by the fourth receiving means to the recording medium; and control means for drivingly controlling, in response to the program recording preset control signal received by the third receiving means, the recording means to record the program received by the fourth receiving means to the recording medium.

According to a twelfth aspect of the present invention there is provided a program recording method for a program recording system having a program information providing apparatus storing a plurality of items of program information, which is attribute information about a program and sending the plurality of items of program information, a first terminal apparatus for receiving the program information from the program information providing apparatus, a second terminal apparatus for recording presetting of the program having the program information sent to the first terminal apparatus as the attribute information, and a recording apparatus for recording the program to a recording medium in accordance with the program recording preset to the second terminal apparatus, the program information providing apparatus, the first terminal apparatus, the second terminal apparatus, and the recording apparatus being interconnected by a network. The program recording method in the program information providing apparatus comprises the steps of generating a program introducing electronic mail message attached with at least one item of program introducing information for introducing the program of the stored plurality of items of program information; generating a program recording preset address to be linked with any one of the stored plurality of items of program information; attaching the generated program recording preset address to the program introducing electronic mail message for each item of the program introducing information; and sending the program introducing electronic mail message attached with the program recording preset address to the first terminal apparatus at the predetermined time. The program recording method in the first terminal apparatus comprises the steps of receiving the program introducing electronic mail message from the program information providing apparatus; displaying the received program introducing electronic mail message; inputting access input information for accessing the program recording preset address attached to the received program introducing electronic mail message; and sending the access input information to the program information providing apparatus. The program recording method in the program information providing apparatus comprises the steps of searching for specified one of the stored plurality of items of program information in accordance with access input information inputted to the program recording preset address; generating, on the basis of the retrieved program information, a program recording preset script, which is a control command for recording the program to a recording medium; and sending the program recording preset script to the second terminal apparatus. The program recording method in the second terminal apparatus comprises the steps of receiving the program recording preset script; and converting the received program recording preset script into a program recording preset control signal; and sending the program recording preset control signal to the recording apparatus. The program recording method in the recording apparatus comprises the steps of receiving the program recording preset control signal; receiving the program; and recording the received program to a recording medium in accordance with the program recording preset control signal.

The above and other objects features and advantages of the present invention will become apparent from the following description and the appended claims, taken in conjunction with the accompanying drawings in which like parts or elements denoted by like reference symbols.

BRIEF DESCRIPTION OF THE DRAWINGS

These and other objects of the invention will be seen by reference to the description, taken in connection with the accompanying drawing, in which:

FIG. 3 is a second flowchart continued from the flowchart of FIG. 2;

FIG. 4 illustrates a program chart which is provided to a portable terminal apparatus through a Web browser in the program recording preset system of FIG. 1;

FIG. 5 illustrates an exemplary confirmation screen of program recording preset which is provided to the portable terminal apparatus through the Web browser in the program recording preset system of FIG. 1;

FIG. 6 illustrates an exemplary screen for selecting a recording apparatus to which a program to be provided to the portable terminal apparatus through the Web browser in the program recording preset system of FIG. 1;

FIG. 8 illustrates an exemplary screen for selecting one of the programs preset for recording in order to cancel its program recording preset, these programs being provided to the portable terminal apparatus through the Web browser in the program recording preset system of FIG. 1;

FIG. 14 illustrates an exemplary electronic mail attached with a URL for selecting a program for which recording apparatuses are changed, the electronic mail being sent from the program information providing apparatus to the portable terminal apparatus in the program recording preset system of FIG. 1;

FIG. 21 illustrates an exemplary electronic mail received at the portable terminal apparatus in the program recording preset system of FIG. 19;

FIG. 36 illustrates an operation script generated by the server apparatus in the program recording preset system of FIG. 19;

FIG. 41 is a flowchart describing an operation of the server apparatus when receiving the information about a program which has been recorded from the terminal apparatus in the program recording preset system of FIG. 19.

DETAILED DESCRIPTION OF THE PREFERRED EMBODIMENTS

Preferred embodiments of a program information providing apparatus and method, a program recording preset system and method, and a program recording system and method associated with the present invention will be described in detail with reference to the accompanying drawings.

Figure 1:
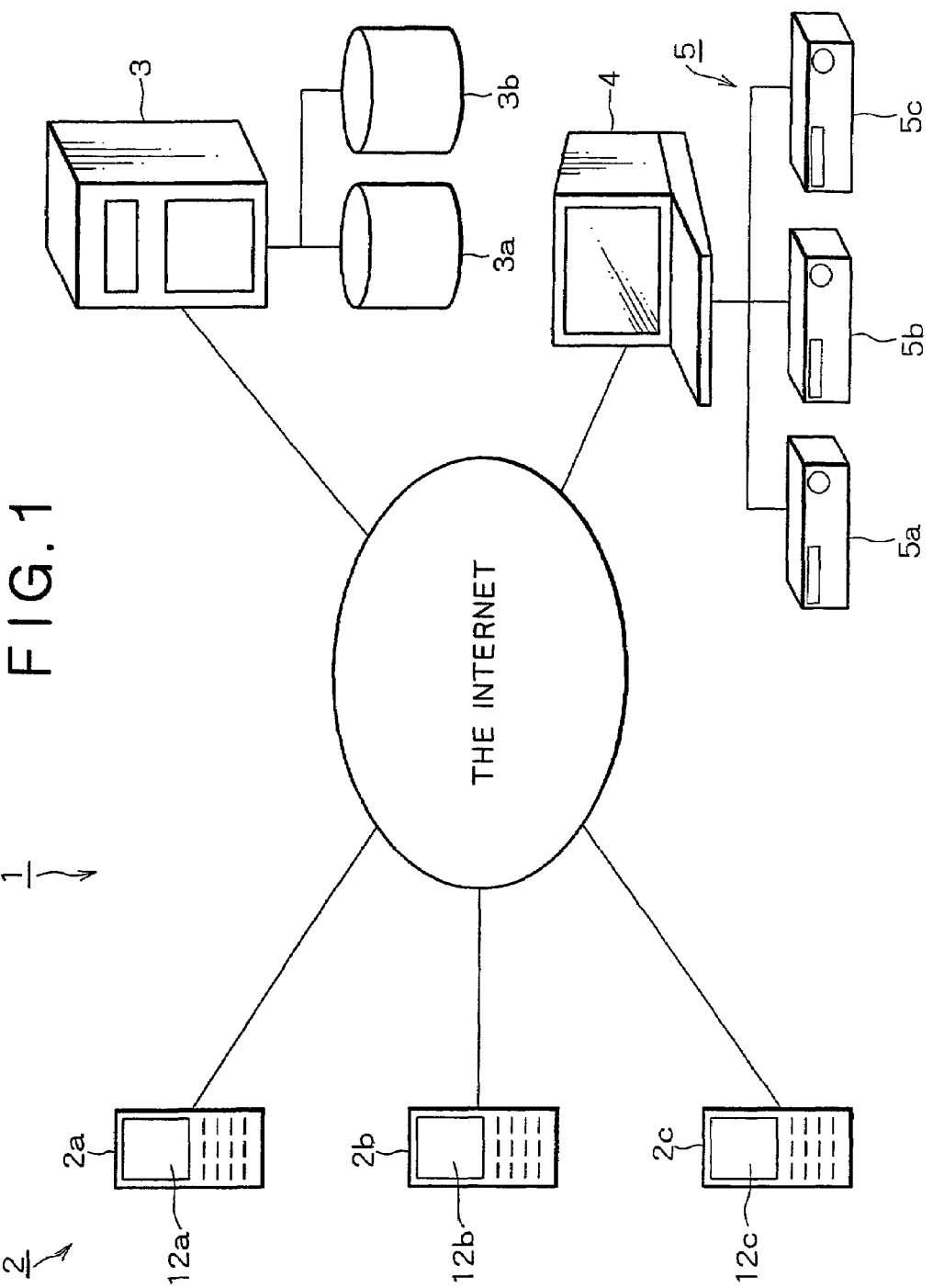
FIG. 1 is a schematic diagram illustrating a configuration of a program recording preset system practiced as a first embodiment of the invention.

The present invention is applied to a program recording preset system 1 practiced as a first embodiment shown in FIG. 1.

The program recording preset system 1 comprises portable terminal apparatuses 2a, 2b, and 2c, a program information providing apparatus 3, a terminal apparatus 4, and a recording apparatus 5.

The portable terminal apparatuses 2a, 2b, and 2c are mobile telephones, portable PCs, or PDAs having display sections 12a, 12b, and 12c, each being constituted by an LCD (Liquid Crystal Display) for displaying character information or image information, for example.

The portable terminal apparatus 2a stores in its storage unit, not shown, a Web browser for capturing program information for introducing television programs provided on the Internet by the program information providing apparatus 3. A controller, not shown, of the portable terminal apparatus 2a searches, by use of the Web browser stored in the storage unit, a database 3a of the program information providing apparatus 3 on the Internet for the program information and displays the retrieved program information on the display section 12a.

The portable terminal apparatus 2b stores, in its storage unit, not shown, mailer software (hereafter referred to as a mailer) for receiving an electronic mail from the program information providing apparatus 3 and displaying it on the display section 12b. The portable terminal apparatus 2b also stores in its storage unit a Web browser which is auxiliary to the mailer. This Web browser is started when the URL (Uniform Resource Locator) to be described later attached to each electronic mail is clicked, displaying program information on the display section 12b.

The portable terminal apparatus 2c stores in its storage unit, not shown, mailer software (hereafter referred to as a mailer) for receiving an electronic mail from the program information providing apparatus 3 and displaying the received electronic mail on the display section 12c.

The program information providing apparatus 3 has the database 3a which holds program information attributable to programs, for example, program introductory texts briefly summarizing the contents of programs and program charts listing the programs organized for each channel and a database 3b which holds program recording preset scripts, described later, in an account arranged for each user. A storage unit, not shown, of the program information providing apparatus 3 stores a Web server program for providing on the Internet the program information and program charts held in the database 3a to the portable terminal apparatuses 2a and 2b through their Web browsers.

The storage unit of the program information providing apparatus 3 also stores a mail server program which captures program introductory texts from the program information stored in the database 3a, attaches them to an electronic mail, and periodically sends them to the portable terminal apparatuses 2b and 2c. The sending timing of an electronic mail to the portable terminal apparatuses 2b and 2c may be set by the user. For example, the user can send an electronic mail every three hours or at a fixed time, for example, six o'clock every day. An electronic mail to be sent from the program information providing apparatus 3 is attached with a URL which contains, for each program introductory text, information for identifying that program and information about the user to whom an electronic mail is sent. This URL is linked to each program information stored in the database 3a of the program information providing apparatus 3. This URL attached to an electronic mail will be described later in more detail.

The program information providing apparatus 3 also generates a program recording preset script, which is a control instruction based on the program information for controlling the recording apparatus 5 to record a program to a recording medium and sends the generated script to the terminal apparatus 4.

The terminal apparatus 4, which is a PC for example, incorporates a tuner for receiving terrestrial broadcasts, a BS (Broadcasting Satellite) tuner, and a CS (Communications Satellite) tuner. Every tuner receives a modulated program carried by a radio wave having a predetermined frequency and demodulates it into a program consisting of a video signal and an audio signal. The terminal apparatus 4 has a recording section for recording programs to a recording medium which is incorporated in the terminal apparatus or loaded therein. The recording medium is a magnetic tape, a magnetic disc, a magneto-optical disc, or an optical disc for example. The terminal apparatus 4 receives a program recording preset script from the program information providing apparatus 3. The controller of the terminal apparatus 4 converts the received program recording preset script into a recording preset control signal suitable for the processing by the recording section, controlling the recording section in accordance with this signal to record the program to a recording medium. Also, when sending the program recording preset script to the recording apparatus 5, the terminal apparatus 4 converts the script into a control signal suitable for each recording apparatus 5. For example, the terminal apparatus 4 converts the script into an IR (Infrared) control signal, a LAN (Local Area Network) control signal, or iLINK (trademark) control signal.

In addition, the terminal apparatus 4 stores, in its storage unit, not shown, program recording preset script pickup software for capturing program recording preset scripts stored in the database 3b of the program information providing apparatus 3 for each account of the terminal apparatus 4. This pickup software is started every time a session is established between the terminal apparatus 4 and the program information providing apparatus 3 to search the database 3b for a program recording preset script stored in the corresponding user account and downloads the retrieved script.

The recording apparatus 5 incorporates a tuner for receiving terrestrial broadcasts, a BS tuner, and a CS tuner. Each tuner receives a modulated program carried by a radio wave having a predetermined frequency and demodulates the received program into a program consisting of a video signal and an audio signal. The recording apparatus 5 has a recording section for recording programs to a recording medium which is incorporated in the recording apparatus or loaded therein. The recording medium is a magnetic tape, a magnetic disc, a magneto-optical disc, or an optical disc for example. The recording apparatus 5 receives a recording preset control signal based on the program recording preset script from the terminal apparatus 4. The recording apparatus 5 records the program to a recording medium in accordance with the received control signal. The recording apparatus 5 may have a plurality of recorders such as a DV (Digital Video) recorder 5a, a VTR (Video Tape Recorder) 5b, and a DVD (Digital Video Disk) recorder 5c for example.

Now, referring to the flowcharts shown in FIGS. 2 and 3, a program recording preset operation in the direct access mode in which the portable terminal apparatus 2a directly accesses the program information providing apparatus 3 via the Internet will be described.

In the direct access mode, the user must make user registration before a recording preset service for programs is started with the program information providing apparatus 3. For example, the user must register information such as a user's login name, password, mail address, postal address, telephone numbers (of the portable terminal apparatus 2 and the terminal apparatus 4), the recording section of the terminal apparatus 4 and the recording apparatus 5, and card number necessary for charging services and user's profile such as user's name, age, gender, and occupation. The recording sections of a plurality of terminal apparatuses 4 and the recording apparatuses 5 may be registered as recording devices for recording programs. To do this, any one of the recording devices of the terminal apparatuses 4 or the recording apparatuses 5 that is mainly used is registered as a default device.

In step S1, the controller, not shown, of the portable terminal apparatus 2a accesses as instructed by the user the program information providing apparatus 3 via the Internet by use of the Web browser stored in the storage unit, not shown. In response, the program information providing apparatus 3 requests the portable terminal apparatus 2a to prompt the user to enter his login name and password through the Web browser.

In step S2, checking the entered login name and password, the program information providing apparatus 3 determines whether to establish a data transfer session between the portable terminal apparatus 2a and the program information providing apparatus 3. If the login name and password are found correct, the program information providing apparatus 3 establishes the session and procedure goes to step S3; otherwise, the procedure is ended.

It should be noted that if a user ID (Identification) is registered after the first entry of the login name and password and the resultant provision of the service of the program recording preset system 1, the login name and password need not be entered any more.

In step S3, the controller of the portable terminal apparatus 2a downloads, from the database 3a, by use of the Web browser, a program chart in which program information is arranged for each channel. The portable terminal apparatus 2a displays the downloaded program chart on the display section 12a. FIG. 4 illustrates one example of the program chart displayed on the display section 12a. The program chart shown in FIG. 4 is formed by 10 channels CH1 through CH10 allocated to 10 broadcast stations, indicating the program information for three hours from 20:00 to 22:00. In each program information column, a program name like "Professional Wrestling" is arranged in time zone 20:00 to 21:00 of a broadcast station called "AAA General" allocated to channel CH1 for example. It should be noted that "Preset" button in each program information column will be described later in detail.

In step S4, the controller determines from the input made by the user through the portable terminal apparatus 2a whether to preset recording of a program listed in the program chart. If the preset is to be made, the procedure goes to step S5; otherwise this procedure is ended. For example, if the program chart shown in FIG. 4 is shown on the display section 12a of the portable terminal apparatus 2a and the recording of a program is to be preset, the user clicks "Preset" button attached to that program, upon which the program recording preset mode is entered.

In step S5, the controller of the portable terminal apparatus 2a displays through the Web browser a screen for confirming that the program recording has been preset in accordance with the input by the user in step S4. For example, if, in step S4, the user clicked the "Preset" button in the program chart shown on the display section 12a, the controller of the portable terminal apparatus 2a displays through the Web browser a program recording preset confirmation screen shown in FIG. 5 onto the display section 12a to confirm the program recording preset. For example, this screen shows the name of the broadcasting station as "station=EEE TV," the broadcast date as "year=2000, month=09, and date=01," program start and end times as "start=21:00, end=22:00," the program title as "program-title=World Soccer," the program subtitle as "program-subtitle: Japan Vs. Germany," the identification of broadcast means such as terrestrial broadcast, CS broadcast, and BS broadcast as "Infra=3," and the identification of the recording apparatus 5 for use in recording the program as "device id=1." This screen also provides "Device Change" button for changing the recording apparatuses to be described with reference to step S6 and "Confirm Preset" button for executing the creation of the program recording preset script to be described with reference to step S8.

In step S6, the user determines whether to change one of the recording sections of the terminal apparatuses 4 or the one of the recording apparatuses 5 registered as default before step S1 to another, by inputting from the user's portable terminal apparatus 2a. If the default device is to be changed to another, the procedure goes to step S7; otherwise, the procedure goes to step S8. If there is only one recording apparatus 5 registered, then step 6 can be omitted. For example, if the program recording preset confirmation screen shown in FIG. 5 is shown on the display section 12a of the portable terminal apparatus 2a, clicking "Device Change" in this screen causes a device change screen shown in FIG. 6 to be displayed on the display section 12a of the portable terminal apparatus 2a through the Web browser. The device change screen shown in FIG. 6 shows "DEVICE ID" indicative of the ID numbers in the program recording preset system 1 of the recording section of the terminal apparatus 4 or the recording apparatus 5, "DEVICE TYPE" indicative of the device types of the recording section of the terminal apparatus 4 and the recording apparatus 5, "MAKER" indicative of the makers of the recording section of the terminal apparatus 4 and the recording apparatus 5, "MODEL" indicative of the models of the recording section of the terminal apparatus 4 and the recording apparatus 5, and "DEFAULT" indicative of the default device which is registered one of the recording sections of the terminal apparatuses 4 and the recording apparatuses 5. As shown in the device change screen of FIG. 6, there are three device types for the recording section of the terminal apparatus 4 and the recording apparatus 5 registered in the program recording preset system 1; DV (device ID 1), VTR (device ID 2), and DVD (device ID 3). Of these three types of devices, the recording apparatus 5 of device ID 1 is registered as default.

Figure 7:
FIG. 7 illustrates how an icon of a recording apparatus on which program recording has been preset is displayed in a program chart to be provided to the portable terminal apparatus through the Web browser in the program recording preset system of FIG. 1.

In step S7, the user changes through the input of the portable terminal apparatus 2a the recording section of the terminal apparatus 4 or the recording apparatus 5. The user performs this change by checking the default column of the device which the user wants to register as default and then clicking "Yes" or "No" button in response to the question "Do you want this device to register as default?" If "Yes" button is clicked, the Web browser screen returns to the program recording preset confirmation screen shown in FIG. 5. If the recording section of the terminal apparatus 4 or the recording apparatus 5 to which a program is to be recorded has been preset, an icon symbolizing that device is displayed in the corresponding program column of the program chart as shown in FIG. 7. For example, in the hatched program column of "World Soccer," an icon symbolizing the DV is displayed as shown in FIG. 7.

In step S8, the user determines through the input from the portable terminal apparatus 2a whether to generate a program recording preset script. If the script is to be generated, the procedure goes to step S9; otherwise the procedure returns to step S3. For example, if the user wants to generate the script, he clicks "Confirm Preset" button in the program recording preset confirmation screen shown in FIG. 5, the clicking being sent to the controller of the program information providing apparatus 3.

In step S9, the controller of the program information providing apparatus 3 generates the script as instructed by the user through the portable terminal apparatus 2a. If the script has been generated, its log is stored in the database 3b of the program information providing apparatus 3 for each user.

In step S10, the controller of the program information providing apparatus 3 stores the generated script in the account of the corresponding user in the database 3b.

In step S11, if the program information providing apparatus 3 accesses the terminal apparatus 4, the procedure goes to step S12; if the terminal apparatus 4 accesses the program information providing apparatus 3, the procedure goes to step S13.

In step S12, the controller of the program information providing apparatus 3 accesses the terminal apparatus 4 to establish a session for transferring data therewith. When the program recording preset script was stored in the account of the corresponding user in the database 3b in step S9, the controller of the program information providing apparatus 3 accesses the terminal apparatus 4 immediately after the storage unit. If step S12 has been completed, the procedure goes to step S14.

In step S13, the controller of the terminal apparatus 4 accesses the program information providing apparatus 3 to establish a session for transferring data therewith. The controller of the terminal apparatus 4 periodically accesses the program information providing apparatus 3, for example, a predetermined number of times a day specified by the user. If step S13 has been completed, the procedure goes to step S14.

In step S14, if the session has been established between the program information providing apparatus 3 and the terminal apparatus 4, the program recording preset script pickup software stored in the recording section of the terminal apparatus 4, which is software for capturing the program recording preset script, is started.

The started program recording preset script pickup software accesses the program information providing apparatus 3 to download the program recording preset script stored in the database 3b of the program information providing apparatus 3. The controller of he program information providing apparatus 3 authenticates this software whether it is of the authorized user. This authentication is executed by checking the user ID or the user login name and password.

It should be noted that, when installing the script pickup software into the terminal apparatus 4, the user must register the user ID or the user login ID and password and store them in a storage unit, not shown, of the program information providing apparatus 3.

In response to the access by the script pickup software, the controller of the program information providing apparatus 3 determines, by checking the user ID or the user login ID and password stored in the storage unit, whether the accessing script pickup software is of the authorized user for the account of the database 3b. If the script pickup software is found of the authorized user, then the procedure goes to step S15; otherwise, the processing is ended.

In step S15, by use of the program recording preset script pickup software stored in the storage unit, not shown, the controller of the terminal apparatus 4 downloads the program recording preset script from the database 3b of the program information providing apparatus 3. If the script has been downloaded by the script pickup software of the terminal apparatus 4, the controller of the program information providing apparatus 3 generates a message thereof by setting a program chart account which is accessible from the Web browser.

In step S16, by use of the script pickup software stored in the storage unit, the controller of the terminal apparatus 4 captures the program recording preset script and determines the device to which the program written in the script is the recording section of the terminal apparatus 4 or is the recording apparatus 5. If the device is found to be the recording section of the terminal apparatus 4, the controller of the terminal apparatus 4 converts the script into a recording preset control signal suitable for the recording section. If the device is found to be the recording apparatus 5, the controller converts the script into a control signal suitable for the recording apparatus 5 and sends this control signal thereto. The recording apparatus 5 receives the control signal to execute the program recording preset.

The following describes an operation for canceling the program recording preset made on the basis of the program recording preset script generated in the direct access mode described with reference to FIGS. 2 and 3.

To cancel program recording preset, the user clicks "Cancel" button, not shown, in the program chart displayed on the display section 12a of the portable terminal apparatus 2a through the Web browser. When "Cancel" button is clicked, the controller of the program information providing apparatus 3 captures a program recording preset log of the corresponding user from those in the database 3b, the captured log being about a program which has not yet been recorded on the recording section of the terminal apparatus 4 or on the recording apparatus 5. The controller displays the captured log on the display section 12a of the portable terminal apparatus 2a. FIG. 8 illustrates one example of the program recording preset log. As shown, in the program recording preset log, the broadcast channel of each program which has been preset for recording is "CH1," the recording start time is "2000/09/01 22:30:00" (22:30 of Sep. 1, 2000), the program title "Cute Angel Kent" for example. In FIG. 8, four programs are preset for recording, namely "Cute Angel Kent," "News," "Science," and "World Soccer" by title.

When the program recording preset log is displayed on the display section 12a of the portable terminal apparatus 2a, the user selects the program of which program recording preset is to be canceled from the log and clicks "Delete" button in the screen shown on the display section 12a. In response, the controller of the program information providing apparatus 3 generates a script for invalidating the recording preset of the selected program. The generated cancel script is sent to the terminal apparatus 4 from the program information providing apparatus 3, where the script is converted into a control signal suitable for the recording section of the terminal apparatus 4 or for the recording apparatus 5 preset for the program recording, the control signal then being sent to the recording section or the recording apparatus 5. In response, the recording section or the recording apparatus 5 invalidates the program recording setting. When the program recording preset on the recording section or the recording apparatus is invalidated, the corresponding program recording preset log is deleted and registered as a canceled log with the corresponding user account in the database 3b of the program information providing apparatus 3.

Figure 2:
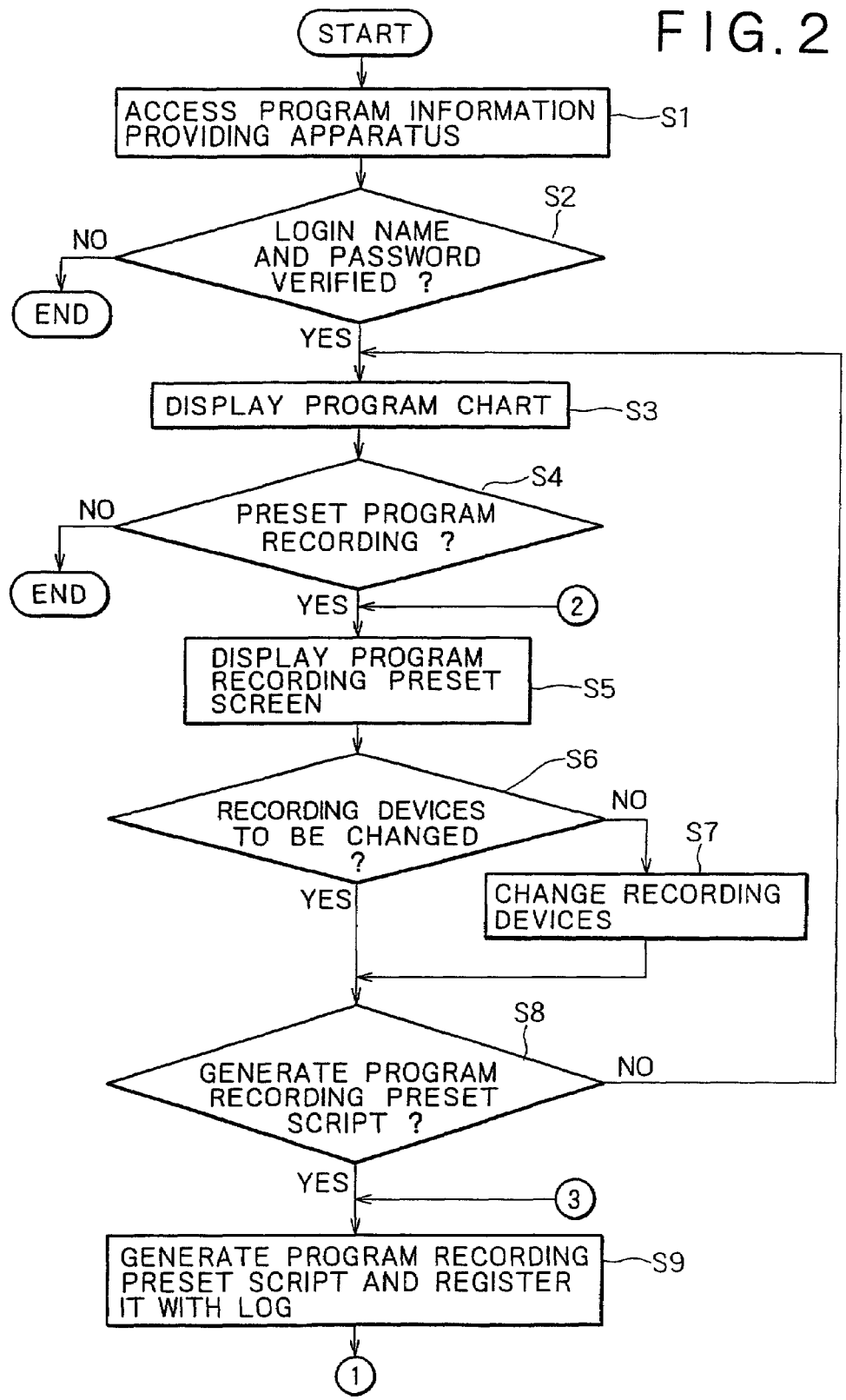
FIG. 2 is a first flowchart describing an operation to be performed when generating a script for presetting program recording in the program recording preset system of FIG. 1.
Figure 9:
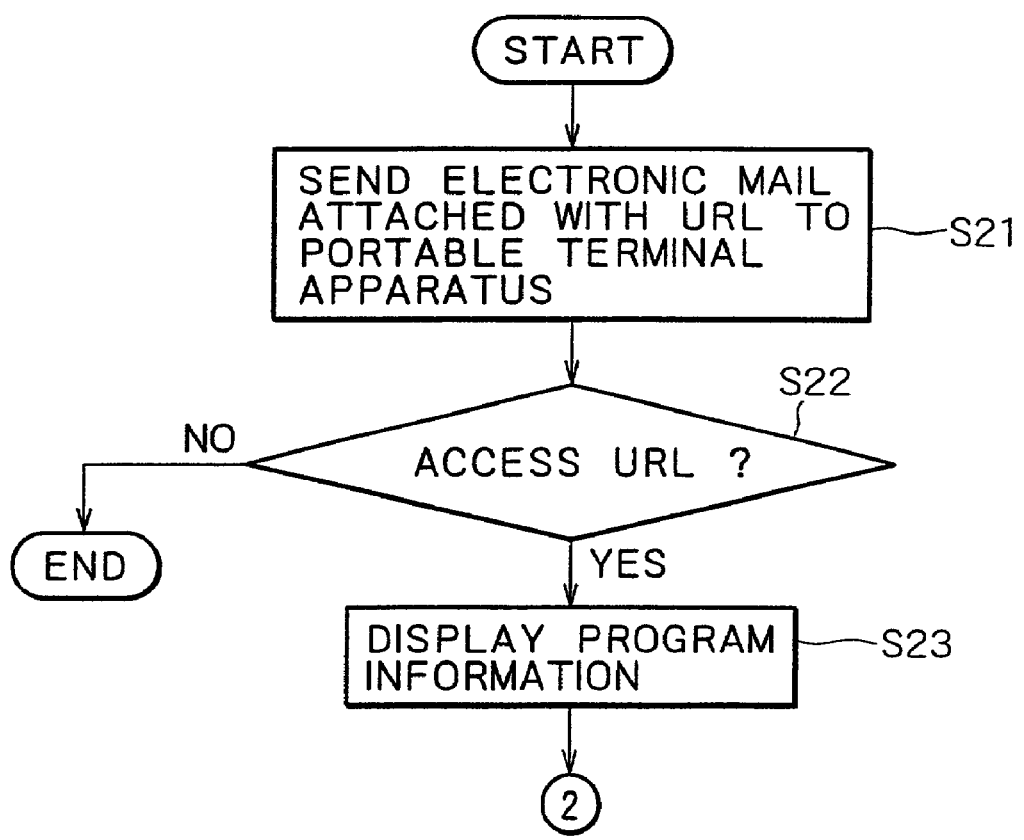
FIG. 9 is a third flowchart describing an operation to be performed when generating a script for presetting program recording in the program recording preset system of FIG. 1.

The following describes, with reference to the flowcharts shown in FIGS. 9, 2, and 3, a program recording preset operation in a first mail access mode in which an electronic mail attached with an URL is periodically sent from the program information providing apparatus 3 to the portable terminal apparatus 2b and program recording preset is executed through a Web browser of the portable terminal apparatus 2b in the program recording preset system 1.

Figure 10:
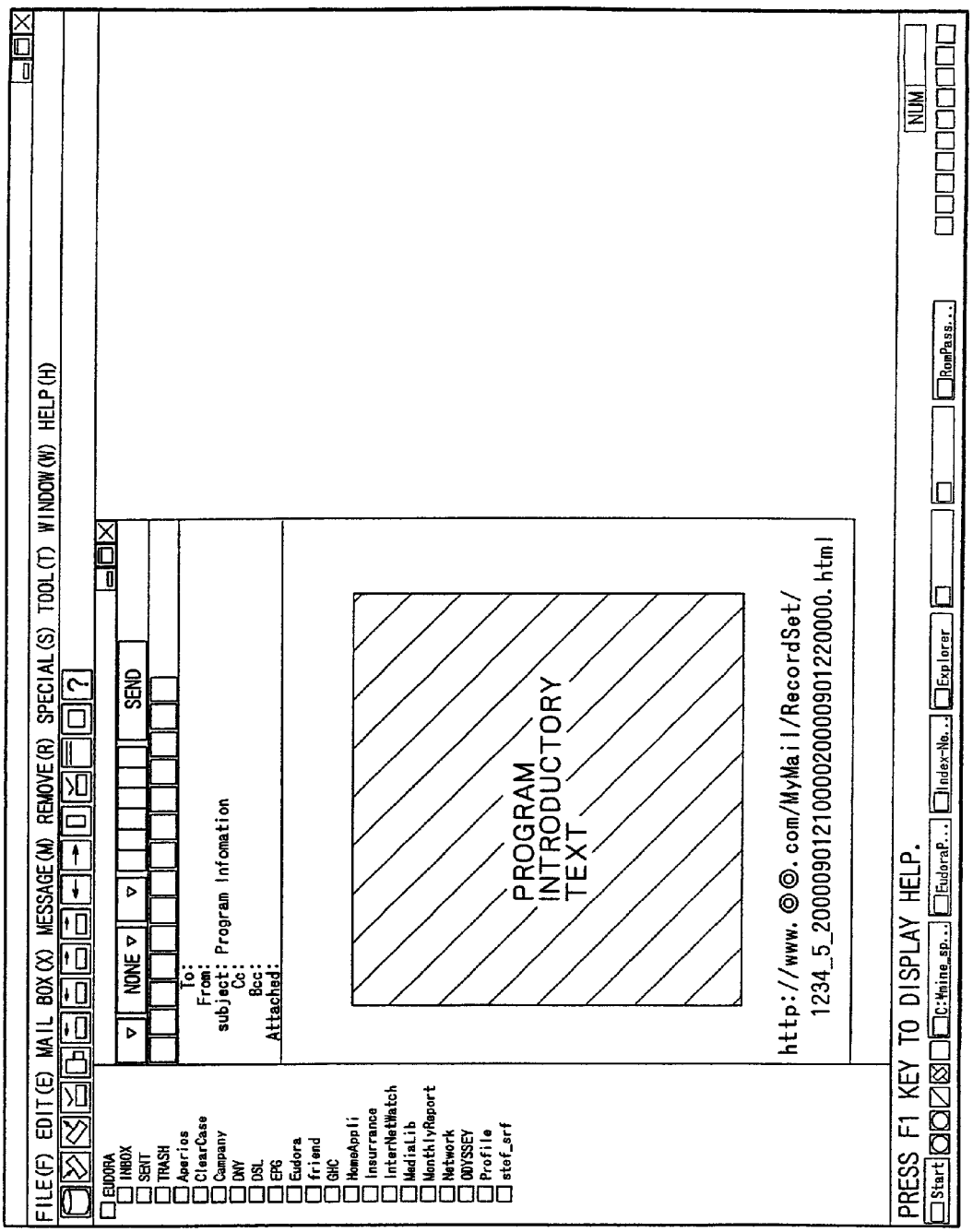
FIG. 10 illustrates an exemplary electronic mail attached with a URL for program recording preset, the electronic mail being sent from a program information providing apparatus to the portable terminal apparatus in the program recording preset system of FIG. 1.

In step S21, the controller of the program information providing apparatus 3 sends an electronic mail attached with a URL to the portable terminal apparatus 2b via the Internet, the URL being capable of identifying a program introductory text and the user, program channel, and program start and end times for each introductory text. FIG. 10 illustrates one example of an electronic mail sent from the program information providing apparatus 3 to the portable terminal apparatus 2b. The program introductory text briefs the content of each program, which is placed in the hatched portion of an electronic mail shown in FIG. 10, an actual text being omitted. This electronic mail is attached with a URL "http://www.☉☉.com/MyMail/RecordSet/ 1234_5_ 20000901210000200009012200000.html". This URL indicates the location of the directory in which the corresponding program information in the database 3a of the program information providing apparatus 3 is stored and, the same time, identifies the user and indicates the capabilities which are executed when this URL is accessed. "RecordSet" in the URL shown in FIG. 10 indicates that this URL is for program recording preset, "1234" indicates a user identifier for identifying the user of the program recording preset system 1, "5" indicates a program channel number, "20000901210000" indicates program start date and time (21:00 of Sep. 1, 2000), and "20000901220000" indicates program end date and time (22:00 of Sep. 1, 2000).

In step S22, the user determines through the portable terminal apparatus 2b whether to access the URL attached to an electronic mail. If the user wants to access the URL, the procedure goes to step S23; otherwise, the procedure is ended. For example, if the electronic mail shown in FIG. 10 is sent from the program information providing apparatus 3 to the portable terminal apparatus 2b, the user can access the URL "http://www.☉☉.com/MyMail/RecordSet/ 1234_ 20000901210000200009012200000.html" by clicking it.

In step S23, the controller of the portable terminal apparatus 2b searches, through the Web browser, the database 3a of the program information providing apparatus 3 for the corresponding program information and displays the retrieved program information on the display section 12b. When step S23 is completed, the procedure goes to the processes of steps S4 through S16 shown in FIGS. 2 and 3.

The processes of steps S4 through S16 are the same as executed in the direct access mode. Through the above-mentioned steps, a program recording preset script is generated to preset the terminal apparatus 4 or the recording apparatus 5 for program recording in the first mail access mode.

The following describes an operation of canceling the program recording preset executed on the basis of the program recording preset script generated in the first mail access mode described with reference to the flowcharts of FIGS. 9, 2, and 3.

Figure 11:
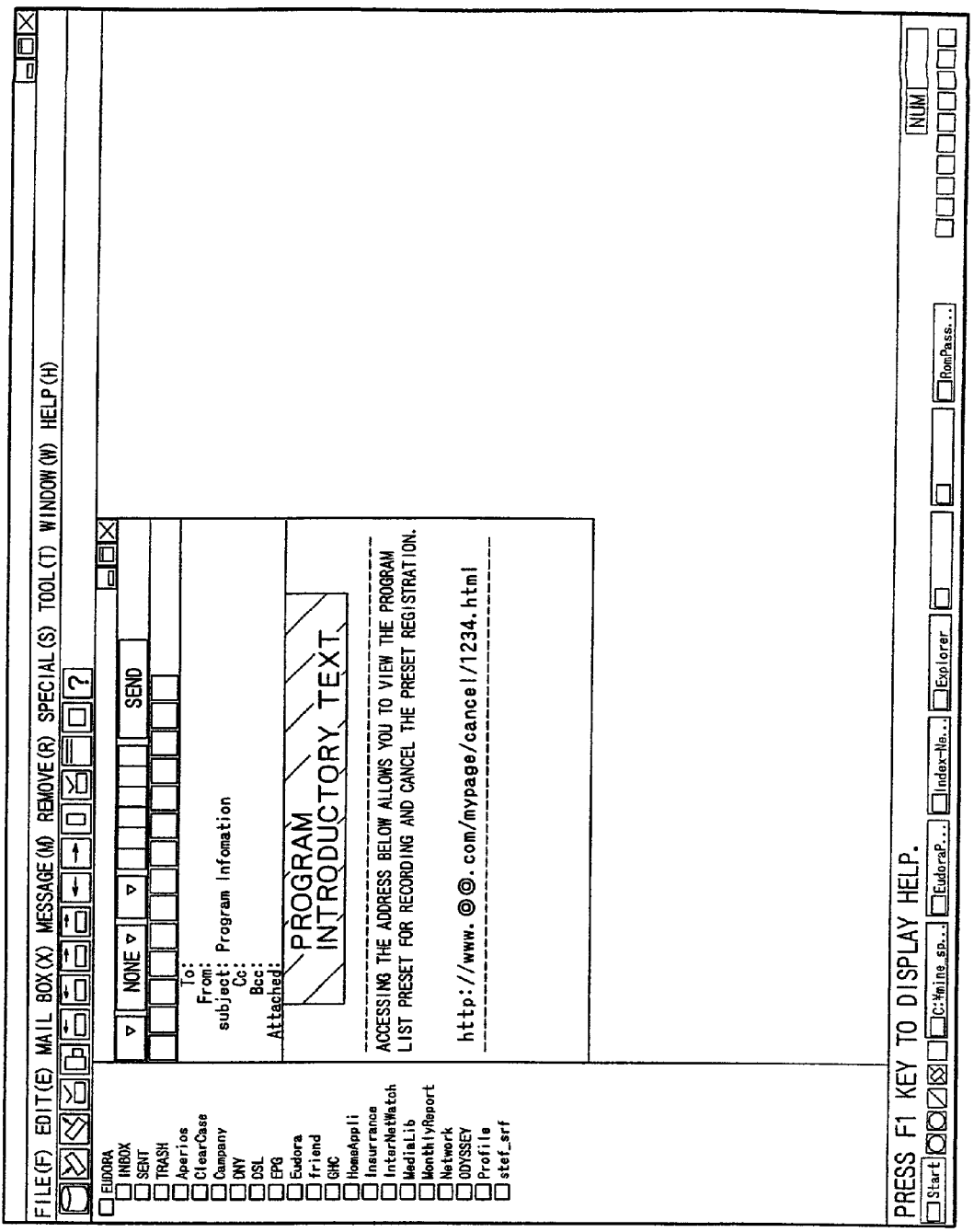
FIG. 11 illustrates an exemplary electronic mail attached with a URL for moving to the program recording preset cancel mode, the electronic mail being sent from the program information providing apparatus to the portable terminal apparatus in the program recording preset system of FIG. 1.

If at least one program is preset for recording, the electronic mail to be sent from the program information providing apparatus 3 to the portable terminal apparatus 2b in step S21 of FIG. 9 is attached with a cancel URL like "http://www.☉☉.com/mypage/cancel/1234.html" for example as shown in FIG. 11. This cancel URL can identifies the user and describes the capabilities which are executed by accessing this site. "cancel" in the cancel URL shown in FIG. 11 indicates that URL functions to invalidate the program recording preset already made and "1234" indicates a user identifier for identifying the user of the program recording preset system 1. To cancel the program recording preset, the user clicks through the portable terminal apparatus 2b the cancel URL attached to the electronic mail. When the cancel URL is clicked, the controller of the program information providing apparatus 3 takes the program recording preset log, of the corresponding user, of the program not yet recorded on the recording section of the terminal apparatus 4 or on the recording apparatus 5 out of those stored in the database 3b and passes the cancel URL to the portable terminal apparatus 2b. In response, the controller of the portable terminal apparatus 2b starts the Web browser, displaying the program recording preset log on the display section 12b. For example, the controller of the portable terminal apparatus 2b displays through the Web browser the program recording preset log as shown in FIG. 8 on the display section 12b of the portable terminal apparatus 2b. Referring to the log screen on the display section 12b, the user selects a program of which program recording preset is to be canceled. To cancel the program recording preset, the user clicks "Delete" button shown in FIG. 8 for example after the selection. The subsequent program recording preset cancel operations in the first mail access mode are the same as those in the direct access mode.

Figure 12:
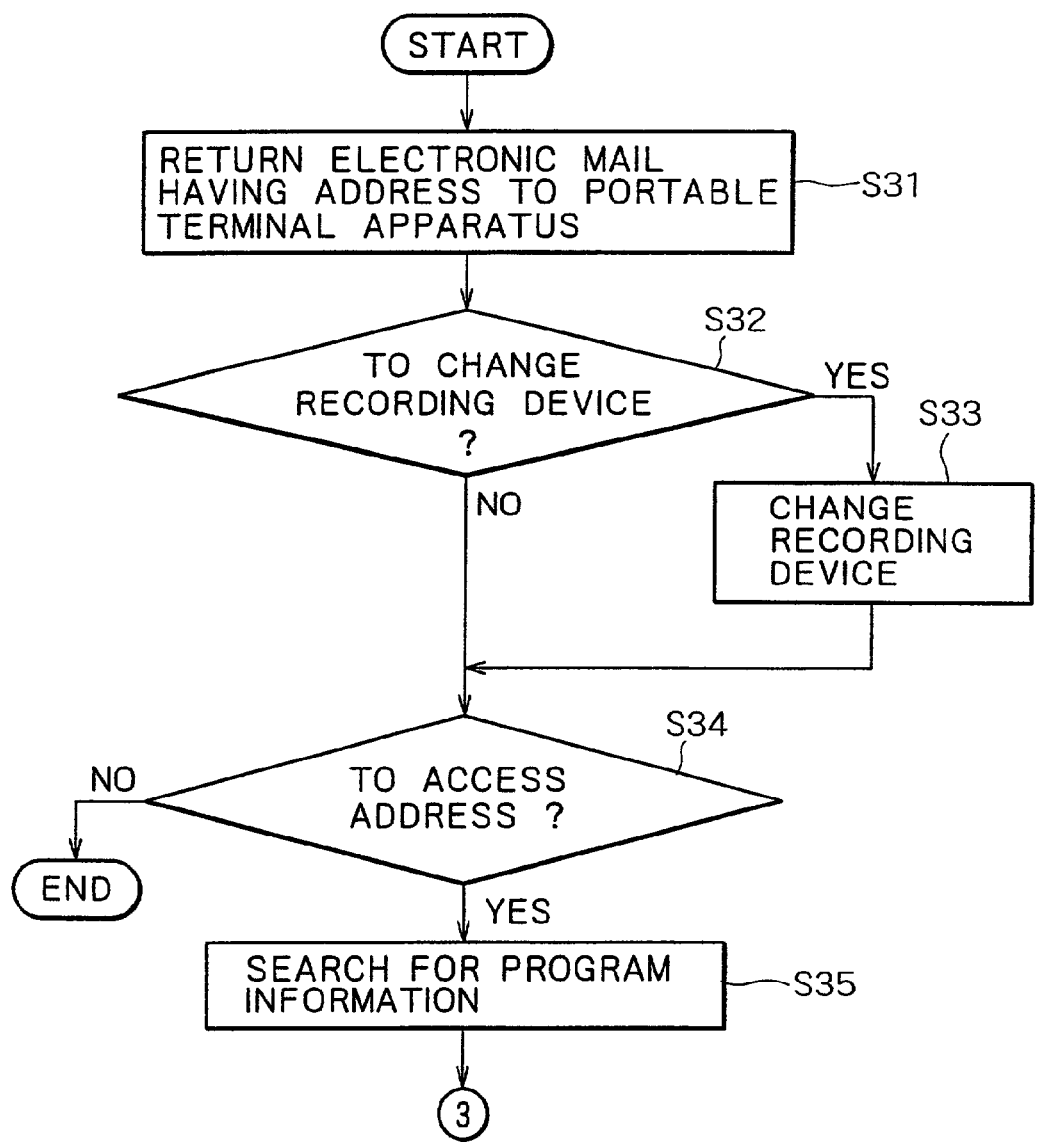
FIG. 12 is a fourth flowchart describing an operation to be performed when generating a script for presetting program recording in the program recording preset system of FIG. 1.

The following describes a program recording preset operation in a second mail access mode in which an electronic mail attached with a URL is periodically sent from the program information providing apparatus 3 to the portable terminal apparatus 2c and the portable terminal apparatus 2c accesses the attached URL to perform program recording preset in the program recording preset system 1 with reference to the flowcharts of FIGS. 12, 2, and 3.

Figure 13:
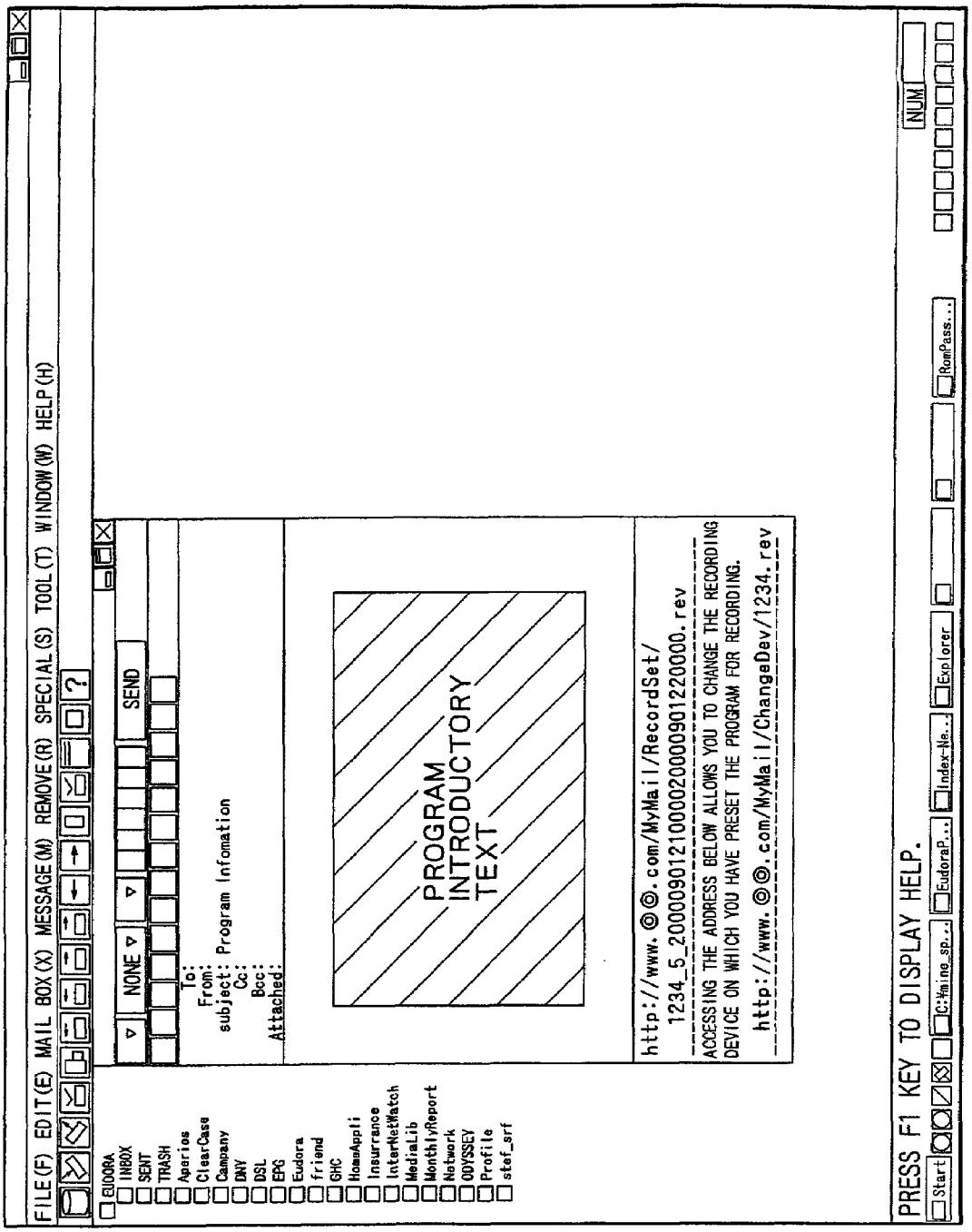
FIG. 13 illustrates an exemplary electronic mail attached with a URL for moving to the mode for changing the recording apparatuses to which a program is recorded, the electronic mail being sent from the program information providing apparatus to the portable terminal apparatus in the program recording preset system of FIG.

In step S31, the controller of the program information providing apparatus 3 sends via the Internet to the portable terminal apparatus 2c a program introductory electronic mail attached with a URL for identifying program introductory texts and the user, program channel, and program start and end times for each introductory text. FIG. 13 illustrates one example of an electronic mail sent from the program information providing apparatus 3 to the portable terminal apparatus 2c. The program introductory text briefs the content of each program, which is placed in the hatched portion of an electronic mail shown in FIG. 13, an actual text being omitted.

This electronic mail is attached with a URL "http://www.☉☉.com/MyMail/RecordSet/ 1234_5_ 20000901210000200009012200000.rev", for program recording preset. This URL identifies the user and indicates the capabilities which are executed when this URL is accessed. "RecordSet" in the URL shown in FIG. 13 indicates that this URL is for program recording preset, "1234" indicates a user identifier for identifying the user of the program recording preset system 1, "5" indicates a program channel number, "20000901210000" indicates program start date and time (21:00 of Sep. 1, 2000), and "20000901220000" indicates program end date and time (22:00 of Sep. 1, 2000).

In addition, the electronic mail shown in FIG. 13 is attached with a recording device change mode URL for entering a mode in which the default recording section of the terminal apparatus 4 or the default recording apparatus 5 is changed to another registered recording section of the terminal apparatus 4 or another registered recording apparatus 5. This URL is "http://www.☉☉.com/MyMail/ChangeDev/1234.rev" for example. It should be noted that, if there exists only one recording section of the terminal apparatus 4 or only one recording apparatus 5, this URL is not attached to the electronic mail.

In step S32, the user determines through the portable terminal apparatus 2c whether to change the default recording section of the terminal apparatus 4 or the default recording apparatus 5 to another registered recording section of the terminal apparatus 4 or another registered recording apparatus 5. If the default device is to be changed, the procedure goes to step S33; otherwise, the procedure goes to step S34.

For example, if the default recording section of the terminal apparatus 4 or the default recording apparatus 5 is to be changed, the user clicks the URL "http://www.⊙⊙.com/MyMail/ChangeDev/1234.rev" shown in FIG. 13, upon which the recording device change mode is entered. In this mode, the controller of the program information providing apparatus 3 sends to the portable terminal apparatus 2c a recording device change program selecting electronic mail message as shown in FIG. 14 attached with program recording preset log indicative of the programs preset for recording and a recording device select mode URL for changing the recording section of the terminal apparatus 4 or changing the recording apparatus 5 for each program. As shown in FIG. 14, this mail is attached with the recording device select URL for each program preset for recording.

As shown in FIG. 14, the program recording preset log consists of "Channel" ("CH3" for example) indicative of a channel on which a program preset for recording is broadcast, "Program Start Time" (for example, 2000/09/01 22:30:00=22:30 on Sep. 1, 2000) indicative of the timing at which the program starts, "Program End Time" (for example, 2000/09/01 23:00:00=23:00 on Sep. 1, 2000), and "Title" (for example, Cute Angel Kent) indicative of the title of the program. In addition, a URL like "http://www.⊙⊙.com/MyMail/DevChange/ DevChange_1234_3_20000901223000200009012300000.rev" is attached for each program. The recording device select mode URL identifies the user and the capabilities which can be executed by accessing this URL. "DevChange" in the URL shown in FIG. 14 indicates that this URL is intended for presetting program recording, "1234" indicates the user identifier for identifying the user of the program recording preset system 1, "3" indicates the channel number of the program, "200009012230000" indicates the program start date and time (22:30 on Sep. 1, 2000), and "20000901230000" indicates the program end date and time (23:00 on Sep. 1, 2000).

In step S33 the user changes through the portable terminal apparatus 2c the recording section of the terminal apparatus 4 or change the recording apparatus 5. This change is executed when the user clicks the recording device select mode URL attached for each program to the electronic mail for program selecting for changing recording device shown in FIG. 14, upon which the recording device select mode in which registered device selection can be made is entered. For example, if the user clicks the URL having program title "World Soccer," the controller of the program information providing apparatus 3 sends to the portable terminal apparatus 2c a recording device selecting electronic mail message attached with a recording device setting URL for selectively setting a desired device from the registered recording sections of the terminal apparatus 4 or from the registered recording apparatuses 5.

Figure 15:
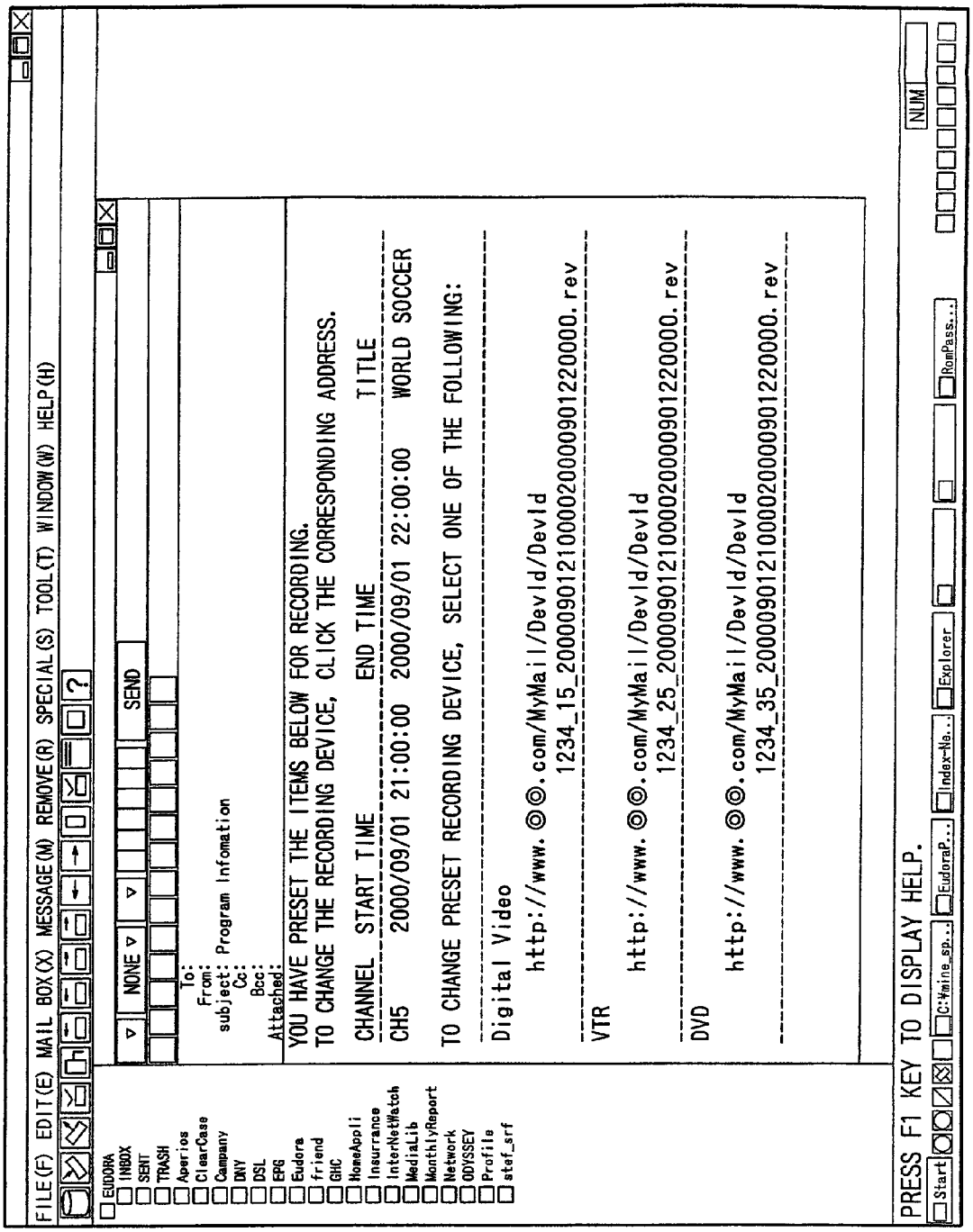
FIG. 15 illustrates an exemplary electronic mail attached with a URL for changing the recording apparatuses to which a program is recorded, the electronic mail being sent from the program information providing apparatus to the portable terminal apparatus in the program recording preset system of FIG. 1.

Receiving this electronic mail, the controller of the portable terminal apparatus 2c displays on the display section 12c a recording device selecting electronic mail message shown in FIG. 15 for example by use of the mailer software stored in its storage unit. As shown in FIG. 15, this electronic mail provides such information about a program of which recording device is to be changed as "Channel" (for example, CH5), "Recording Start Time" (for example, 2000/09/01 21:00:00"), "Recording End Time" (for example, 2000/09/01 22:00:00), and "Title" (for example, "World Soccer"). In addition, the controller displays all recording device setting URLs for the recording sections of the terminal apparatus 4 and the recording apparatuses 5 registered in the program recording preset system 1. The recording device setting URL attached to the recording device selecting electronic mail message is shown "http://www.⊙⊙.com/MyMail/DevId/ DevId_1234_15_200009012100002000090122000.rev" for example in the case of "Digital Video" for example shown in FIG. 15. In this URL, "1234" indicates the user identifier for identifying the user of the program recording preset system 1, "1" of "15" indicates the device ID, the subsequent "5" indicates the channel number of the program, "20000901210000" indicates the program start date and time (21:00 on Sep. 1, 2000), and "20000901220000" indicates the program end date and time (22:00 on Sep. 1, 2000). In FIG. 15, in addition to "Digital Video," "VTR" and "DVD" are listed as the recording sections of the terminal apparatus 4 and as the recording apparatuses 5 registered in the program recording preset system 1, their device IDs being "2" and "3" respectively.

When the recording device selecting electronic mail message is displayed on the display section 12c of the portable terminal apparatus 2c, the user selects a desired recording device setting URL through the portable terminal apparatus 2c. When the desired URL is selected and a message thereof is sent to the program information providing apparatus 3, its controller changes the default recording section of the terminal apparatus 4 or the default recording apparatus 5 to the newly selected device and changes the program recording preset script accordingly.

Receiving this script, the terminal apparatus 4 sets the newly selected recording section of the terminal apparatus 4 and the newly selected recording apparatus 5 as the default device. When step S33 has been completed, the procedure goes to step S34.

In step S34, the user determines through the portable terminal apparatus 2c whether to access the program recording preset URL attached to the program introductory electronic mail message. If the user accesses this URL, the procedure goes to step S35; otherwise, the processing comes to an end.

In step S35, when the program recording preset URL has been accessed, the controller of the program information providing apparatus 3 searches the database 3a for the corresponding program. When step S35 has been completed, the procedure goes to steps S9 through S16 shown in FIGS. 2 and 3.

The processes of steps S9 through S16 are the same as those of the direct access mode. When these steps have been followed in the second mail access mode, a program recording preset script is generated to preset program recording on the terminal apparatus 4 or the recording apparatus 5.

The following describes an operation of canceling the program recording presetting made on the basis of the program recording presetting script generated in the first mail access mode described with reference to the flowcharts of FIGS. 12, 2, and 3.

Figure 16:
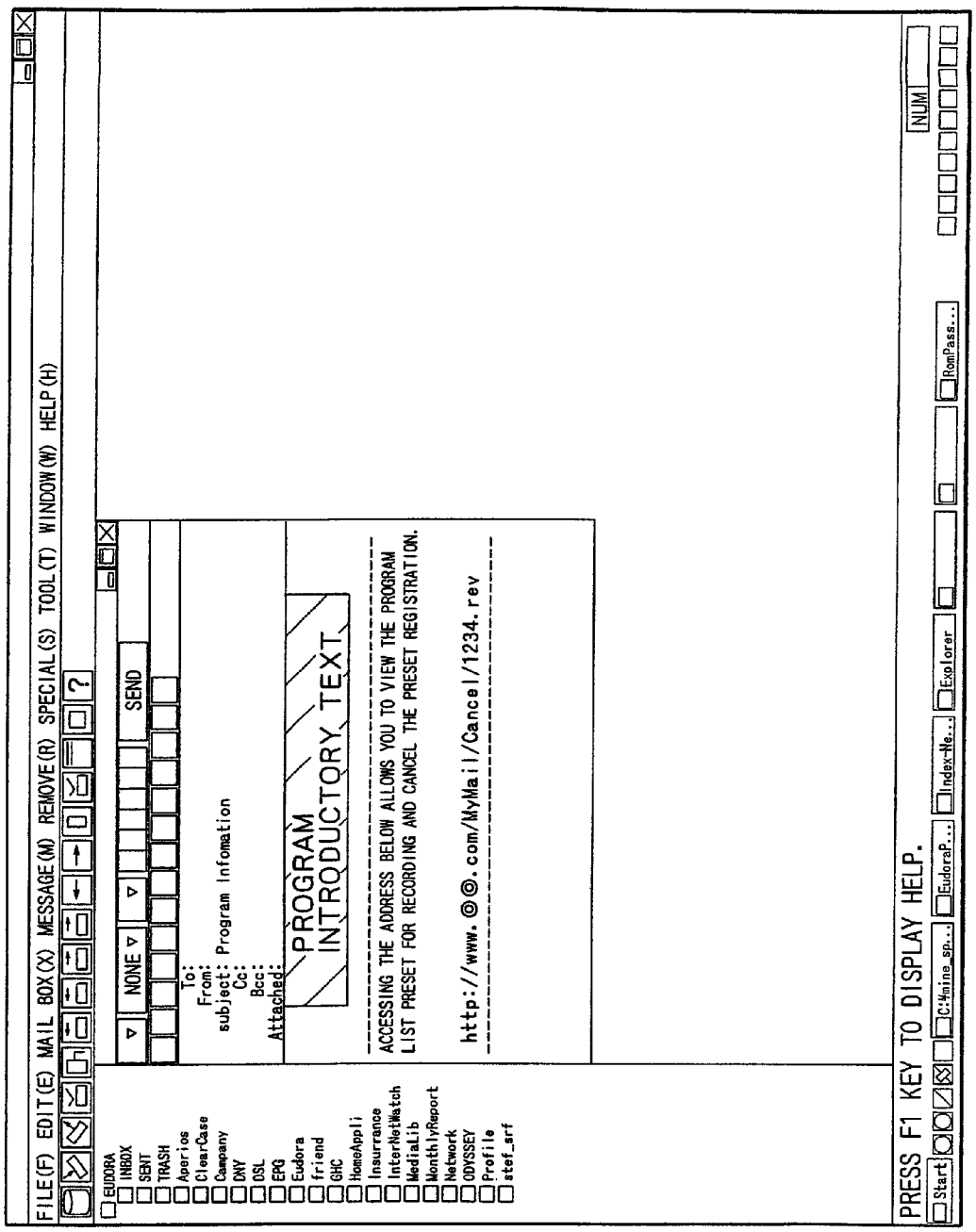
FIG. 16 illustrates an exemplary electronic mail attached with a URL for moving to the program recording preset cancel mode, the electronic mail being sent from the program information providing apparatus to the portable terminal apparatus in the program recording preset system of FIG. 1.

If at least one instance of program recording preset has been made, the electronic mail message to be sent from the program information providing apparatus 3 to the portable terminal apparatus 2c in step S31 is attached with a cancel URL like "http://www.⊙⊙.com/MyMail/Cancel/1234.rev" as shown in FIG. 16 for example. This cancel URL identifies the user and indicates the capabilities which can be executed by accessing it.

Figure 17:
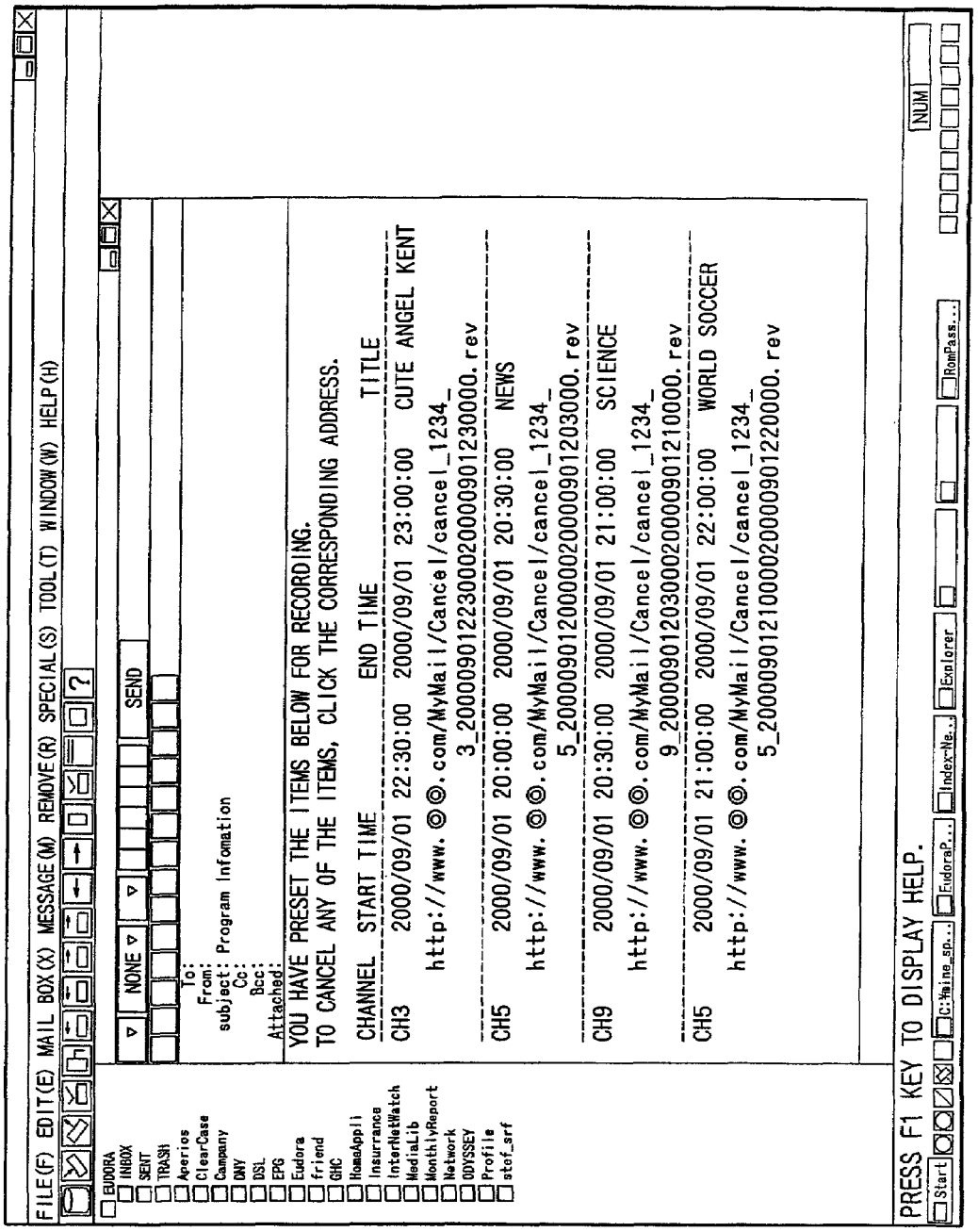
FIG. 17 illustrates an exemplary electronic mail attached with a URL for selecting a program of which program recording preset is canceled, the electronic mail being sent from the program information providing apparatus to the portable terminal apparatus in the program recording preset system of FIG. 1.

"Cancel" in the cancel URL shown in FIG. 16 indicates that this cancel URL functions to invalidates the program recording preset already made, "1234" indicates the user identifier for identifying the user of the program recording preset system 1. To cancel the program recording preset already made, the user clicks the cancel URL through the portable terminal apparatus 2c. When the cancel URL is clicked, the controller of the program information providing apparatus 3 searches the database 3b for a program recording preset log of this user not yet recorded by the recording section of the terminal apparatus 4 or by the recording apparatus 5 out of the program recording preset logs of each user. On the basis of the retrieved program recording preset log, the controller of the program information providing apparatus 3 generates a program recording preset cancel electronic mail message attached with a program recording preset cancel URL and sends this electronic mail to the portable terminal apparatus 2c. Receiving this electronic mail, the controller of the portable terminal apparatus 2b displays the received electronic mail on the display section 12c by use of the mailer software stored in the storage unit of the portable terminal apparatus 2c. For example, the controller of the portable terminal apparatus 2c displays on the display section 12c a program recording preset cancel electronic mail message as shown in FIG. 17. This electronic mail provides such information about each program preset for program recording as "Channel" (for example, CH3), "Recording Start Time" (for example, 2000/09/01 22:30:00"), "Recording End Time" (for example, 2000/09/01 23:00:00), and "Title" (for example, Cute Angel Kent). The recording program preset cancel URL is shown like "http://www.☉☉.com/MyMail/Cancel/cancel__1234__3__20000901223000200009012 30000.rev" for example. The cancel URL identifies the user and indicates the capabilities which can be executed by accessing it. In this URL, "Cancel" indicates that this URL is intended for canceling the program recording preset already made, "1234" indicates the user identifier for identifying the user of the program recording preset system 1, "3" indicates the channel number of the program, "20000901223000" indicates the program start date and time (22:30 on Sep. 1, 2000), and "20000901230000" indicates the program end date and time (23:00 on Sep. 1, 2000).

Next, when the user clicks the program of which program recording preset is to be canceled out of the programs preset for recording displayed on the display section 12c of the portable terminal apparatus 2c, the information thereof is sent to the program information providing apparatus 3. In response, the controller of the program information providing apparatus 3 generates a cancel script for invalidating the recording preset of the selected program. The generated program is sent from the program information providing apparatus 3 to the terminal apparatus 4 to be converted into a control signal suitable for the recording section of the terminal apparatus 4 or for the recording apparatus 5 for which the program has been preset for recording. The converted control signal is then sent to this recording section of the terminal apparatus 4 or the recording apparatus 5. In response, the recording section of the terminal apparatus 4 or the recording apparatus 5 invalidates the specified program recording preset. When the program recording preset has been invalidated, the corresponding program recording preset log is deleted and then registered as a canceled log with the corresponding user account in the database 3b of the program information providing apparatus 3.

Figure 18:
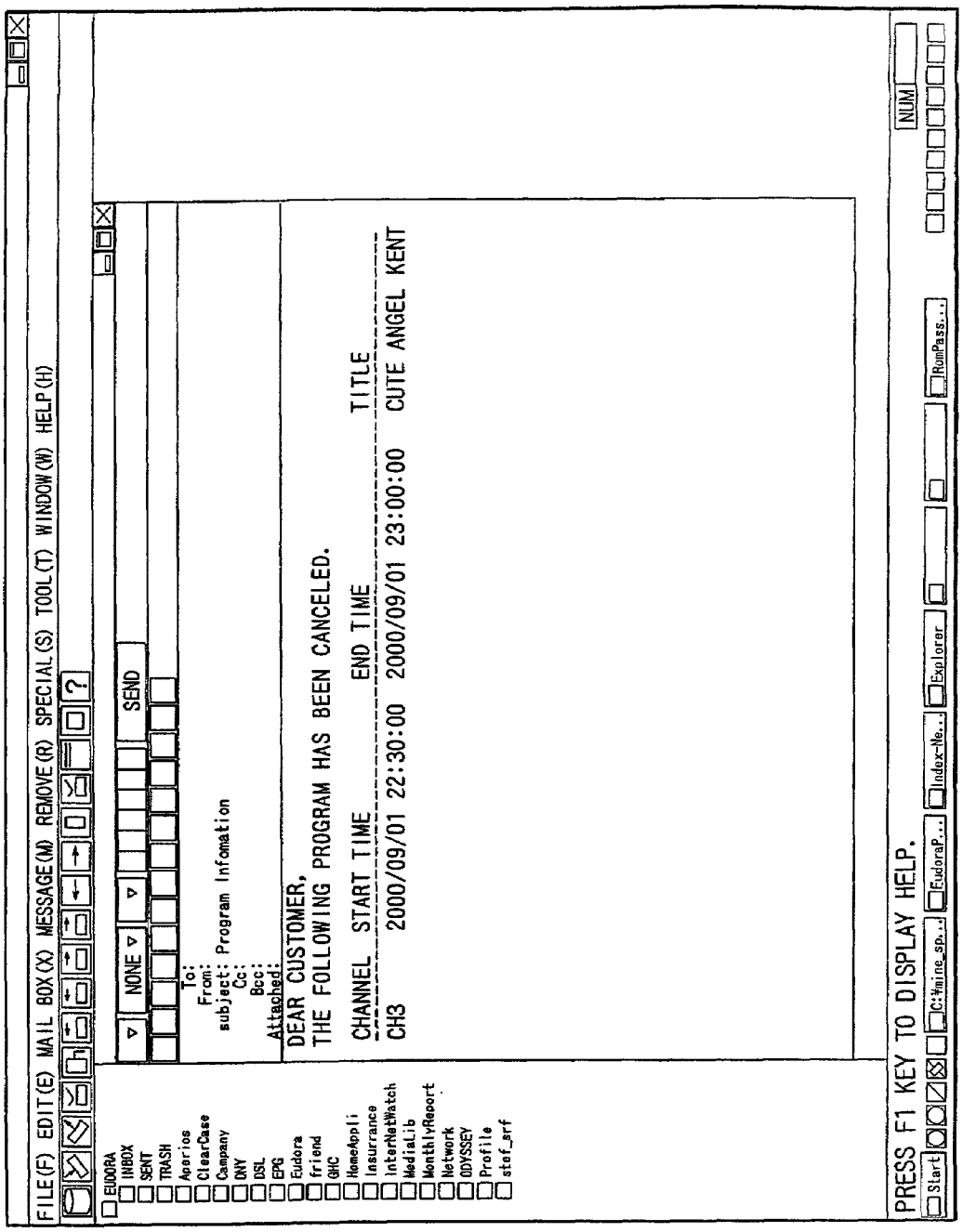
FIG. 18 illustrates an exemplary electronic mail indicating that the program recording preset has been canceled, the electronic mail having been sent from the program information providing apparatus to the portable terminal apparatus in the program recording preset system of FIG. 1.

In addition to the generation of the cancel script, the controller of the program information providing apparatus 3 sends a execution confirmation electronic mail message indicative of the cancellation of the program recording preset to the portable terminal apparatus 2c. The controller of the portable terminal apparatus 2c displays the received electronic mail as shown in FIG. 18 for example on the display section 12c of the portable terminal apparatus 2c. This electronic mail provides information such as "Channel" indicative of the program for which the cancellation has been executed, "Recording Start Time," "Recording End Time," and "Title."

As described, in the program recording preset system 1, a program chart stored in the database 3a of the program information providing apparatus 3 is displayed on the display section 12a of the portable terminal apparatus 2a through the Web browser for the user, the user enters a request for the recording preset of a particular program from the portable terminal apparatus, and the program information providing apparatus 3 accordingly generates a program recording preset script, thereby presetting the program recording on a desired recording section of the terminal apparatus 4 or on a desired recording apparatus 5.

Further, in the program recording preset system 1, electronic mail attached with the program information stored in the database 3a of the program information providing apparatus 3 and a URL linked therewith is sent to the portable terminal apparatuses 2b and 2c and, in response to the access to this URL from these portable terminal apparatuses, the program information providing apparatus 3 generates a program recording preset script, thereby presetting recording of a desired program to the recording section of the terminal apparatus 4 or to the recording apparatus 5.

It should be note that, in the above-mentioned direct access mode, first mail access mode, and second mail access mode, CGI (Common Gateway Interface) may be used on the program information providing apparatus 3 to transfer/receive information on an http basis, thereby presetting program recording.

CGI starts a program requested by a WWW (World Wide Web) server in response to a request by a client in a server-client type network and returns a processing result of this program to the client. A program started by a WWW server is referred to as a CGI script.

The program for generating the program recording preset script or program recording preset cancel script in the above-mentioned direct access mode, first mail access mode, and second mail access mode is equivalent to this CGI script. The CPI script is stored in a storage unit, not shown, of the program information providing apparatus 3. In the direct access mode, the program is started when accessed from a program chart. In the first and second mail access modes, the program is started when the URL attached to electronic mail sent to the portable terminal apparatus 2b or 2c is clicked by the user.

The following describes a URL for starting a CGI script attached to electronic mail to be sent to the portable terminal apparatus 2b in the first mail access mode in which the portable terminal apparatus 2b is used. As described in step S21 above, the program information providing apparatus 3 sends via the Internet to the portable terminal apparatus 2b an electronic mail attached with a program introductory text and a URL for identifying program channel, program broadcast time, and program end time. When the program information providing apparatus 3 uses CGI, this URL, for example, "http://www.☉☉.com/MyMail/RecordSet/1234__5__200009012100002000090122000.html" is replaced with a URL "http://www.☉☉.com/MyMail/Record.cgi?userID=1234&InfraID=1&StationID=3&start=200009 01210000&end=20000901220000."

This URL is an address indicative of the CGI location on a Web server, "?" and subsequent information being parameters for starting the CGI script.

These parameters are "userID" which is "1234" for example, "InfraID" which is "1" for ground broadcast, "2"

for CS broadcast, and "3" for BS broadcast for example, "StationID" which is "3" for example, "start" which is "20000901210000" indicative of program start date and time (21:00 on Sep. 1, 2000) for example, and "end" which is "20000901220000" indicative of program end date and time (22:00 on September, 2000) for example. Each parameter is preceded with "&."

The following describes the operations for generating a program recording preset script and presetting program recording by accessing the above-mentioned URL.

First, when the user clicks the above-mentioned URL through the portable terminal apparatus 2b, a script generating instruction for generating a program recording preset script and such program information as broadcast station, broadcasting means, and broadcast start and end times are sent to the program information providing apparatus 3 to be stored in the user account of the database 3b.

The terminal apparatus 4 periodically operates on the basis of its timer and power controller for example, establishing an Internet session with the program information providing apparatus 3.

When the Internet session has been established between the program information providing apparatus 3 and the terminal apparatus 4, the program recording preset script pickup software stored in the storage unit, not shown, of the terminal apparatus 4 accesses the program information providing apparatus 3 by use of the authentication information such as user login ID and password, thereby performing user authentication for using a CGI script for generating a program recording preset script stored in the storage unit, not shown, of the program information providing apparatus 3. When the user authentication has been completed, the CGI script generates a program recording preset script from a script generating instruction stored for each user account in the database 3b and the program information and sends the generated script to the terminal apparatus 4. The terminal apparatus 4 sends the received program recording preset script to its recording section or to the recording apparatus 5, thereby presetting program recording.

When a program has been preset for recording on the basis of the program recording preset script, the program information providing apparatus 3 sends information whether the program recording preset has been successful or not to the portable terminal apparatus 2b.

First, when a program has been preset for recording by the program recording preset script, the terminal apparatus 4 accesses the program information providing apparatus 3 by use of the authentication information to execute user authentication for using a CGI script for reporting program recording preset result to send to the portable terminal apparatus 2b whether the program recording preset stored in the storage unit, not shown, of the program information providing apparatus 3 has been executed or not. When the user authentication has been completed, the CGI script for reporting program recording preset result generates an electronic mail message by use of the program information as parameters and sends the generated electronic mail message to the portable terminal apparatus 2b.

Further, the terminal apparatus 4 sends the information about the program preset for recording in its recording section or the recording apparatus 5 to the program information providing apparatus 3 to cause the same to generate a log of the program preset for recording.

First, the terminal apparatus 4 accesses the program information providing apparatus 3 by use of authentication information to execute user authentication for using a CGI script for generating a program recording preset log for generating a log of the program preset for recording stored in the storage unit, not shown, of the program information providing apparatus 3. When the user authentication has been completed, the program recording preset log generating CGI script generates a program recording preset log of the program preset for recording by use of the information about that program as parameters. The generated program recording preset log is sent to the terminal apparatus 4 to be stored in its storage unit, not shown.

Further, the terminal apparatus 4 sends the information about the program recorded on a recording medium by the recording section of the terminal apparatus 4 or by the recording apparatus 5 to the program information providing apparatus 3 to cause the same to generate a log of the program which has been recorded on the recording medium of the program information providing apparatus 3.

First, the terminal apparatus 4 accesses the program information providing apparatus 3 by use of authentication information and executes user authentication for using a CGI script for program recording completion log generating for generating a log of the program preset for recording which has been recorded on the recording medium and stored in the storage unit, not shown, of the program information providing apparatus 3. When the user authentication has been completed, the program recording completion log generating CGI script generates a program recording completion log of the program by use of the information of the program recorded to the recording medium as parameters. The generated program recording completion log is sent to the terminal apparatus 4 to be stored in its storage unit, not shown.

Thus, the communication on the basis of http (Hyper Text Transfer Protocol) or https (Hyper Text Transfer Protocol Secure) by use of CGI in the program information providing apparatus 3 can change the default recording section of the terminal 4 or the default recording apparatus 5 in generally the same manner as described above.

The above-mentioned process of generating a program recording preset script also applies to a process of generating a cancel script, in which the user clicks a cancel URL attached to an electronic mail message sent to the portable terminal apparatus 2b to access a cancel CGI script stored in the storage unit, not shown, of the program information providing apparatus 3, thereby generating a cancel script for invalidating the recording preset of a program set to the recording section of the terminal apparatus 4 or to the recording apparatus 5.

In the direct access mode using the portable terminal apparatus 2a or the second mail access mode using the portable terminal apparatus 2c, CGI can be used to execute all of the above-mentioned operations, such as the program recording preset by use of a program recording preset script, the program recording preset cancellation by use of a cancel script, and the changing of the default recording section of the terminal apparatus 4 or the default recording apparatus 5.

Thus, the communication between the program information providing apparatus 3 and the terminal 4 between which an Internet session has been established is executed on the basis of http or https, which is a protocol obtained by adding security capabilities to http, and various CGI scripts stored in the storage, not shown, of the program information providing apparatus 3 are used, thereby enhancing the user-friendliness in presetting the program recording in the program recording preset system 1 as well as the security against the information leakage in information transaction.

When personal information is communicated between the portable terminal apparatuses 2a, 2b, and 2c, the program information providing apparatus 3, and the terminal apparatus 4, between which an Internet session has been established, https is used as a communication protocol, thereby enhancing security to prevent the personal information from leaking.

The following describes the charging processing to be executed in the program recording preset system 1 practiced as one embodiment of the present invention.

The program information providing apparatus 3 of the program recording preset system 1 shown in FIG. 1 has a charging processing unit, not shown. When program recording is preset to the recording section of the terminal apparatus 4 or to the recording apparatus 5 or this presetting is canceled, the charging processing unit charges the user for the setting or cancellation. It should be noted that the charging processing indicates that, when the program recording is preset, the user is billed, and when the setting is canceled, the billing is also canceled.

For example, when a program recording preset script generated by the program information providing apparatus 3 is sent to the terminal apparatus 4 and an operation for program recording preset with a program recording preset script to the recording section of the terminal apparatus 4 or to the recording apparatus 5 or canceling the program recording preset with a program recording preset cancel script has been successful, the program recording preset script pickup software stored in the storage, not shown, of terminal apparatus 4 accesses the above-mentioned program recording preset result report CGI script stored in the storage unit, not shown, of the program information providing apparatus 3 by use of the program information and the user authentication information as parameters. In response, the program recording preset result report CGI script generates an electronic mail message indicative of that the program recording preset or the cancellation program recording setting has been made and sends the generated electronic mail message to the portable terminal apparatus 2a, 2b, and 2c. At the same time, the program information providing apparatus 3 performs a charging process on the user who has made the program recording preset or cancel it.

Further, the amount of money to be charged for the terminal apparatus 4 by the charging processing unit depends on which of the program information providing apparatus 3 and the terminal apparatus 4 accesses a public switched phone line when establishing an Internet session between them. As described with step S12 of FIG. 3, if the program information providing apparatus 3 accesses the terminal apparatus 4, an amount obtained by adding the telephone charge for the access to the usage fee of the program recording preset system 1 is billed from the charging processing unit to the terminal apparatus 4. As described with step S13 of FIG. 3, if the terminal apparatus 4 accesses the program information providing apparatus 3, the telephone charge is billed from the telephone company directly to the terminal apparatus 4, so that only the usage fee of the program recording preset system 1 is billed from the charging processing unit to the terminal apparatus 4.

Thus, in the program recording preset system 1, the user can preset recording of a desired program from the portable terminal apparatus 2 to the recording section of the terminal apparatus 4 or to the recording apparatus 5 and the arrangement of the charging processing unit can perform a charging process on the user.

The portable terminal apparatuses 2a, 2b, and 2c in the present embodiment are different from one another in device type. It will be apparent that these apparatuses may be of the same device type.

The present embodiment is described by use of the portable terminal apparatus 2a, 2b, and 2c, which are a mobile telephone, a PDA, or a portable PC, as devices from which commands such as generating a program recording preset script is inputted. It will be apparent that, instead of the portable terminal apparatus 2a, 2b, and 2c, the program recording preset system 1 may be constituted by a PC having the equivalent capabilities.

Figure 19:
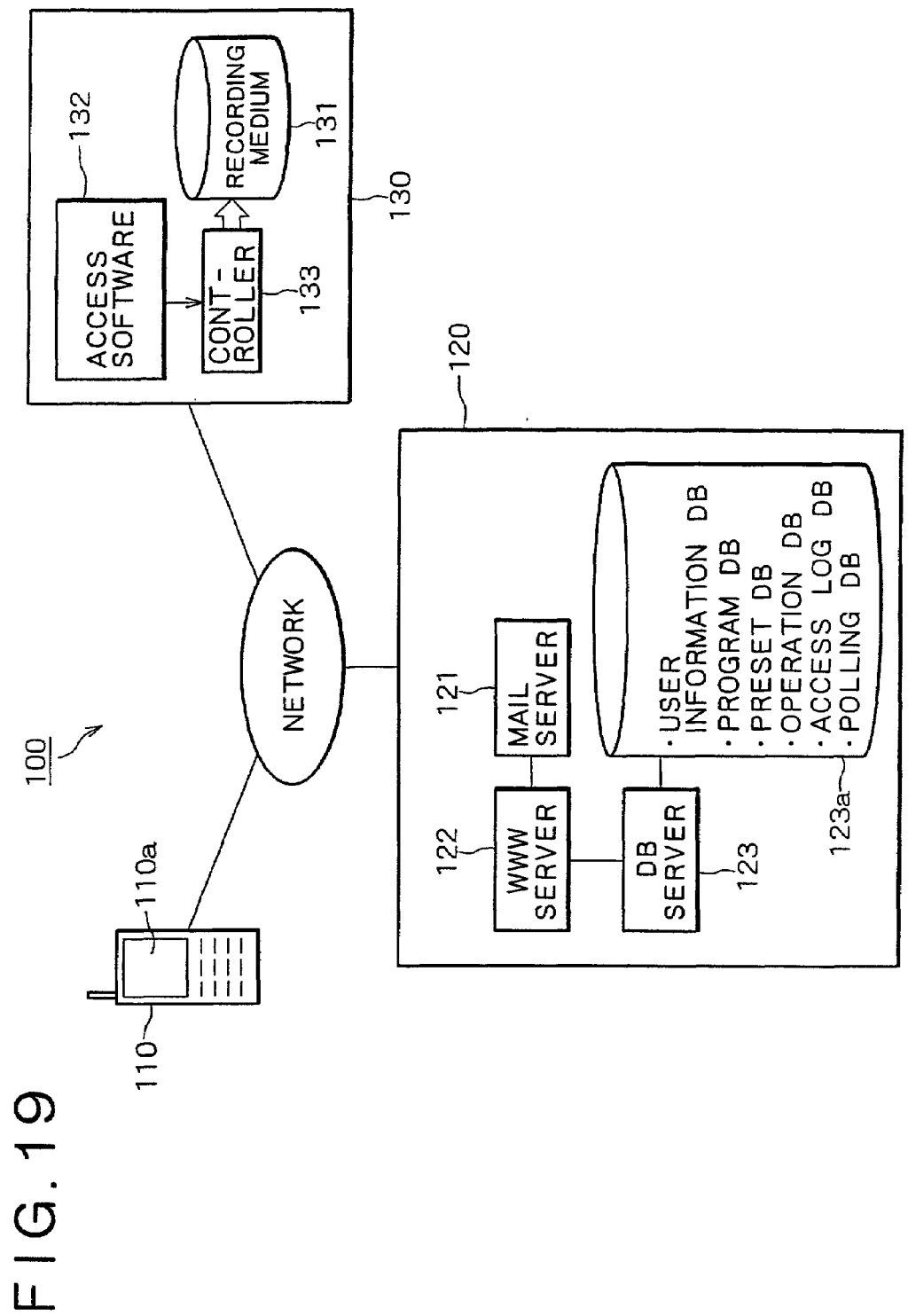
FIG. 19 is a schematic diagram illustrating a configuration of a program recording preset system practiced as a second embodiment of the invention.

The following describes, with reference to FIG. 19, a program recording preset system 100 practiced as a second embodiment of the present invention by adapting the above-mentioned program recording preset system 1 to more actual services.

The program recording preset system 100 has a portable terminal apparatus 110, a server apparatus 120, and a terminal apparatus 130.

The portable terminal apparatus 110, which is a portable wireless telephone unit having a display section 110a based on an LCD for example, has a mailer software program for transferring/receiving electronic mail to and from a storage unit, not shown of this apparatus and a browser software program for downloading predetermined HTML (Hyper Text Modeling Language) data from a WWW server 122 of the server apparatus 120, analyzing the downloaded HTML data, and displays it on the display section 110a.

The server apparatus 120 has a mail server 121, the WWW server 122, and a database server 123 to be a start point of the service provision in the program recording preset system 100, manage the user information about users of the services of this system, and generate a program recording preset script, which is a control command for executing the program recording preset on the terminal apparatus 130.

Electronic mail generated by the mail server 121 and sent to the portable terminal apparatus 110 comprises visit mail and operation result mail.

The visit mail is attached with a URL for accessing the WWW server 122 of the server apparatus 120, which is generated at a predetermined time and sent to the portable terminal apparatus 110. When the user clicks through the portable terminal apparatus 110 the URL attached to the visit mail, a session is established with the server apparatus 120, thereby making the user ready for receiving various services from the server apparatus 120.

The operation result mail carries a result of the command execution by the server apparatus 120 in response to a command supplied from the portable terminal apparatus 110 by the user.

The WWW server 122 has a plurality of CGI scripts for executing programs which execute predetermined operations in accordance with the parameters written in the URL. For example, these CGI scripts generate a program chart as requested from the portable terminal apparatus 110 or the terminal apparatus 130, send the generated program chart via the Internet, and generate a program recording preset script, which is a control command for program recording preset.

The database server 123 has and manages a database 123a storing all data associated with the program recording preset system 100, such as the user information about the user of this system and the program information about programs which can be preset for recording in this program recording preset system 100.

The database 123 is constituted by a plurality of databases to store the above-mentioned data associated with the program recording preset system 100 as classified by type. The following describes, by way of example, these databases (hereafter also referred to as DBs) of the database 123a managed by the database server 123.

The database 123a has a user information DB storing such personal information about the user of the program recording preset system 100 as user ID and password for example, a program DB storing the information about the programs which can be preset for recording in the program recording preset system 100, a preset DB for storing the information about the programs which have been preset for recording by the user, an operation DB storing operation scripts, an access log DB storing a log describing the access by the terminal apparatus 130 to the server apparatus 120, and a polling DB storing a log of the times at which an access software program of the portable terminal apparatus 110 has periodically accessed the server apparatus 120.

The terminal apparatus 130 is a PC having a ground wave television tuner, not shown, for receiving ground television signals transmitted from a television station, not shown, a recording medium 131 such as a HDD (Hard Disk Drive), and a recording section, not shown, for recording the received television signals to the recording medium 131.

The terminal apparatus 130 has a display section, not shown, for displaying programs transmitted from the television station for viewing by the user.

A recording section 132 of the terminal apparatus 130 stores access software for periodically accessing the server apparatus 120 to download a program recording preset script generated in the WWW server 122 and convert the downloaded script into a control signal suitable for the above-mentioned recording section.

A controller 133 of the terminal apparatus 130 controls the same so as to automatically record a program received at the ground wave tuner onto the recording medium in accordance with the control signal converted from the program recording preset script by the above-mentioned access software.

Figure 20:
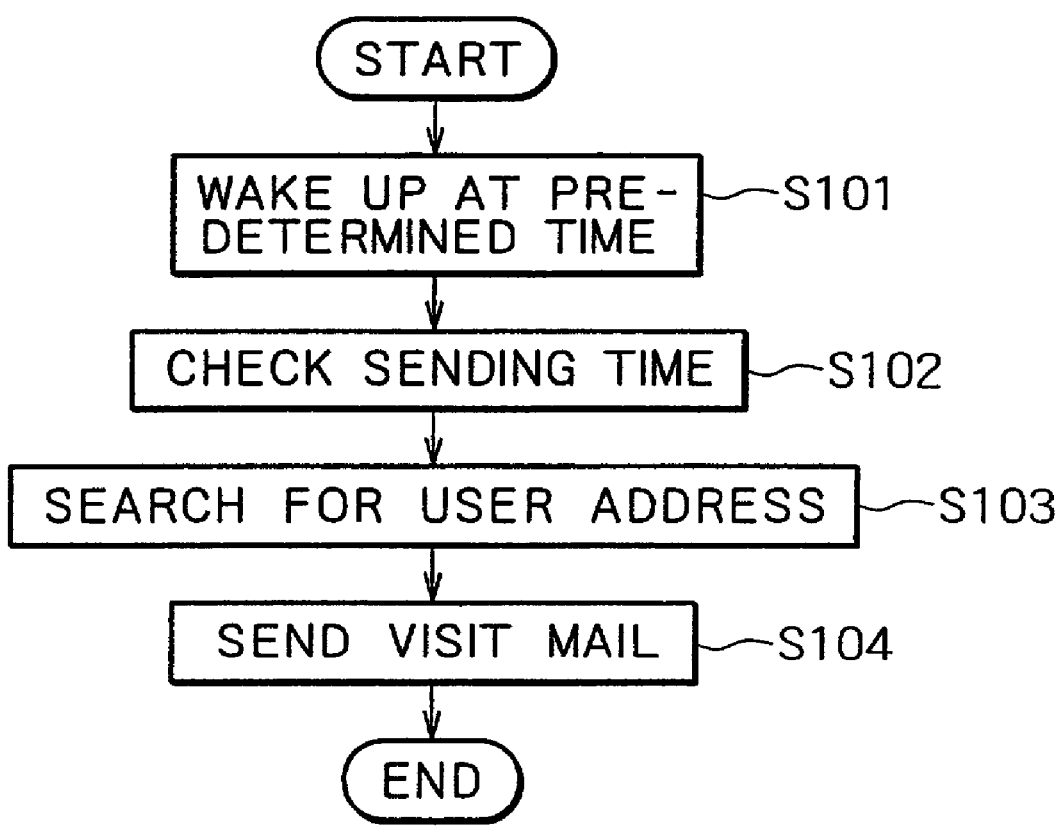
FIG. 20 is a flowchart describing an operation to be performed when an electronic mail is sent from a server apparatus to a portable terminal apparatus in the program recording preset system of FIG. 19.

The following describes a processing operation to be executed for program recording preset in the program recording preset system 100 with reference to the flowchart shown in FIG. 20.

First, the mail server 121 of the server apparatus 120 starts at a predetermined time (step S101), checks a visit mail sending time (step S102), searches the database 123a for the mail address of a predetermined user from among the addresses of the users registered for the use of the program recording preset system 100 (step S103), and generates a visit mail message attached with a URL for accessing the server apparatus 120 and sends the generated visit mail message to the portable terminal apparatus 110 (step S104).

The portable terminal apparatus 110 receives the visit mail message from the mail server 121 and displays the visit mail message on the display section 110a by use of the mailer software stored in its storage section, not shown.

At this moment, the visit mail message as shown in FIG. 21 for example is shown on the display section 110a of the portable terminal apparatus 110. The URL attached to the visit mail message is "https://www.rompass.com/imode/remote/index.html?LoginID=1234567" for example, in which user "LoginID" is preset to "1234567" as parameter. Consequently, when the user accesses the server apparatus 120 from the portable terminal apparatus 110 via this URL, the server apparatus 120 can identify which user has made this access request.

When the user accesses the URL attached to the visit mail message from the portable terminal apparatus 110, a controller, not shown, of the portable terminal apparatus 110 immediately starts a browser stored in its storage section, not shown. This browser accesses the WWW server 122 of the server apparatus 120 to request for HTML information described in the URL.

Figure 22:
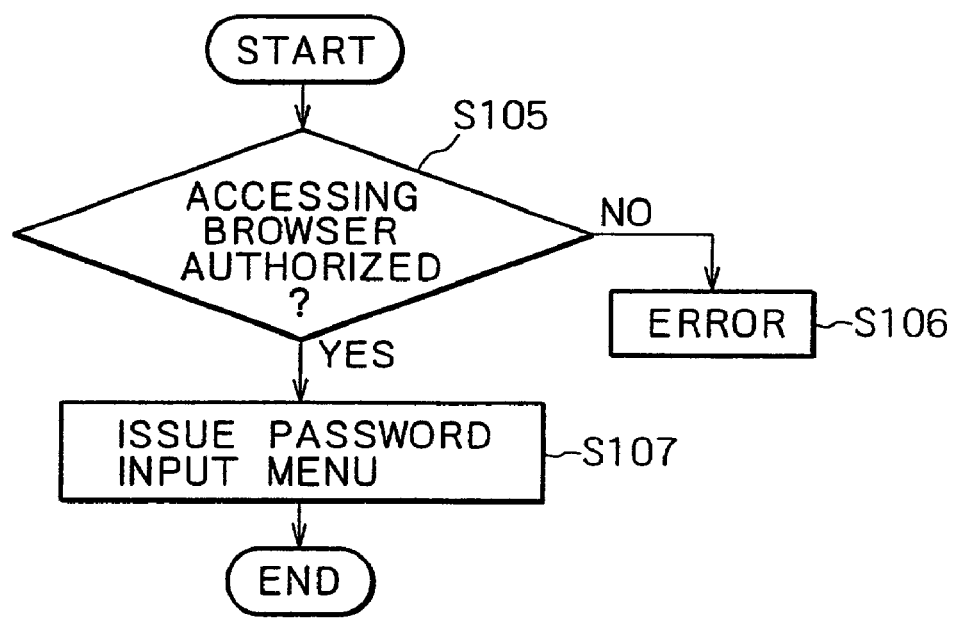
FIG. 22 is a flowchart describing an operation to be performed when a password is entered from the portable terminal apparatus in the program recording preset system of FIG. 19.

In response, as shown in the flowchart shown in FIG. 22, the WWW server 121 determines whether the accessing browser is the predetermined browser of the portable terminal apparatus 110 authorized by the program recording preset system 100 (step S105). If this browser is found not authorized, the WWW server 121 sends an error message to the portable terminal apparatus 110 (step S106). If the browser is found authorized, the WWW server 121 issues an authentication menu screen written in HTML to the portable terminal apparatus 110, requesting password entry (step S107).

Figure 23:
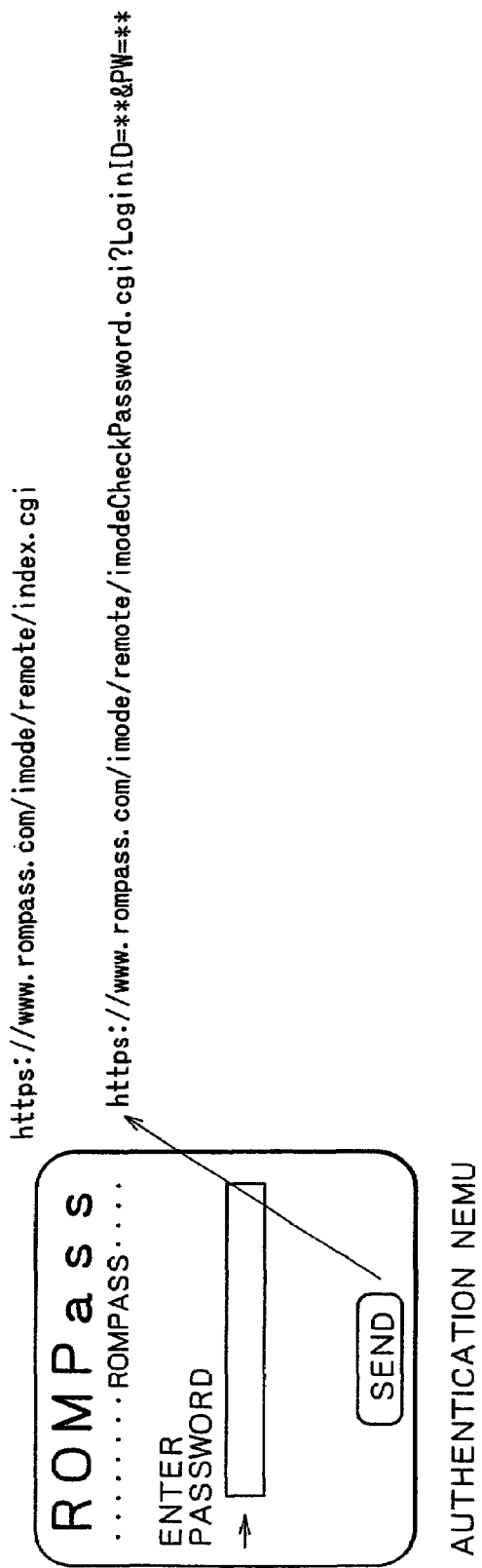
FIG. 23 illustrates a screen displayed on a display section of the portable terminal apparatus for prompting password entry in the program recording preset system of FIG. 19.

The browser of the portable terminal apparatus 110 receives the HTML information from the WWW server 122, analyzes it, and displays an authentication menu screen as shown in FIG. 23 on the display section 110a.

The authentication menu screen has a password entry box and "Send" button for sending the inputted password. This "Send" button corresponds to the URL of the WWW server 122 and the entered password provides a parameter of this URL. For example, the URL linked with the "Send" button is expressed like "https://www.rompass.com/imode/remote/imodeCheckPassword. cgi?LoginID=&PW=," the login ID being written after "LoginID=" and the password after "PW=."

When the user clicks "Send" button to access this URL, the browser of the portable terminal apparatus 110 accesses the WWW server 122 to request for the HTML information described in the URL.

Figure 24:
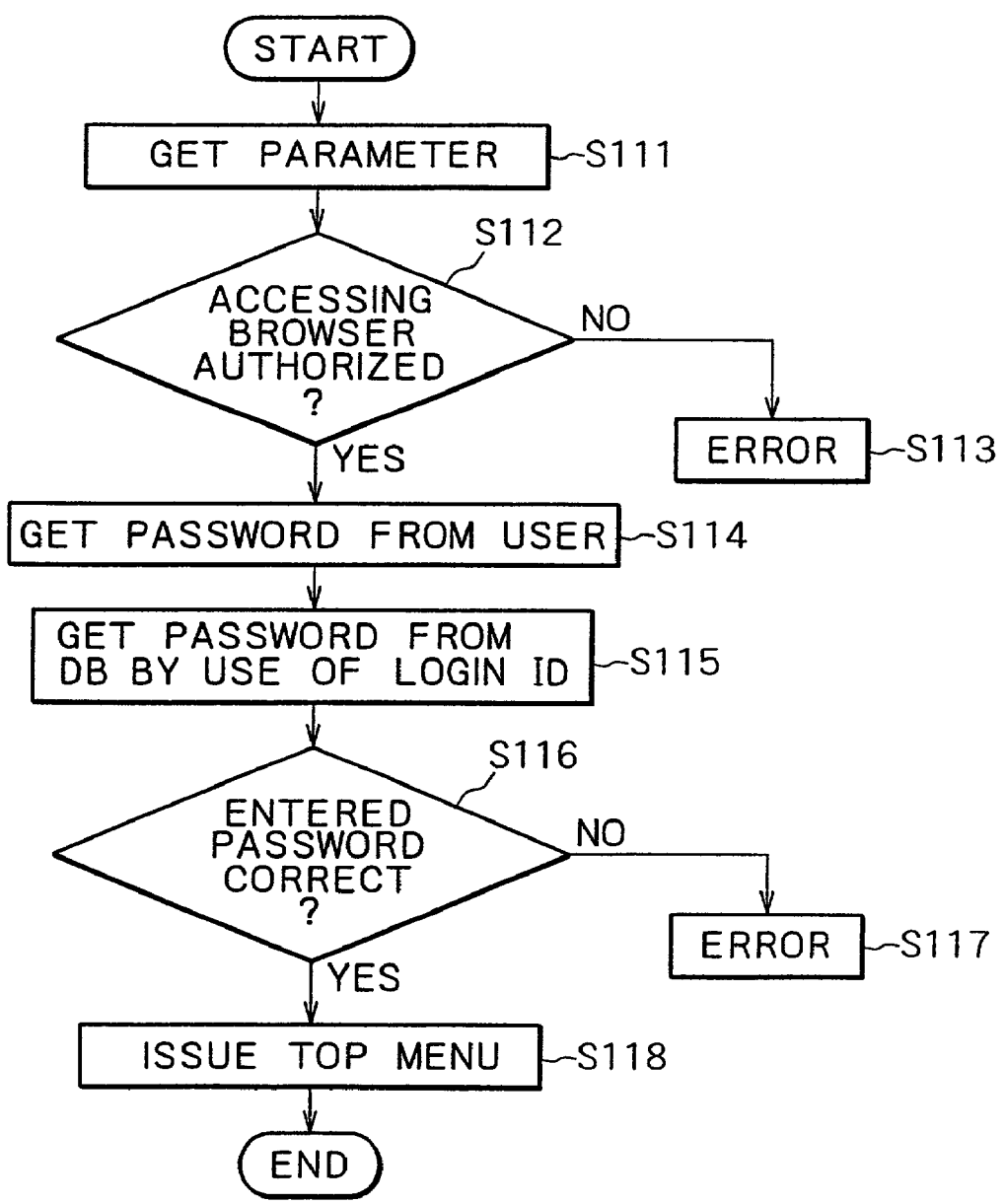
FIG. 24 is a flowchart describing an operation for authenticating by a server apparatus the password entered in the portable terminal apparatus in the program recording preset system of FIG. 19.

In response, as shown in the flowchart of FIG. 24, the WWW server 122 gets the parameter written in the URL (step S111) to determine whether the accessing browser is the predetermined browser of the portable terminal apparatus 110 authorized by the program recording preset system 100 (step S112). If the browser is found not authorized, the WWW server 122 sends an error message to the portable terminal apparatus 110 (step S113) If the browser is found authorized, the WWW server 122 gets the password written in the URL (step S114).

The CGI script of the WWW server 122 controls the database server 123 to search the passwords in the database 123a by use of the login ID written in the URL for the password of the user (step S115). Further, the CGI script determines whether the password retrieved by the database server 123 matches the password entered by the user (step S116). If a mismatch is found, the WWW server 122 sends an error message to the portable terminal apparatus 110 (step S117). If a match is found, the WWW server 122 issues a top menu screen written in HTML for selecting the mode for requesting the sending of a program chart or the mode for requesting a program recording preset list to the portable terminal apparatus 110 (step S118).

Figure 25:
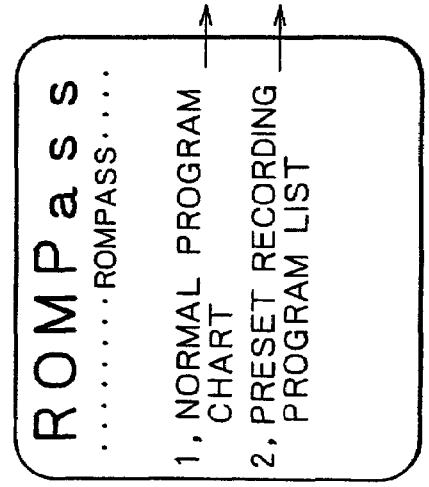
FIG. 25 illustrates a screen for selecting an item in a menu displayed on the display section of the portable terminal apparatus in the program recording preset system of FIG. 19.

The browser of the portable terminal apparatus 110 receives this HTML information from the WWW server 122, analyzes it, and displays an authentication menu screen as shown in FIG. 25 on the display section 110a.

The top menu screen lets the user select "1=Normal program chart" which is the mode for getting a program chart and "2=Preset recording program list" which is the mode for displaying a list of program already preset for recording. "1=Normal program chart" and "2=Preset recording program list" are linked with the URL of the WWW server 122 as follows. The URL is written as "https://www.rompass.com/imode/remote/OpRequest.cgi?LoginID=\*\*&PW=\*\*&COM=\*\*" having parameters "LoginID," "PW," and "COM." "COM=" is followed by a predetermined command; in this example, a command indicative of "1=Normal program chart" or "2=Preset recording program list" selected by the user becomes parameter. The browser of the portable terminal apparatus 110 accessing thus URL accesses the WWW server 122 to request for the transfer of the HTML information written in the URL.

Figure 26:
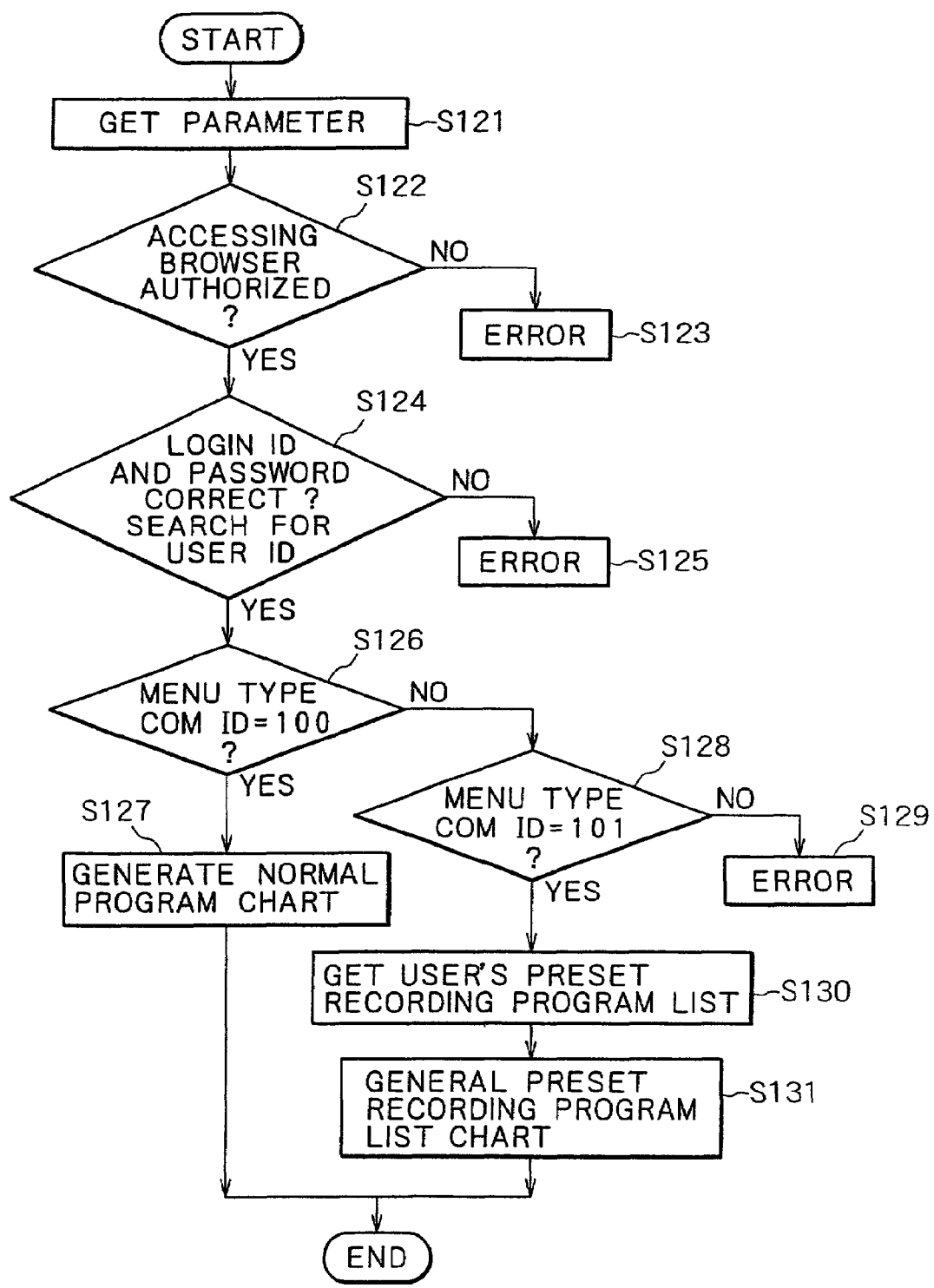
FIG. 26 is a flowchart describing an operation of the server apparatus when executing a menu item selected by the portable terminal apparatus in the program recording preset system of FIG. 19.

In response, as shown in the flowchart of FIG. 26, the WWW server 122 gets the parameter written in the URL (step S121) and determines whether the accessing browser is the predetermined browser of the portable terminal apparatus 110 authorized by the program recording preset system 100 (step S122). If the browser is found not authorized, the WWW server 122 sends an error message to the portable terminal apparatus 110 (step S123).

If the browser is found authorized, the database server 123 determines whether the login ID and password written in the URL match those stored in the database 123*a* (step S124). If a mismatch is found, the database server 123 sends an error message to the portable terminal apparatus 110 (step S125). If a match is found, then the database server 123 determines whether the command ID written in the URL is one that indicates "1=Normal program chart," for example, command ID=100 (step S126) If the command ID is found to be 100, an HTML program chart is generated by a predetermined CGI script stored in a storage unit, not shown, of the WWW server 122 (step S127).

If the command ID is not 100, then the database server 123 determines whether the command ID is 101 indicative of "2=Preset recording program list" for example (step S128). If the command ID is not found to be 101, then the database server 123 sends an error message to the portable terminal apparatus 110 (step S129). If the command ID is found to be 101, then, by use of a predetermined CGI script stored in the storage unit, not shown, of the WWW server 122, the database server 123 gets from the database 123*a* the preset recording program list of the programs already set for recording by the user (step S130) and generates a preset recording program list chart in HTML.

The generated program chart or the preset recording program list is sent to the portable terminal apparatus 110 to be analyzed by the browser and displayed on the display section 110*a*. Referring to the list shown on the display section 110*a*, the user selects a desired program to preset for recording or to cancel the program recording preset.

Figure 27:
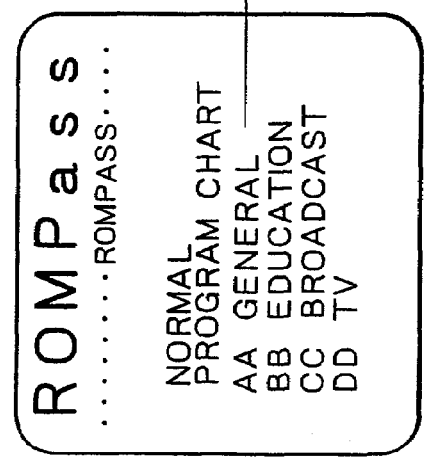
FIG. 27 illustrates an exemplary program chart to be displayed on the display section of the portable terminal apparatus in the program recording preset system of FIG. 19.

For example, if "1=Normal program chart" is selected on the screen shown in FIG. 25, then the server apparatus 120 generates a normal program chart and a broadcast station list as shown in FIG. 27 is displayed on the display section 110*a* of the portable terminal apparatus 110.

Each broadcast station in the list has its ID number. When the user selects a desired broadcast station, its ID is written to the URL as a parameter. For example, this URL becomes "https://www.rompass.com/imode/remote/Station.cgi?-LoginID=\*\*&PW=\*\*&STID=\*\*&DT=\*\*&STA=\*\*&LEN=\*\*." The login ID and the password, station ID, date of transmission of program chart, and time zone of transmission of program chart are written to each "\*\*" after "STID=," "DT=," "STA=," and "LEN=" respectively.

For example, if the user wants a program chart of a broadcast station called "AA General" for two hours starting from 19:00 of Mar. 29, 2000, and the ID of this broadcast station is "1," then the parameters become "STID=1," "DT=20000329," "STA=190000," and "LEN=020000."

When the user accesses this URL, the browser of the portable terminal apparatus 110 accesses the WWW server 122 of the server apparatus 120 to request for the transfer of the HTML information written in this URL.

Figure 28:
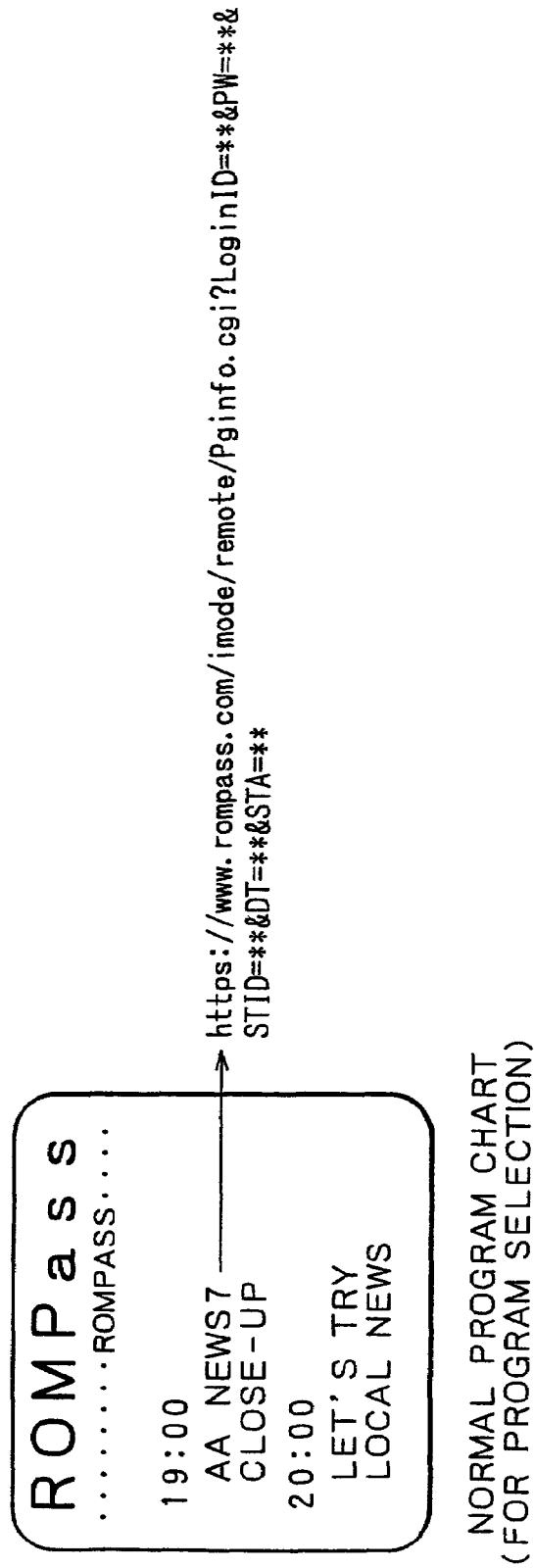
FIG. 28 illustrates another exemplary program chart to be displayed on the display section of the portable terminal apparatus in the program recording preset system of FIG. 19.

When the user accesses the URL having the parameters for broadcast station selection, a program select screen as shown in FIG. 28 is displayed on the display section 110*a* of the portable terminal apparatus 110, this program select screen letting the user to select any program from a plurality of programs, arranged in time sequence, to be broadcast from the listed station.

Referring to the screen on the display section 110*a* shown in FIG. 28, the user selects a desired program to be preset for recording.

Each program is linked to the URL for accessing the WWW server 122 of the server apparatus 120, the URL being attached with different parameters for different programs. For example, the URL becomes "https://www.rompass.com/imode/remote/Pginfo.cgi?LoginID=\*\*&PW=\*\*&STID=\*\*&DT=\*\*&STA=\*\*" having login ID, password, station ID, broadcast date, and broadcast start time as parameters.

If the user selects "AA News 7" to be broadcast at 19:00 for example, the URL is attached with "IDT=20000329" indicative of broadcast date (Mar. 29, 2000), and "STA=190000" indicative of broadcast start time (19:00) as parameters. Consequently, the program ("AA News 7") specified by the user can be identified.

The screen on the display section 110*a* shown in FIG. 28 can be scrolled by the user through an input section, not shown, of the portable terminal apparatus 110. If there are two or more programs preset for recording in the time zone specified in FIG. 27, the user can scroll the screen to any desired programs.

Figure 29:
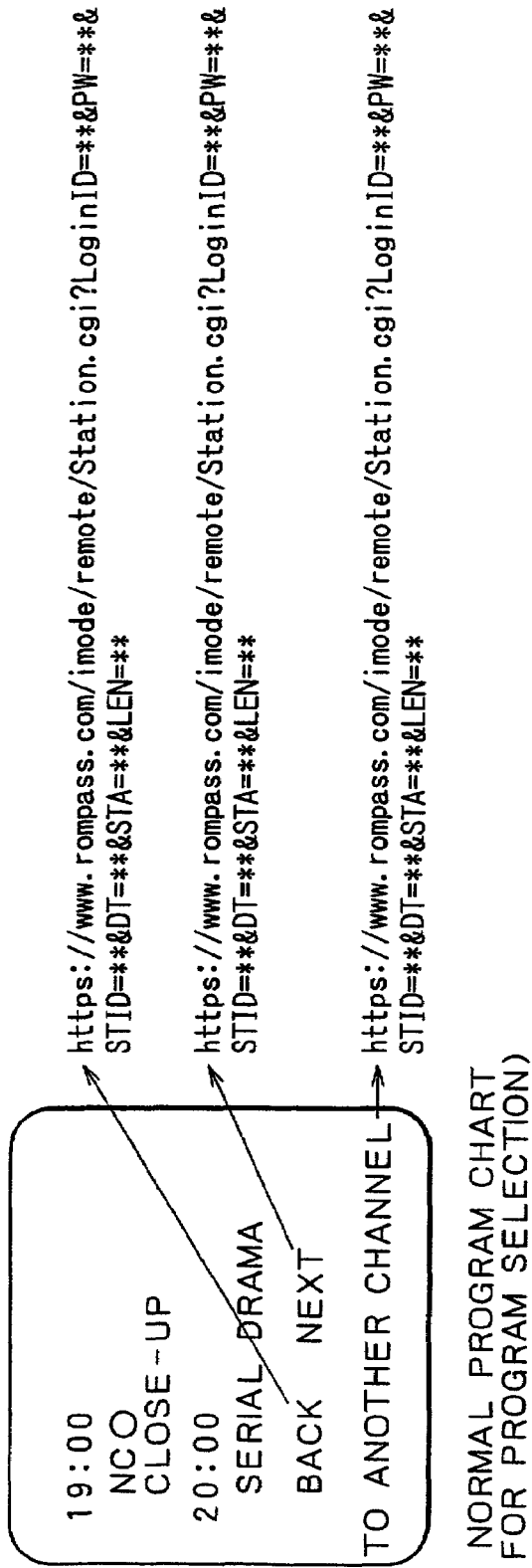
FIG. 29 illustrates still another exemplary program chart to be displayed on the display section of the portable terminal apparatus of the program recording preset system of FIG. 19.

Referring to FIG. 29, user clicks "Back" button to a program to be broadcast before the displayed time, "Next" button to a program to be broadcast after the displayed time, or "To Another Channel" button to a program to be broadcast from another station.

Each of these buttons shown in FIG. 29 is also linked to the URL corresponding to the WWW server 122, the URL having an parameter for identifying the corresponding button.

Figure 30:
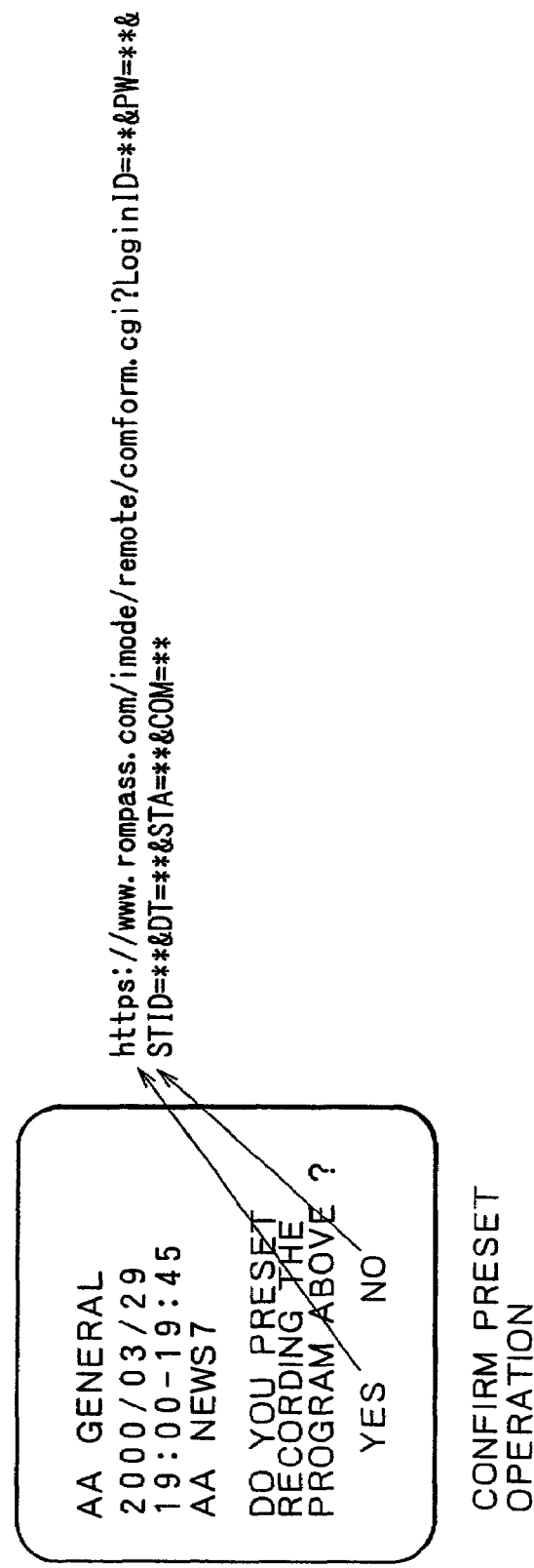
FIG. 30 illustrates an exemplary screen to be displayed on the display section of the portable terminal apparatus when determining the execution of program recording preset in the program recording preset system of FIG. 19.

When a program is selected by the user through the screen shown in FIG. 28 or 29, the browser of the portable terminal apparatus 110 gets the HTML information from the WWW server 122, analyzes the obtained HTML information, and displays a program recording preset operation confirming screen as shown in FIG. 30 on the display section 110*a*.

It is assumed here that program "AA News 7" of station "AA General" to be broadcast from 19:00 to 19:45 on Mar. 29, 2000 be selected by the user as shown in FIG. 28. The program recording preset operation screen has "Yes" button and "No" button for finally entering the decision by the user whether to preset program recording or not. To preset the recording of the program shown on the screen, the user clicks "Yes" button; otherwise, the user clicks "No" button. These buttons are linked with a URL shown below. When the user clicks one of the buttons, the browser of the portable terminal apparatus 110 searches the WWW server 122 of the server apparatus 120 to request for the sending of HTML information.

The URL linked to each button becomes "http://www.rompass.com/imode/remote/comform/.cgi?LoginID=\*\*&PW=\*\*&STID=\*\*&DT=\*\*&STA=\*\*&COM=\*\*", in which login ID, password, broadcast date, broadcast start time, and command ID being added as CGI script parameters. For the command ID, the ID number of a command for presetting program recording is attached to "&COM=" in the URL linked to "Yes" button and the ID number of command for not presetting program recording is attached to "&COM=" in the URL linked to "No" button.

Figure 31:
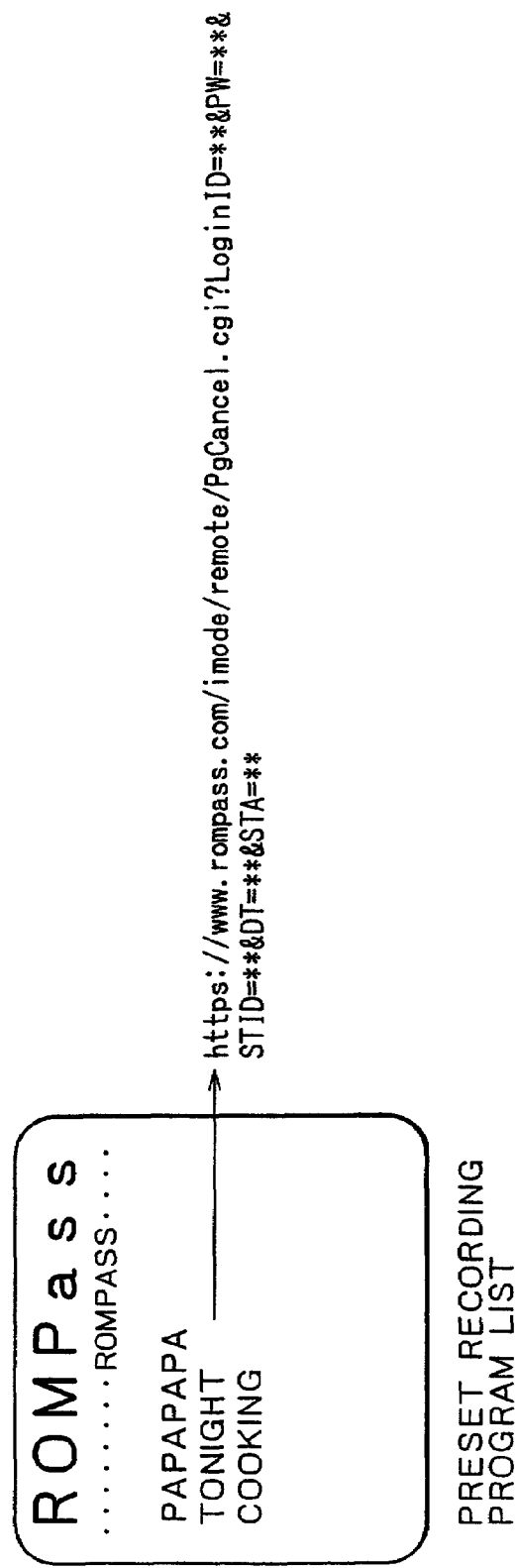
FIG. 31 illustrates an exemplary list of recording-preset programs, the list being displayed on the display section of the portable terminal apparatus in the program recording preset system of FIG. 19.

On the other hand, if "2, Program recording preset list" on the screen shown in FIG. 25 is selected, a program recording preset list is created in the server apparatus 120 and a list of programs preset for recording as shown in FIG. 31 is shown on the display section 110a of the portable terminal apparatus 110. Each listed program is linked with a URL for accessing the WWW server 122 of the server apparatus 120, each URL being attached with different parameters from those of another.

For example, the URL becomes "http://www.rompass.com/imode/remote/PgCancel/.cgi?LoginID=&PW= &STID=&DT=&STA=**2", in which login ID, password, broadcast station ID, broadcast date, and broadcast start time are added as parameters.

For example, if the user selected "PaPaPaPa", "20000328" is attached to "DT" indicative of broadcast date (Mar. 28, 2000) and "190000" is attached to "STA" indicative of broadcast start time (19:00) as parameters of the URL. Consequently, the user specified program "PaPaPaPa" is identified.

Figure 32:
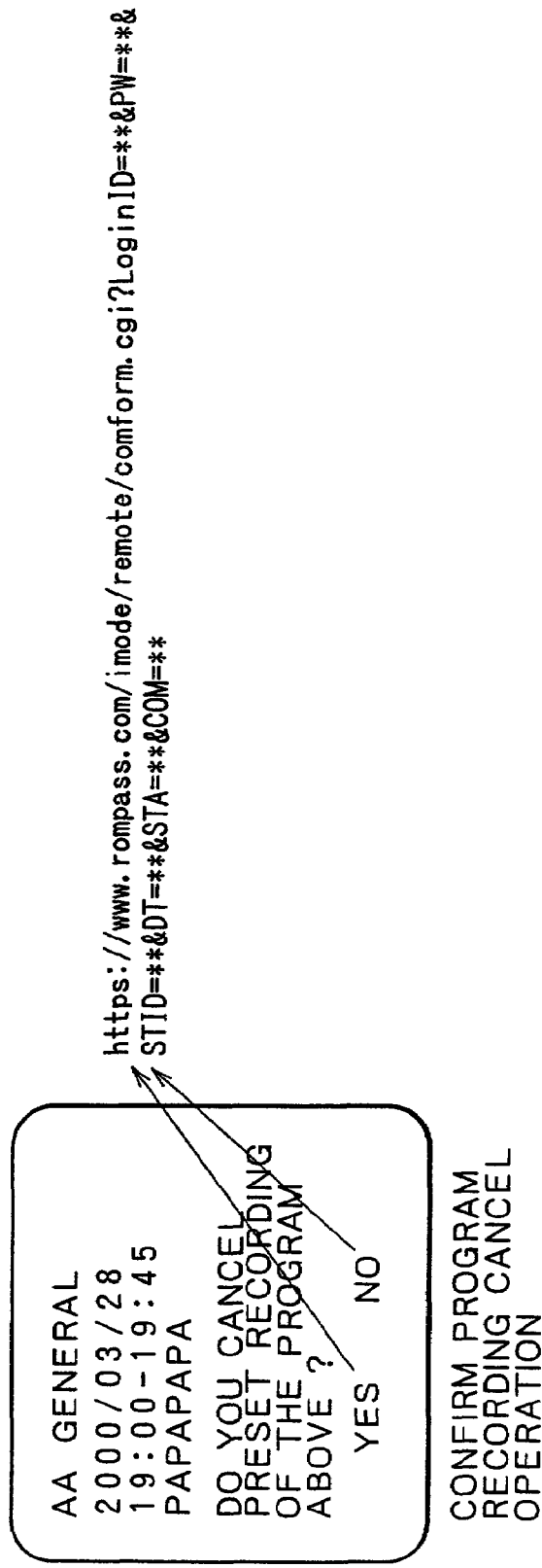
FIG. 32 illustrates an exemplary screen to be displayed on the display section of the portable terminal apparatus when clearing the program recording preset in the program recording preset system of FIG. 19.

When the user selected a desired program, the browser of the portable terminal apparatus 110 gets the HTML information from the WWW server 122, analyzes the retrieved HTML information, and displays a resultant program recording preset operation screen as shown in FIG. 32 on the display section 110a.

It is assumed here that program "PaPaPaPa" of station "AA General" to be broadcast from 19:00 to 19:45 on Mar. 28, 2000 be selected by the user. The program recording preset operation screen has "Yes" button and "No" button for finally entering the decision by the user whether to preset program recording or not. To preset the recording of the program shown on the screen, the user clicks "Yes" button; otherwise, the user clicks "No" button. These buttons are linked with a URL shown below. When the user clicks one of the buttons, the browser of the portable terminal apparatus 110 searches the WWW server 122 of the server apparatus 120 to request for the sending of HTML information.

The URL linked to each button becomes "http://www.rompass.com/imode/remote/comform/.cgi?LoginID=& PW=&STID=&DT=&STA=&COM=", in which login ID, password, broadcast date, broadcast start time, and command ID being added as CGI script parameters. For the command ID, the ID number of a command for canceling program recording preset is attached to "&COM=" in the URL linked to "Yes" button and the ID number of command for not canceling program recording preset is attached to "&COM=" in the URL linked to "No" button.

Figure 33:
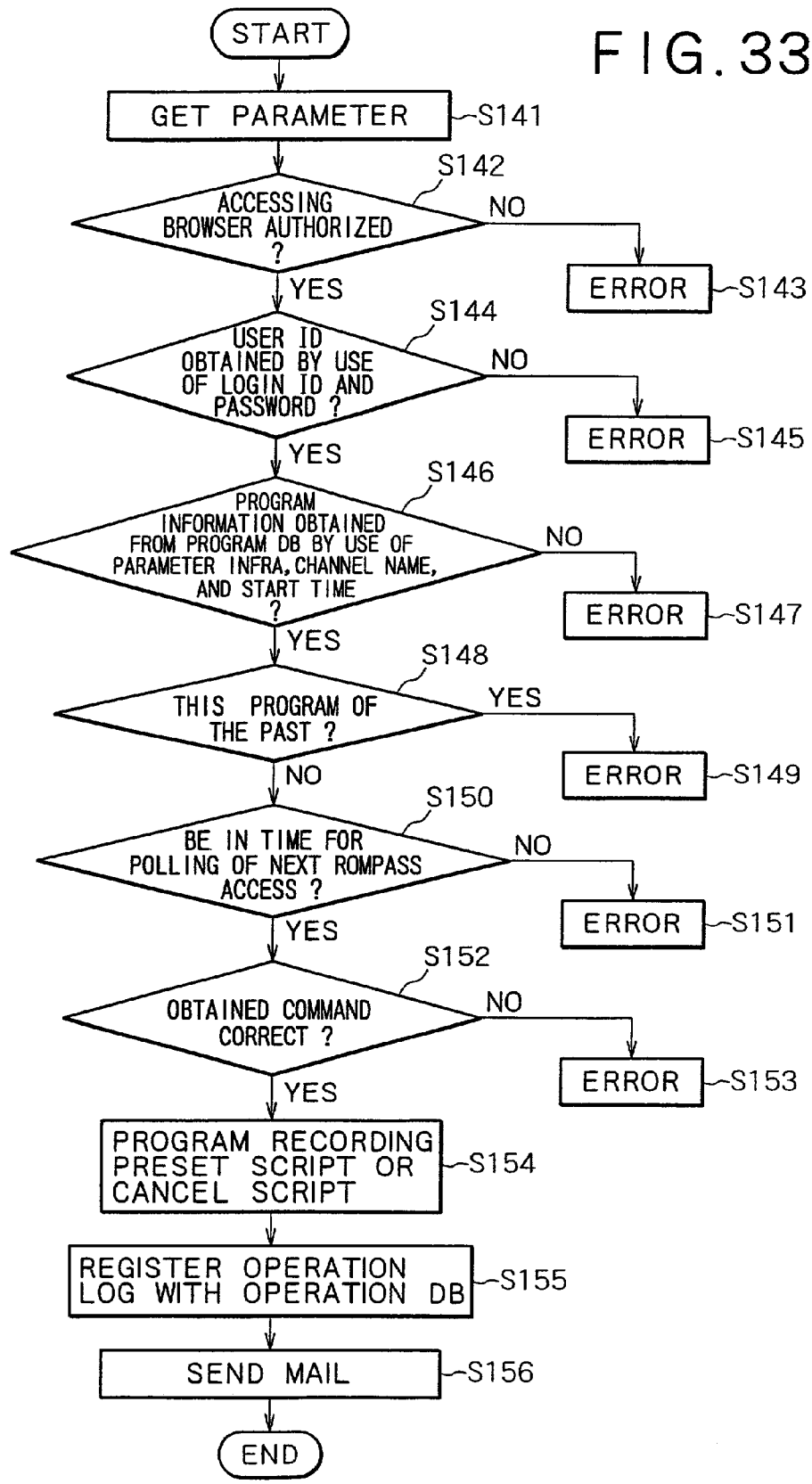
FIG. 33 is a flowchart describing an operation of the server apparatus to be performed when generating an operation script in the program recording preset system of FIG. 19.

The following describes, with reference to the flowchart shown in FIG. 33, an operation of the server apparatus 120 to be executed when program recording is preset or program recording preset is canceled from the screen shown on the display section 110a of the portable terminal apparatus 110 shown in FIG. 30 or 32.

First, in accordance with the clicking of "Yes" button or "No" button on the program recording preset confirmation screen shown in FIG. 30 or the program recording preset cancel screen, the WWW server 122 of the server apparatus 120 gets the parameters written in the URL (step S141) to determine whether the accessing browser is a predetermined browser of the portable terminal apparatus 110 and is authorized in the program recording preset system 100 (step S142).

If the accessing browser is found not authorized, the WWW server 122 sends an error message to the portable terminal apparatus 110 (step S143) If the accessing browser is found authorized, the database server 123 determines whether the login ID and password written in the URL match those stored in the database 123a (step S144). If a mismatch is found, the database server 123 sends an error message to the portable terminal apparatus 110 (step S145). If a match is found, the database server 123 checks the parameters indicative of the station ID and program start time obtained in step S141 for program information stored in the program DB (step S146).

If no program information is found, the database server 123 sends an error message to the portable terminal apparatus 110 (step S147). If the program information is found, the database server 123 determines whether the program written in the URL was broadcast before the current time (step S148) If the program is found broadcast in the past, the database server 123 sends an error message to the portable terminal apparatus 110 (step S149)

For example, let the start time of the program written in the URL be "T1prog" and the current time be "T1curr", then, if "T1prog"≦"T1curr", the controller, not shown, of the server apparatus 120 determines that the broadcast start time of the program has already passed in step S148. Then, in step S149, the controller sends a message to the portable terminal apparatus 110, notifying that program recording cannot be preset. If "T1prog">"T1curr", the controller determines that the program has not yet been broadcast, upon which the procedure goes to step S150.

In step S150, let a time (the terminal apparatus 130 accesses the server apparatus 120) the access software of the terminal apparatus 130 has polled last be "POvprev" and a polling interval in which the terminal apparatus 130 polls the server apparatus 120 be "INTVPo" for example, then polling time "POnext" indicative of a next polling time at which the access software of the portable terminal apparatus 110 polls the server apparatus 120 can be expressed as "POnext"="POprev"+"INTVPo".

Therefore, if "T1prog"≦"POnext", the controller of the server apparatus 120 determines that the program cannot be preset for recording, upon which the procedure goes step S151, in which the controller sends a message thereof to the portable terminal apparatus 110.

If "T1prog">"POnext", then the procedure goes to step S152, in which the controller of the server apparatus 120 executes the recording preset of the program at a next polling by the access software of the portable terminal apparatus 110.

Next, the controller of the server apparatus 120 determines whether the command ID obtained in step S141 is correct or not (step S152). If the command is found not correct, the controller sends an error message to the portable terminal apparatus 110 (step S153).

The controller of the server apparatus 120 generates a program recording preset script or a program recording preset cancel script (these scripts are hereafter referred to also as an operation script) having a predetermined format corresponding to the program recording preset software of the terminal apparatus 130 (step S154). This predetermined format contains broadcast station name, program start time, program end time, program title, and program additional information for example in addition to command and user login ID as EXT information.

The controller of the server apparatus 120 registers an access operation made from the portable terminal apparatus 110 with the operation DB as an operation log in accordance with the generation of an operation script (step S155), sends a message indicative of the acceptance of a program recording preset event to the portable terminal apparatus 110, and, when the terminal apparatus 130 receives a program recording preset script or a program recording preset cancel script, sends a message indicative that electronic mail thereof will be sent to the portable terminal apparatus 110 (step S156).

When a program recording preset script or a program recording preset cancel script has been generated, the terminal apparatus 130 downloads it from the server 120 as will be described below with reference to the flowcharts shown in FIGS. 34, 35, and 38.

Figure 34:
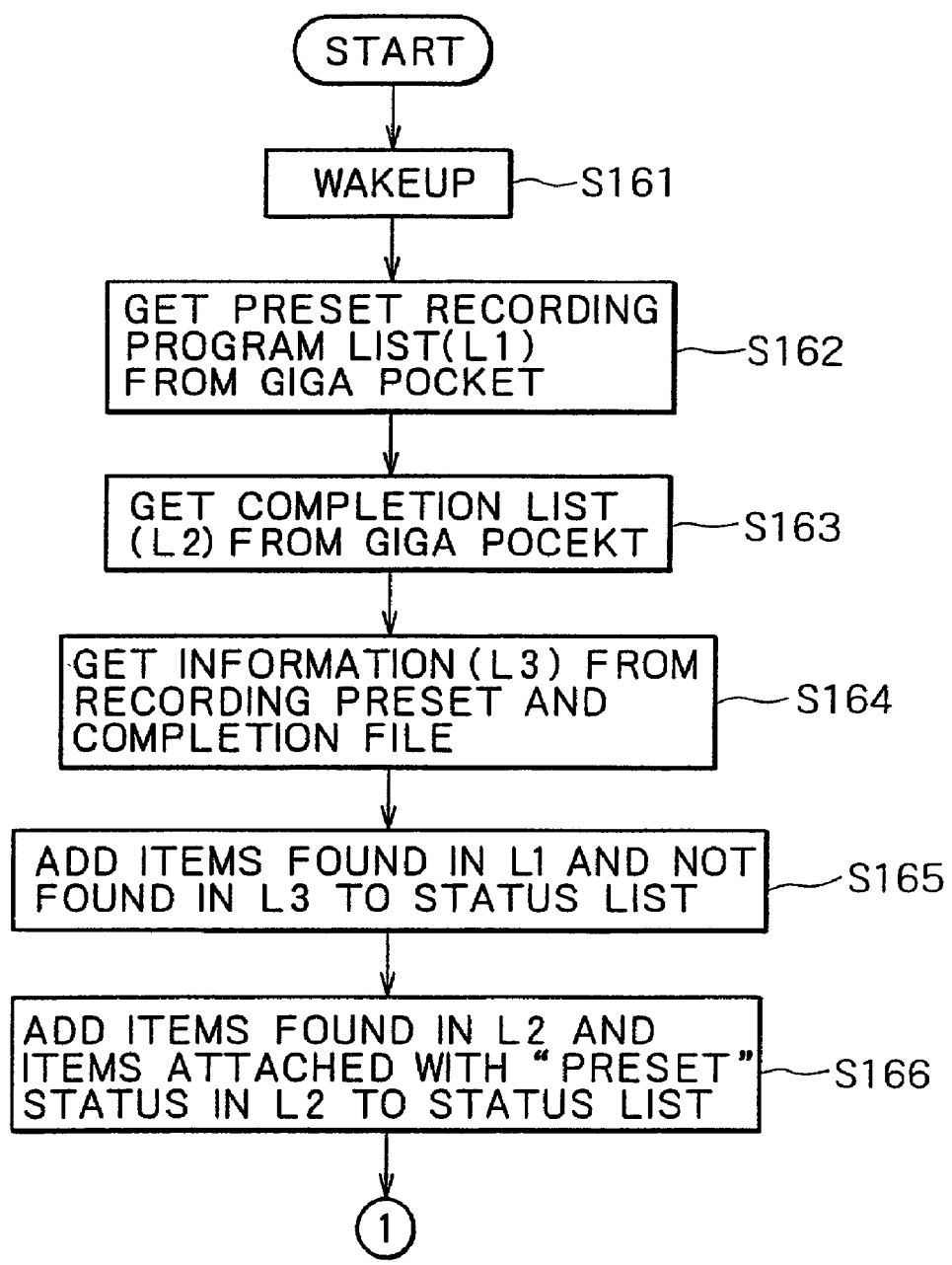
FIG. 34 is a flowchart describing an operation to be performed by a terminal apparatus when downloading the operation script generated by the server apparatus in the program recording preset system of FIG. 19.

The controller 133 of the terminal apparatus 130 starts the same at a predetermined time (a polling time) as shown in FIG. 34, thereby obtaining a preset recording program list (L1), which is a list of the programs preset for recording stored in a terminal apparatus database, not shown (step S161).

The L1 consists of a program list preset for recording by the program recording preset script generated in the server apparatus 120 and a list or programs preset for recording from an input section, not shown, of the terminal apparatus 130. Namely, the L1 contains all lists programs preset for recording in the terminal apparatus 130.

Next, the controller 133 obtains a completion list (L2), which is a list of programs of which preset recording has been completed and recorded on the recording medium 131 (step S163). Of the programs listed in the L2, those preset for recording are attached with "Preset" status marker.

Further, in response to the a program recording preset request from the portable terminal apparatus 110, the controller 133 of the terminal apparatus 130 obtains information (L3) from a recording preset/completion file, which contains the programs for which program recording preset has been completed (step S164).

The controller 133 compares the L1 with the L3 and determines that programs found in L1 but not in L3 are those preset for recording by directly operating the terminal apparatus 130 and adds them to a status list (step S165). Next, the controller 133 adds the programs attached with "Preset" status marker in the obtained L2 to the status list (step S166).

The terminal apparatus 130 may be preset for program recording by the portable terminal apparatus 110 and directly by the user. When the program recording is preset by the portable terminal apparatus 110, the setting is performed via the server apparatus 120, so that the server apparatus 120 can recognize the programs which are preset for program recording by the portable terminal apparatus 110.

The server 120 which must manage all information in the program recording preset system 100 cannot recognize the programs which have been preset to the terminal apparatus 130 for program recording by the user. Therefore, the status list is provided to report the setting status of these programs not under the control of the server apparatus 120 thereto. The status list is therefore updated every time the operation script is downloaded to the terminal apparatus 130 from the server apparatus 120. It should be noted that each program added to the status is hereafter referred to as an element.

Figure 35:
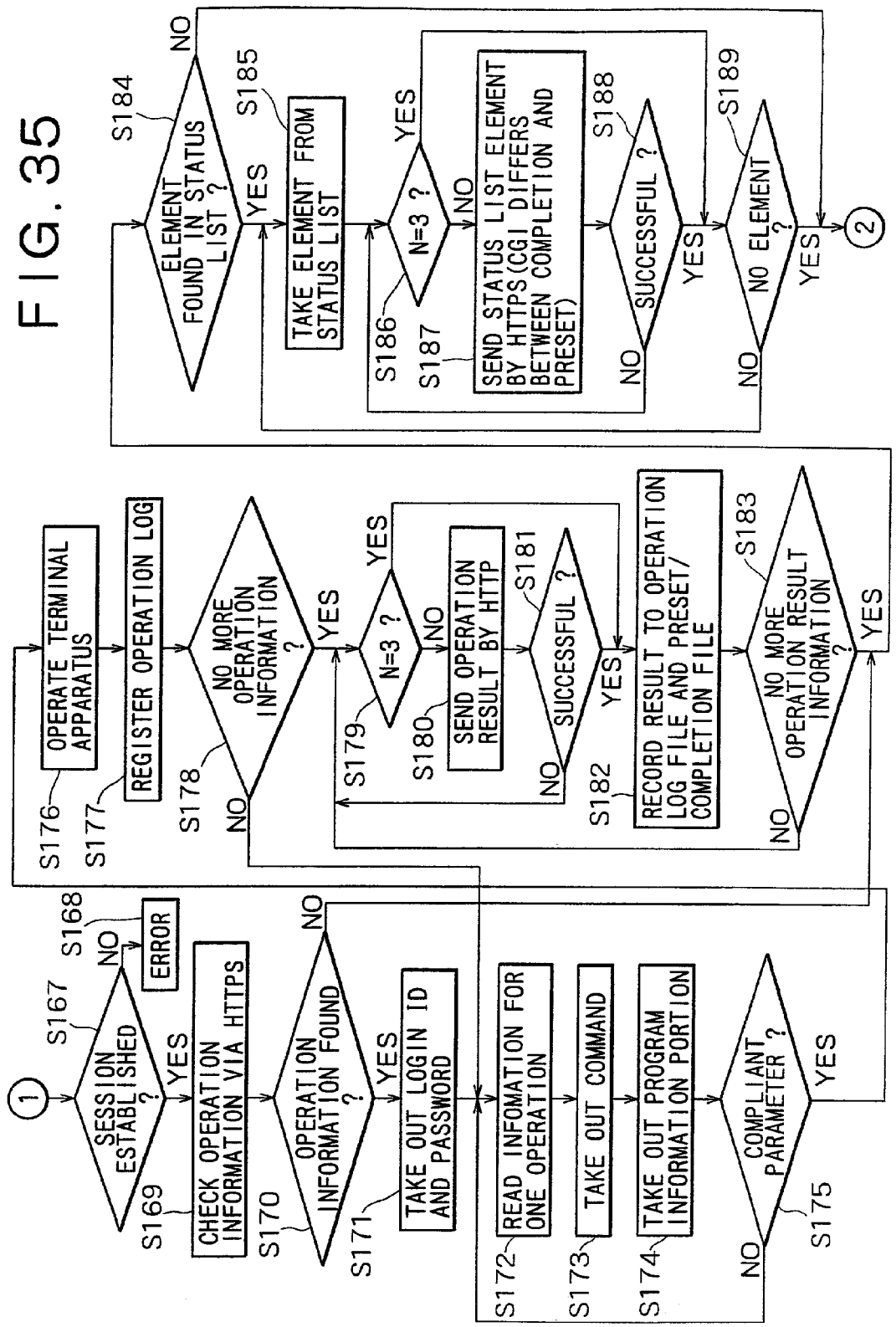
FIG. 35 is a second flowchart continued from the flowchart of FIG. 34.

When step S166 has been completed, the procedure goes to the flowchart shown in FIG. 35.

As shown in the flowchart shown in FIG. 35, the controller 133 of the terminal apparatus 130 starts access software stored in the storage section 131 at a predetermined time in accordance with a polling interval for specifying a time at which access is made to the server apparatus 120, thereby accessing the server apparatus 120 to establish a session between the terminal apparatus 130 and the server apparatus 120 (step S167). When the session has been established, the procedure goes to the next process. If the session establishment fails, the controller 133 sends an error message to the portable terminal apparatus 110 (step S168).

The access software stored in the storage section 132 of the terminal apparatus 130 accesses the CGI script of the WWW server 122 provided in the server apparatus 120 via http to check the operation script of the portable terminal apparatus 110 stored in the operation log DB (step S169). If operation information is found in the operation script, the procedure goes to step S171; otherwise, the procedure goes to step S184 (step S170). An http command for accessing the CGI script is "http://www.rompass.com/imode/remote/get.OpInfo.cgi?Login ID=&PW=&VER=**" for example having login ID, password, and version information as parameters.

The CGI script of the WWW server 122 takes out the login ID and the password and matches them with those stored in the user information DB for user authentication (step S171). When the user has been authenticated, the database server 123 of the server apparatus 120 registers the access time with the access log DB of the database 123a.

The CGI script controls the database server 123 to take the operation scripts after the current time from the operation log DB of the database 123a and the access software of the terminal apparatus 130 reads only one of the operation scripts taken out by the CGI script (step S172). The CGI script reads more than at least one operation script. The access software reads these operation scripts one by one.

FIG. 36 illustrates an exemplary operation script. This operation script is for one program, in which plural pieces of program information defined by tag provide one operation script by definition with tags <TVProgram> through </TVprogram>. If there are two or more operation scripts, they are defined by tags <GPoperation> through </GPoperation> in FIG. 37.

The access software of the terminal apparatus 130 takes out an operation command defined by tags <command> through </command> of the read operation script (step S173) and takes out the program information portion other than the operation command (step S174), determining whether the parameter thus read is valid or not. If the parameter is found valid, the procedure goes to step S175; otherwise, the procedure returns to step S172.

The controller of the terminal apparatus 130 determines whether the operation command of the operation script found valid by the access software is a command for recording preset or preset cancellation. Depending on the decision, the controller issues a device operation command to a recording section, not shown, which records the program to the recording medium 132 (step S176). The controller of the terminal apparatus 130 registers the above-mentioned operation status with an operation log file, not shown (step S177).

Next, the access software of the terminal apparatus 130 checks for other operation scripts (step S178). If there found any other scripts, the procedure goes to step S179; otherwise, the procedure returns to step S172.

When the number of times the operation result of the terminal apparatus 130 by the operation script has reached N (N=3 in this example), the procedure goes to step S182 without sending the operation result. If the number of times has not reached N, the procedure goes to step S180 until the sending of the operation result to the server apparatus 120 is successful (step S179).

The access software of the terminal apparatus 130 accesses the CGI script of the WWW server 122 of the server apparatus 120 via http and sends a result of the operation performed in the terminal apparatus 130 by the operation script (step S180). At this moment, the http command for operation result sending generated by the access software of the terminal apparatus 130 is "http://www.rompass.com/imode/remote/remoteResult.cgi?LoginID=&PW=&VER=&ST=&STA=&COM=&RES=**" for example, station ID, broadcast start time, operation command, and operation result being added as parameters after "ST=", "STA=", "COM=", and "RES=" respectively.

Depending on the receiving status of the operation result from the terminal apparatus 130, the CGI script of the server apparatus 120 sends a script for reporting a receiving status defined by tags <Result> through </Result> as a return value to the terminal apparatus 130.

When the reception of the operation result from the terminal apparatus 130 is successful, the server apparatus 120 sends "0" to the terminal apparatus 130; otherwise, the server apparatus 120 sends "1". When the reception of the operation result by the server apparatus 120 is successful, the procedure goes to step S182; otherwise, the procedure returns to step S179 (step S181)

When the sending of the operation result to the server apparatus 120 is successful, the controller 133 of the terminal apparatus 130 records thereof to an operation log file and a program recording preset/completion file (step S182). If the operation result information still remains, the procedure returns to step S179; otherwise the procedure goes forward (step S183).

If the status list contains elements, the controller 133 of the terminal apparatus 130 takes out one element (step S184 and step S185); otherwise, the procedure goes to step S190.

When the number of times one element taken from the a status list is sent to the server apparatus 120 has reached N (N=3 in this example), the procedure goes to step S189 without sending this element; if the sending number of times is less than N, then the procedure goes to step S187 until the sending of this element to the server apparatus 120 is successful (step S186).

The access software of the terminal apparatus 130 accesses the CGI script of the WWW server 122 of the server apparatus 120 via http and sends the element taken out in step S185 (step S187). The http command depends on the element to be sent. For the program which has been recorded, the http command is "http://www.rompass.com/imode/remote/remoteRecorded.cgi?LoginID=&PW=&STID=&DT=&STA=&VER=". For the program which is preset for recording to the terminal apparatus 3, the http command is "http://www.rompass.com/imode/remote/remoteReserved.cgi?LoginID=&PW=&STID=&DT=&STA=&VER=".

Depending on the reception status of the element from the terminal apparatus 130, the CGI script of the server apparatus 120 sends a script for reporting the reception status defined by tags <Result> through </Result> as a return value. If the reception is successful, the server apparatus 120 returns "0"; otherwise, the server apparatus 120 returns "1". When the reception of the element by the server apparatus 120 is successful, the procedure goes to step S189; otherwise, the procedure returns to step S186 (step S188).

If there still remain elements in the status list, the controller 133 of the terminal apparatus 130 returns the procedure to step S185; if there exists no more element in the status list, the procedure goes to step S190 (step S189).

Figures 37, 38:
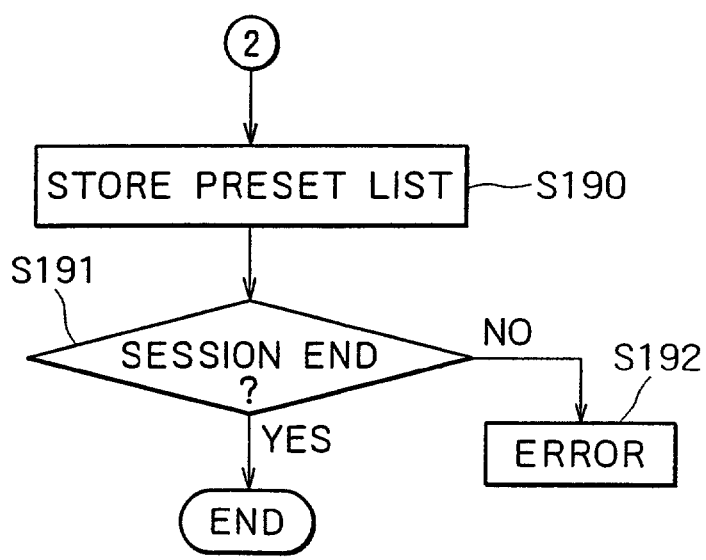
FIG. 37 illustrates another operation script generated by the server apparatus in the program recording preset system of FIG. 19.
FIG. 38 is a third flowchart continued from the flowchart of FIG. 35.

As shown in the flowchart of FIG. 38, the data server 123 of the server apparatus 120 stores the elements taken from the status list of the terminal apparatus 130 into the preset DB in the database 123a (step S190), upon which the session between the terminal apparatus 130 and the server apparatus 120 comes to an end (step S191). If the session does not end properly, an error message is sent to the terminal apparatus 110 (step S192).

Figure 39:
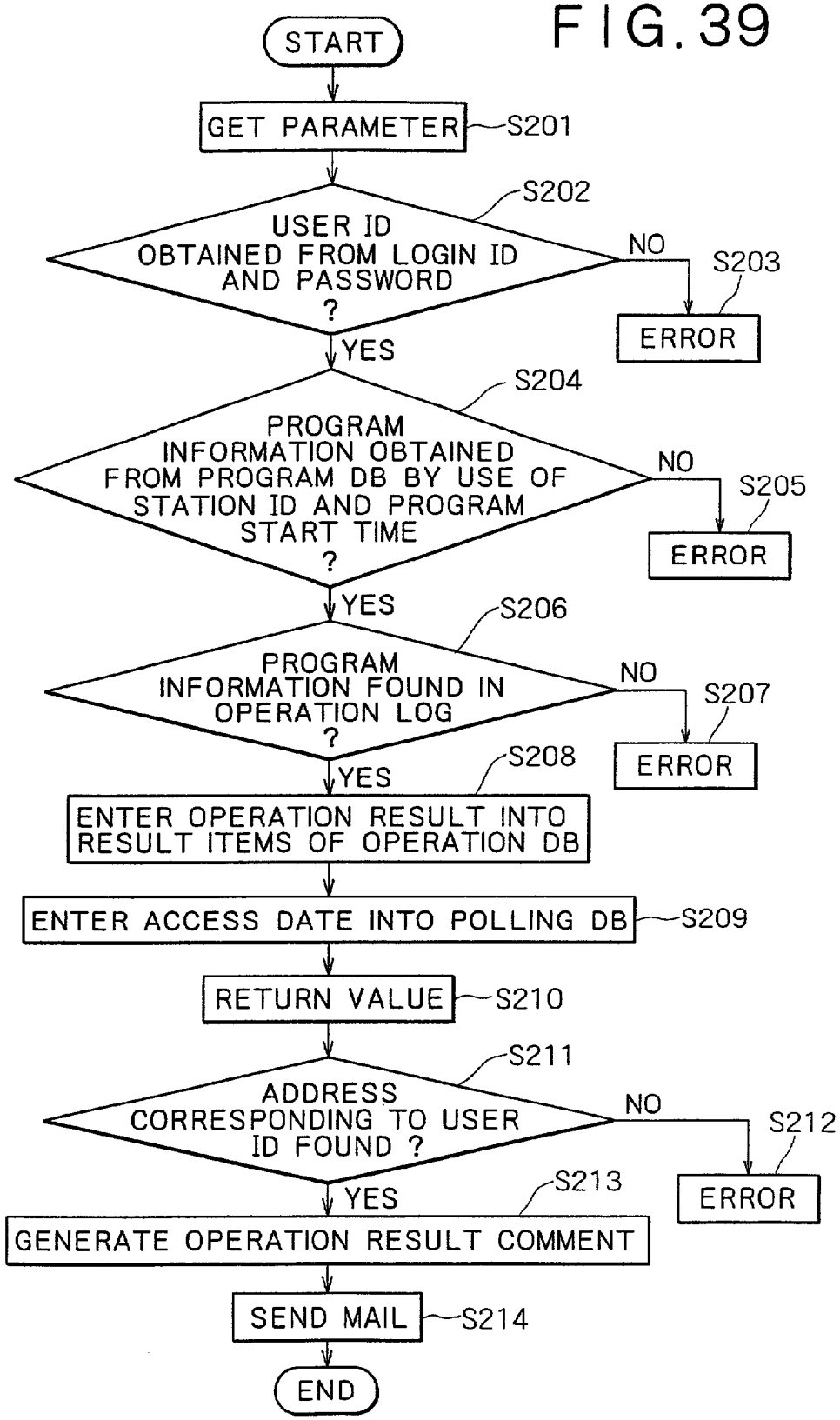
FIG. 39 is a flowchart describing an operation of the server apparatus when receiving an operation script download result sent from the terminal apparatus in the program recording preset system of FIG. 19.

The following describes an operation of the server apparatus 120 to be executed when receiving an operation script setting result from the terminal apparatus 130 with reference to the flowchart shown in FIG. 39.

First, the CGI script of the WWW server 122 of the server apparatus 120 gets all parameters from an http command generated by the access software of the terminal apparatus 130 (step S201) and, on the basis of the obtained login ID and password, searches the user information DB of the database 123a for the user ID, thereby identifying the user (step S202).

If the user identification failed, the server apparatus 120 sends an error message to the portable terminal apparatus 110 (step S203). If the user identification is successful, the procedure goes to step S204, in which the CGI script controls the database server 123 on the basis of the station ID and program start time to obtain the information about this program (step S204). If the program information cannot be obtained, the server apparatus 120 sends an error message to the terminal apparatus 130 (step S205).

The database server 123 of the server apparatus 120 searches the operation DB of the database 123a for an operation log associated with the program having the program information obtained in step S204 (step S206). If no operation log is found, the database server 123 sends an error message to the terminal apparatus 130 (step S207). If the operation log is found, the database server 123 enters the operation result supplied from the terminal apparatus 130 into a result item column of the operation DB (step S208) and the access date into the polling DB (step S209).

Next, in order to notify the terminal apparatus 130 of the success or failure of the above-mentioned operation result report, the CGI script sends a script indicative of the success or failure defined by tags <Result> through </Result>. If the operation result report is successful, the CGI script sends "0"; otherwise, the CGI script sends "1" (step S210).

Further, on the basis of the user ID retrieved in step S202, the server apparatus 120 searches the user information ID of the database 123a for the electronic mail address of the portable terminal apparatus 110 (step S211). If the address is found, the mail server 121 generates an electronic mail message attached with an operation result comment indicative of the success of the setting of the operation script to the terminal apparatus 130 (step S213) sending to the portable terminal apparatus 110 (step S214). If the electronic mail address of the portable terminal apparatus 110 is not found, the mail server 121 sends an error message to the terminal apparatus 130 (step S212).

Figure 40:
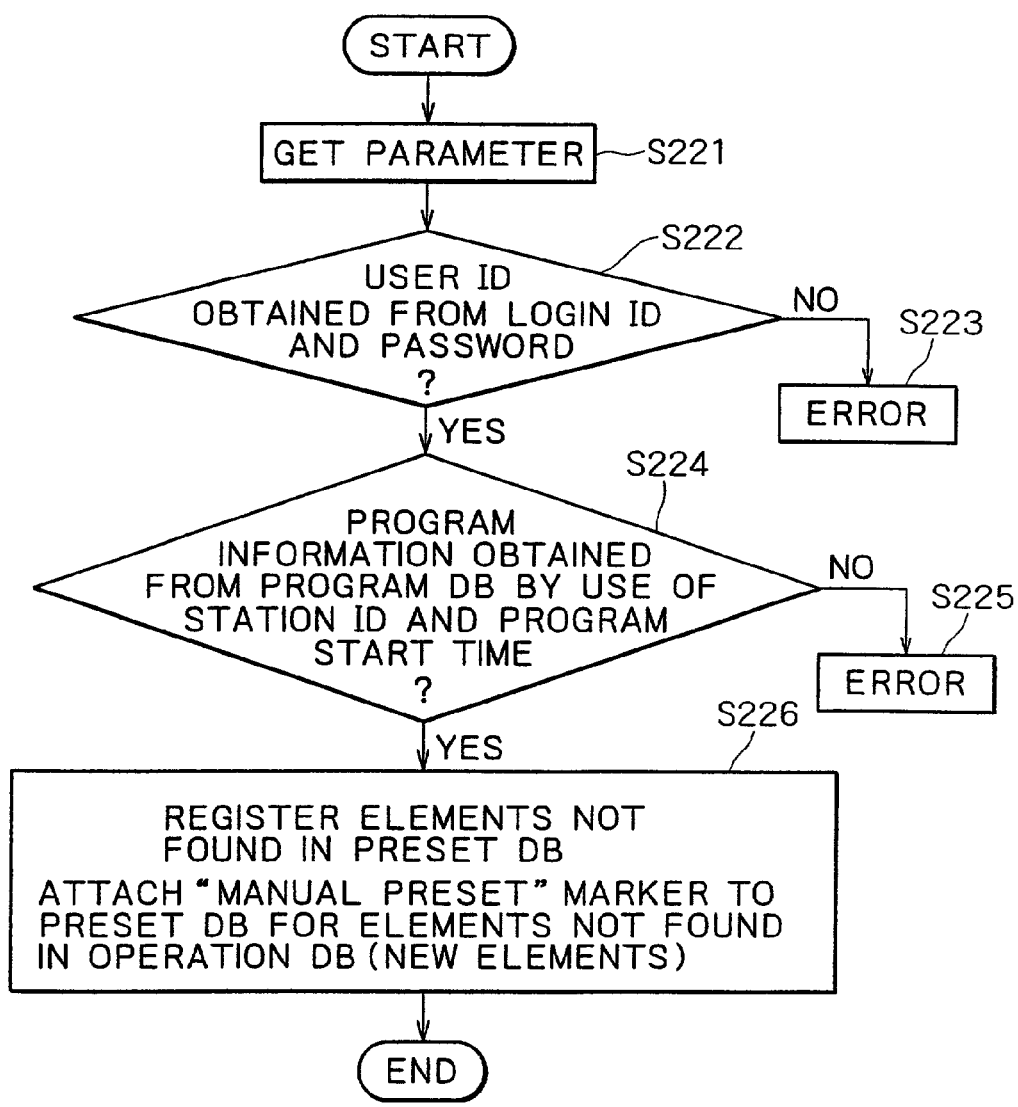
FIG. 40 is a flowchart describing an operation of the server apparatus when receiving the information about a program for which program recording has been preset from the terminal apparatus in the program recording preset system of FIG. 19.

The following describes an operation of the server apparatus 120 to be executed when getting elements of a status list supplied from the terminal apparatus 130 with reference to the flowcharts shown in FIGS. 40 and 41.

First, with reference to the flowchart of FIG. 40, an example will be described in which the server apparatus 120 receives an element indicative of the program information about a program which has been directly preset by the user for recording to the terminal apparatus 130.

The WWW server 122 of the server apparatus 120 receives an http command from the terminal apparatus 130 to get all parameters attached to the command (step S221).

On the basis of the login ID and password of the obtained parameters, the CGI script of the WWW server 122 searches the user database DB of the database 123a for the user ID to identify the user (step S222). If the user identification failed, the server apparatus 120 sends an error message to the portable terminal apparatus 110 (step S223); if the user has been identified, the procedure goes to step S224, in which the CGI script controls the database server 123 on the basis of the station ID and program start time to get the program information (step S224). If the program information cannot be obtained, the server apparatus 120 sends an error message to the terminal apparatus 130 (step S225).

Further, the CGI script searches the preset DB and operation DB of the database 123a for the program of which information has been obtained from the program DB. If the program is not found in the preset DB, the is program is registered with the preset DB. If the program is not found in the operation DB either, an identification marker, for example, marker "manually preset for recording" is attached to the program registered with the preset DB in order to indicate that this program has been directly preset for recording to the terminal apparatus 130.

The following describes, with reference to the flowchart of FIG. 41, an example in which the server apparatus 120 receives an element indicative of the program information of a program recorded on a recording medium of the terminal apparatus 130 to which the program recording preset has been made.

The WWW server 122 of the server apparatus 120 receives an http command from the terminal apparatus 130 to get all parameters attached to the command (step S231).

On the basis of the login ID and password of the obtained parameters, the CGI script of the WWW server 122 searches the user information DB of the database 123a for the user ID to identify the user (step S232) If the user identification failed, the server apparatus 120 sends an error message to the portable terminal apparatus 110 (step S233); if the user has been identified, the procedure goes to step S234, in which the CGI script controls the database server 123 on the basis of the station ID and program start time to get the program information (step S234). If the program information cannot be obtained, the server apparatus 120 sends an error message to the terminal apparatus 130 (step S235).

On the basis of the program information found in the database 123a, the CGI script searches the preset DB of the database 123a to determine whether the retrieved program is attached with marker "manual preset" (step S236).

If no marker "manual preset" is found attached, the CGI script attaches marker "completed" (step S237) and the mail server 121 issues an electronic mail message (step S238); if marker "manual preset" is attached, the processing comes to an end.

Further, by use of the user ID retrieved from the user information DB in step S232, the CGI script searches for the electronic mail address of the portable terminal apparatus 110 (step 239). If the electronic mail address is not found, the CGI script sends an error message to the terminal apparatus 130 (step S240); if the electronic mail address is found, the CGI script generates an operation result comment indicative that the program preset for recording from the portable terminal apparatus 110 has been recorded on a recording medium (step S241). Then the CGI script attaches the electronic mail address obtained in step S239 and the operation result comment generated in step S240 to the electronic mail message generated in step S238 and sends the resultant electronic mail message to the portable terminal apparatus 110 (step S242)

Thus, with the program recording preset system 100, the recording preset of user-specified programs can be made onto the terminal apparatus 130 from the remote portable terminal apparatus 110 via an existing network such as the Internet.

In addition, when the user directly operates the terminal apparatus 130 for program recording preset, sending predetermined management information via the network to the server apparatus 120 allows the same to collectively manage the programs preset for recording to the terminal apparatus 130.

Furthermore, because existing networks can be used, the cost and time otherwise required for the arrangement of the necessary infrastructure can be significantly saved, which in turn significantly saves the users of system usage fees.

As described and according to the program information providing apparatus and method, the program preset recording system and method, and the program recording system and method associated with the present invention, a program recording preset request, which is a command for recording preset a user-specified broadcast program listed in a program chart supplied from the program information providing apparatus, is entered from the input section of the portable terminal apparatus into the program information providing apparatus. In response, the program information providing apparatus causes the program recording preset script generating section to generate a program recording preset script, which is a control command to record a program listed in the program chart to a recording medium, on the basis of the program information stored in the first storage section. The generated script is sent to the terminal apparatus to be converted by the signal converting section into a program recording preset control signal suitable for the recording apparatus. The user-specified program is recorded by the controller of the recording apparatus to the recording medium in accordance with this control signal. Consequently, user-specified programs can be preset for recording from a remote site by a simplified operational procedure.

Further, according to the program information providing apparatus and method, the program preset recording system and method, and the program recording system and method associated with the present invention, a program introducing electronic mail message attached with the program information for introducing a broadcast program and a program recording preset URL linking to the program information stored in the first storage section is generated by the electronic mail generating section and the URL generating and attaching section of the program information providing apparatus. The generated electronic mail message is sent to the portable terminal apparatus. In response to the access from the portable terminal apparatus to the program recording preset URL, a program recording preset script is generated. The generated script is sent to the terminal apparatus to be converted by its signal converting section into a program recording preset control signal suitable for the recording apparatus. On the basis of this control signal, the user-specified program is recorded by the controller of the recording apparatus to a recording medium. Consequently, user-specified programs can be preset for recording from a remote site by a simplified operational procedure.

While the preferred embodiments of the present invention have been described using specific terms, such description is for illustrative purposes only, and it is to be understood that changes and variations may be made without departing from the spirit or scope of the appended claims.

What is claimed is:

1. A program recording preset system comprising a first terminal apparatus for requesting to send program information, which is attribute information about a program, and a program chart, a program information providing apparatus having storage means for storing the program information and the program chart and sending the program information and the program chart to said first terminal apparatus upon request therefrom, and a second terminal apparatus for presetting recording of a specified program listed in the program chart sent to said first terminal apparatus, said first terminal apparatus, said program information providing apparatus, and said second terminal apparatus being interconnected by a network, wherein:

said first terminal apparatus includes:

display means for displaying the received program information and program chart;

input means for inputting a program recording preset request; and first sending means for sending the program recording preset request inputted through said input means;

said program information providing apparatus includes:

first receiving means for receiving the program recording preset request from said first terminal apparatus;

searching means for searching, in response to the program recording preset request received by said first receiving means, said storage means for the program information;

second sending means for sending the program information retrieved by said searching means to said first terminal apparatus;

program recording preset script generating means for generating, on the basis of the program information retrieved by said searching means, a program recording preset script, which is a control command for recording the program listed in the program chart to a recording medium;

third sending means for sending the program recording preset script generated by said program recording preset script generating means; and program recording preset cancel script generating means for generating, in response to a program recording preset cancel request, a program recording preset cancel script, which is a control command for invalidating the program recording preset script; and said second terminal apparatus includes:

second receiving means for receiving the program recording preset script supplied from said third sending means of said program information providing apparatus; and signal converting means for converting the program recording preset script received by said second receiving means into a program recording preset control signal, wherein said program information providing apparatus comprises electronic mail generating means for generating an electronic mail message indicating the reception of one of the program recording preset script and the program recording preset cancel script by said second terminal apparatus upon reception of the script reception information by said script reception information receiving means.

2. The program recording preset system according to claim 1, wherein said program information providing apparatus comprises fourth sending means for sending the electronic mail message generated by said electronic mail generating means to said first terminal apparatus.

3. The program recording preset system according to claim 2, wherein said first terminal apparatus comprises third receiving means for receiving the electronic mail message sent from said fourth sending means of said program information providing apparatus.

4. A program recording preset method for a program recording preset system having a first terminal apparatus for requesting to send program information, which is attribute information about a program, and a program chart, a program information providing apparatus having storage means for storing the program information and the program chart and sending the program information and the program chart to said first terminal apparatus upon request therefrom, and a second terminal apparatus for presetting recording of a specified program listed in the program chart sent to said first terminal apparatus, said first terminal apparatus, said program information providing apparatus, and said second terminal apparatus being interconnected by a network:

said program recording preset method in said first terminal apparatus comprising the steps of;

displaying the received program chart, inputting a program recording preset request for a program shown in the program chart, and sending the inputted program recording preset request to the program information providing apparatus;

said program recording preset method in said program information providing apparatus comprising the steps of;

receiving the program recording preset request from said first terminal apparatus, searching, in response to the received program recording preset request, said storage means for the program information, sending the retrieved program information to said first terminal apparatus, generating, on the basis of the retrieved program information, a program recording preset script, which is a control command for recording the program listed in the program chart to a recording medium by recording means, sending the generated program recording preset script; and generating, in response to a program recording preset cancel request, a program recording preset cancel script, which is a control command for invalidating the program recording preset script; and said program recording preset method in said second terminal apparatus comprising the steps of:

receiving the program recording preset script sent from said program information providing apparatus, and converting the received program recording preset script into a program recording preset control signal, wherein said program information providing apparatus sends the generated program recording preset cancel script to said second terminal apparatus, wherein said second terminal apparatus receives the program recording preset cancel script sent from said program information providing apparatus, wherein said second terminal apparatus sends, upon receiving one of the program recording preset script and the program recording preset cancel script, script reception information thereof to said program information providing apparatus, wherein said program information providing apparatus receives the script reception information sent from said second terminal apparatus, and wherein said program information providing apparatus generates an electronic mail message indicating the reception of one of the program recording preset script and the program recording preset cancel script by the second terminal apparatus upon reception of the script reception information.

5. The program recording preset method according to claim 4, wherein said program information providing apparatus sends the generated electronic mail message to said first terminal apparatus.

6. The program recording preset method according to claim 5, wherein said first terminal apparatus receives the electronic mail message sent from said program information providing apparatus.

7. A program recording system comprising a first terminal apparatus for requesting to send program information, which is attribute information about a program, and a program chart, a program information providing apparatus having storage means for storing the program information and the program chart and sending the program information and the program chart to said first terminal apparatus upon request therefrom, a second terminal apparatus for presetting recording of a specified program listed in the program chart sent to said first terminal apparatus, and a recording apparatus for recording the program to a recording medium in response to the program recording preset to said second terminal apparatus, said first terminal apparatus, said program information providing apparatus, said second terminal apparatus, and said recording apparatus being interconnected by a network, wherein:

said first terminal apparatus includes:

display means for displaying the received program information and program chart;

input means for inputting a program recording preset request; and first sending means for sending the program recording preset request inputted through said input means;

said program information providing apparatus includes:

first receiving means for receiving the program recording preset request from said first terminal apparatus;

searching means for searching, in response to the program recording preset request received by said first receiving means, said storage means for the program information;

second sending means for sending the program information retrieved by said searching means to said first terminal apparatus;

program recording preset script generating means for generating, on the basis of the program information retrieved by said searching means, a program recording preset script, which is a control command for recording the program listed in the program chart to a recording medium;

third sending means for sending the program recording preset script generated by said program recording preset script generating means; and program recording preset cancel script generating means for generating, in response to a program recording preset cancel request, a program recording preset cancel script, which is a control command for invalidating the program recording preset script;

said second terminal apparatus includes:

second receiving means for receiving the program recording preset script supplied from said third sending means of said program information providing apparatus;

signal converting means for converting the program recording preset script received by said second receiving means into a program recording preset control signal; and fourth sending means for sending the program recording preset control signal converted by said signal converting means; and said recording apparatus includes:

third receiving means for receiving the program recording preset control signal sent from said third sending means of said second terminal apparatus;

fourth receiving means for receiving the program listed in the program chart, recording means for recording the program received by said fourth receiving means to said recording medium; and control means for drivingly controlling, in response to the program recording preset control signal received by said third receiving means, said recording means to record the program received by said fourth receiving means to said recording medium, wherein said program information providing apparatus comprises electronic mail generating means for generating an electronic mail message indicating the reception of one of the program recording preset control signal and the program recording preset cancel control signal upon reception of the control signal reception information by said control signal reception information receiving means.

8. The program recording system according to claim 7, wherein said program information providing apparatus comprises fifth sending means for sending the electronic mail message generated by said electronic mail generating means to said first terminal apparatus.

9. The program recording system according to claim 8, wherein said first terminal apparatus comprises fourth receiving means for receiving the electronic mail message sent from said fifth sending means of said program information providing apparatus.

10. A program recording method for a program recording system having a first terminal apparatus for requesting to send program information, which is attribute information about a program, and a program chart, a program information providing apparatus having storage means for storing the program information and the program chart and sending the program information and the program chart to said first terminal apparatus upon request therefrom, a second terminal apparatus for presetting recording of a specified program listed in the program chart sent to said first terminal apparatus, and a recording apparatus for recording the program to a recording medium in response to the program recording preset to said second terminal apparatus, said first terminal apparatus, said program information providing apparatus, said second terminal apparatus, and said recording apparatus being interconnected by a network:

said program recording method in said first terminal apparatus comprising the steps of:

displaying the received program chart;

inputting a program recording preset request for a program shown in the program chart; and sending the inputted program recording preset request to the program information providing apparatus;

said program recording method in said program information providing apparatus comprising the steps of:
receiving the program recording preset request from said first terminal apparatus;
searching, in response to the received program recording preset request, said storage means for the program information;
sending the retrieved program information to said first terminal apparatus;
generating, on the basis of the retrieved program information, a program recording preset script, which is a control command for recording the program listed in the program chart to a recording medium;
sending the generated program recording preset script; and
generating, in response to a program recording preset cancel request, a program recording preset cancel script, which is a control command for invalidating the program recording preset script;
said program recording method in said second terminal apparatus comprising the steps of:
receiving the program recording preset script supplied from said program information providing apparatus;
converting the received program recording preset script into a program recording preset control signal; and
sending the converted program recording preset control signal; and
said program recording method in said recording apparatus comprising the steps of:
receiving the program recording preset control signal sent from said second terminal apparatus;
receiving the program listed in the program chart; and
recording the received program to said recording medium, in response to the program recording preset control signal,
wherein said program information providing apparatus sends the generated program recording preset cancel script to said second terminal apparatus,
wherein said second terminal apparatus receives the program recording preset cancel script sent from said program information providing apparatus,
wherein said second terminal apparatus converts the received program recording preset cancel script into a program recording preset cancel control signal,
wherein said second terminal apparatus sends said converted program recording preset cancel control signal to said recording apparatus,
wherein said recording apparatus receives the program recording preset cancel control signal,
wherein said second terminal apparatus sends, upon reception of one of the program recording preset control signal and the program recording preset cancel control signal by said recording apparatus, control signal reception information thereof to said program information providing apparatus,
wherein said program information providing apparatus receives the control signal reception information from said second terminal apparatus, and
wherein said program information providing apparatus generates an electronic mail message indicating the reception of one of the program recording preset control signal and the program recording preset cancel control signal by said recording apparatus upon reception of the control signal reception information.

11. The program recording method according to claim 10, wherein said program information providing apparatus sends the electronic mail message to said first terminal apparatus.

12. The program recording method according to claim 11, wherein said first terminal apparatus receives the electronic mail message sent from said program information providing apparatus.

13. A program information providing apparatus having first storage means for storing a plurality of items of program information, which is attribute information about a program and sending said plurality of items of program information to a first terminal apparatus via a network, said program information providing apparatus comprising:
electronic mail generating means for generating a program introducing electronic mail message attached with at least one item of program introducing information for introducing the program of said plurality of items of program information stored in said first storage means;
address generating and attaching means for generating a program recording preset address to be linked with any one of said plurality of items of program information stored in said first storage means and attaching the generated program recording preset address to the program introducing electronic mail message generated by said electronic mail generating means for each item of the program introducing information;
first sending means for sending the program introducing electronic mail message attached with the program recording preset address by said address generating and attaching means to said first terminal apparatus at a predetermined time;
searching means for searching said first storage means for specified one of said plurality of items of program information in accordance with access input information inputted to the program recording preset address;
program recording preset script generating means for generating, on the basis of the retrieved program information, a program recording preset script, which is a control command for causing a recording apparatus to record the program to a recording medium; and
second sending means for sending the program recording preset script generated by said program recording preset script generating means to a second terminal apparatus.

14. The program information providing apparatus according to claim 13, wherein said first sending means sends the program information retrieved by said searching means to said first terminal apparatus in response to a request from said first terminal apparatus.

15. The program information providing apparatus according to claim 13, wherein the program recording preset address generated by said address generating and attaching means is an address for presetting recording of the program and visually displays information for identifying a user who presets recording of program and information about the program which is preset for recording.

16. The program information providing apparatus according to claim 13, further comprising;
second storage means for storing, for each user, a program recording preset script generation log generated by said program recording preset script generating means.

17. The program information providing apparatus according to claim 15, wherein, if at least one program recording preset script has already been generated by said program recording preset script generating means, said address generating and attaching means generates a recording apparatus change mode address which links with the program recording preset script generation log of a corresponding user of the program recording preset script generation logs stored in said second storage means and attaches the generated recording apparatus change mode address to the program introducing electronic mail message.

18. The program information providing apparatus according to claim 17, wherein the recording apparatus change mode address generated by said address generating and attaching means is an address for shifting to a mode in which said recording apparatus is changed to another and visually displays information for identifying a user who performs a recording apparatus change operation.

19. The program information providing apparatus according to claim 17, wherein said searching means searches said second storage means for the program recording preset script generation log of the corresponding user in accordance with access input information inputted to the recording apparatus change mode address.

20. The program information providing apparatus according to claim 19, wherein said electronic mail generating means generates a recording apparatus change program selecting electronic mail message attached with the program recording preset script generation log retrieved by said searching means.

21. The program information providing apparatus according to claim 20, wherein said address generating and attaching means attaches a recording apparatus change program selecting address linked with the program information stored in said first storage means to each log of the recording apparatus change program selecting electronic mail message attached with the program recording preset script generation log.

22. The program information providing apparatus according to claim 21, wherein the recording apparatus change program selecting address generated by said addressing generating and attaching means is an address for selecting the program for which said recording apparatus is to be changed to another and visually displays information for identifying a user who selects the program for which said recording apparatus is changed to another and information about the program for which said recording apparatus is changed to another.

23. The program information providing apparatus according to claim 20, wherein said first sending means sends the recording apparatus change program selecting electronic mail message generated by said electronic mail generating means to said first terminal apparatus.

24. The program information providing apparatus according to claim 21, wherein said program recording preset script generating means modifies, in accordance with access input information inputted to the recording apparatus change program selecting address, the program recording preset script such that said recording apparatus by which the program is to be recorded is changed to another.

25. The program information providing apparatus according to claim 16, wherein, if at least one program recording preset script has already been generated by said program recording preset script generating means, said address generating and attaching means generates a program recording preset cancel mode address which links with the program recording preset script generation log of a corresponding user of the program recording preset script generation logs stored in said second storage means and attaches the generated program recording preset cancel mode address to the program introducing electronic mail message.

26. The program information providing apparatus according to claim 25, wherein the program recording preset cancel mode address generated by said address generating and attaching means is an address for shifting to a mode in which the program recording preset of the program is canceled and visually displays information for identifying a user who cancels the program recording preset of the program.

27. The program information providing apparatus according to claim 25, wherein said searching means searches said second storage means for the program recording preset script log of the user in accordance with access input information inputted to the program recording preset cancel mode address.

28. The program information providing apparatus according to claim 27, wherein said electronic mail generating means generates a cancel electronic mail message attached with the program recording preset script generation log retrieved by said searching means.

29. The program information providing apparatus according to claim 28, wherein said address generating and attaching means attaches the program recording preset cancel address linked with the program information stored in said first storage means to each log of the cancel electronic mail message attached with the program recording preset script generation log.

30. The program information providing apparatus according to claim 29, wherein the program recording preset cancel address generated by said address generating and attaching means is an address for canceling the program recording preset for the program and visually displays information for identifying a user who cancels the program recording preset and information about the program of which program recording preset is canceled.

31. The program information providing apparatus according to claim 28, wherein said first sending means sends the cancel electronic mail message generated by said electronic mail generating means to said first terminal apparatus.

32. The program information providing apparatus according to claim 29, wherein said searching means searches said first storage means for the program information in accordance with access input information inputted to the program recording preset cancel address.

33. The program information providing apparatus according to claim 32, further comprising:
cancel script generating means for generating a cancel script, which is a control command for invalidating the program recording preset script on the basis of the program information retrieved by said searching means.

34. The program information providing apparatus according to claim 33, wherein said second sending means sends the program recording preset cancel script generated by said program recording preset cancel script generating means to said second terminal apparatus.

35. A program information providing method for storing a plurality of items of program information, which is attribute information about a program and sending the stored program information to a first terminal apparatus via a network, said program information providing method comprising the steps of:
generating an electronic mail message attached with at least one item of program introducing information for introducing the program of the stored plurality of items of program information;
generating a program recording preset address to be linked with any one of the stored plurality of items of program information, attaching the generated program recording preset address to the generated program introducing electronic mail message for each item of the program introducing information;

sending the program introducing electronic mail message attached with the program recording preset address to said first terminal apparatus;

searching for specified one of said plurality of items of program information in accordance with access input information inputted to the program recording preset address;

generating, on the basis of the retrieved program information, a program recording preset script, which is a control command for causing a recording apparatus to record the program to a recording medium; and sending the generated program recording preset script to a second terminal apparatus.

36. The program information providing method according to claim 35, wherein the retrieved program information is sent to said first terminal apparatus in response to a request.

37. The program information providing method according to claim 35, wherein the generated program recording preset address is an address for presetting recording of the program and visually displays information for identifying a user who recording presets the program and information about the program which is preset for recording.

38. The program information providing method according to claim 35, further comprising the step of:

storing, for each user, a program recording preset script generation log.

39. The program information providing method according to claim 38, wherein, if at least one program recording preset script has already been generated, a recording apparatus change mode address which links with the program recording preset script generation log of a corresponding user of the stored program recording preset script generation logs is generated and the generated recording apparatus change mode address is attached to the program introducing electronic mail message.

40. The program information providing method according to claim 39, wherein the generated recording apparatus change mode address is an address for shifting to a mode in which said recording apparatus is changed to another and visually displays information for identifying a user who performs a recording apparatus change operation.

41. The program information providing method according to claim 39, wherein the program recording preset script generation log of the corresponding user stored in accordance with access input information inputted to the recording apparatus change mode address is searched for.

42. The program information providing method according to claim 40, wherein a recording apparatus change program selecting electronic mail message attached with the retrieved program recording preset script generation log is generated.

43. The program information providing method according to claim 42, wherein a recording apparatus change program selecting address linked with the stored program information to each log of the recording apparatus change program selecting electronic mail message attached with the program recording preset script generation log is attached.

44. The program information providing method according to claim 42, wherein the recording apparatus change program selecting address is an address for selecting the program for which said recording apparatus is changed to another and visually displays information for identifying a user who selects the program for which said recording apparatus is changed to another and information about the program for which said recording apparatus is changed to another.

45. The program information providing method according to claim 42, wherein the generated recording apparatus change program selecting electronic mail message is sent to said first terminal apparatus.

46. The program information providing method according to claim 43, wherein the program recording preset script is modified, in accordance with access input information inputted to the recording apparatus change program selecting address, such that said recording apparatus by which the program is to be recorded is changed to another.

47. The program information providing method according to claim 35, wherein, if at least one program recording preset script has already been generated, a program recording preset cancel mode address which links with the program recording preset script generation log of a corresponding user of the stored program recording preset script generation logs is generated and the generated program recording preset cancel mode address is attached to the program introducing electronic mail message.

48. The program information providing method according to claim 47, wherein the program recording preset cancel mode address generated is an address for shifting to a mode in which the program recording preset of the program is canceled and visually displays information for identifying a user who cancels the program recording preset of the program.

49. The program information providing method according to claim 47, wherein the stored program recording preset script log of the user is searched for in accordance with access input information inputted to the program recording preset cancel mode address.

50. The program information providing method according to claim 49, wherein a cancel electronic mail message attached with the retrieved program recording preset script generation log is generated.

51. The program information providing method according to claim 50, wherein the program recording preset cancel address linked with the stored program information to each log of the cancel electronic mail message attached with said program recording preset script generation log is attached.

52. The program information providing method according to claim 50, wherein the program recording preset cancel address is an address for canceling the recording preset for the program and visually displays information for identifying a user who cancels the program recording preset and information about the program of which recording preset is canceled.

53. The program information providing method according to claim 50, wherein the generated cancel electronic mail message is sent to said first terminal apparatus.

54. The program information providing method according to claim 51, wherein the stored program information is searched for in accordance with access input information inputted to the program recording preset cancel address.

55. The program information providing method according to claim 54, further comprising the step of:

generating a cancel script, which is a control command for invalidating the program recording preset script on the basis of the retrieved program information.

56. The program information providing method according to claim 55, wherein the generated program recording preset cancel script is sent to said second terminal apparatus.

57. A program recording preset system comprising a program information providing apparatus having first storage means for storing a plurality of items of program information, which is attribute information about a program and sending said plurality of items of program information stored in said first storing means, a first terminal apparatus for receiving the program information sent from said program information providing apparatus, and a second terminal apparatus for recording presetting of a program having the program information sent to said first terminal apparatus as the attribute information, said program information providing apparatus, said first terminal apparatus, and said second terminal apparatus being interconnected by a network, wherein said program information providing apparatus comprising:

electronic mail generating means for generating an electronic mail message attached with at least one item of program introducing information for introducing the program of said plurality of items of program information stored in said storage means;

address generating and attaching means for generating a program recording preset address to be linked with any one of said plurality of items of program information stored in said first storage means and attaching the generated program recording preset address to the program introducing electronic mail message generated by said electronic mail generating means for each item of the program introducing information;

first sending means for sending the program introducing electronic mail message attached with the program recording preset address by said address generating and attaching means to said first terminal apparatus;

searching means for searching said storage means for specified one of said plurality of items of program information in accordance with access input information inputted for accessing said address;

program recording preset script generating means for generating, on the basis of the retrieved program information, a program recording preset script, which is a control command for causing a recording apparatus to record the program to a recording medium; and second sending means for sending the program recording preset script generated by said program recording preset script generating means;

said first terminal apparatus comprising:

first receiving means for receiving the program introducing electronic mail message sent from said first sending means of said program information providing apparatus;

first display means for displaying the program introducing electronic mail message received by said first receiving means;

input means for inputting access input information for accessing the program recording preset address attached to the program introducing electronic mail message received by said first receiving means; and third sending means for sending the access input information inputted from said input means; and said second terminal apparatus comprising:

second receiving means for receiving the program recording preset script sent from said second sending means of said program information providing apparatus; and signal converting means for converting the program recording preset script received by said second receiving means into a program recording preset control signal.

58. The program recording preset system according to claim 57, wherein the program recording preset address generated by said address generating and attaching means is an address for recording presetting of the program and visually displays information for identifying a user who recording presets the program and information about the program which is preset for recording.

59. The program recording preset system according to claim 57, wherein said first terminal apparatus comprises control means for requesting to send the program information retrieved by said searching means of said program information providing apparatus.

60. The program recording preset system according to claim 59, wherein said program information providing apparatus further comprises fourth sending means for sending the program information retrieved by said searching means from said first storage means to said first terminal apparatus in response to the request therefrom.

61. The program recording preset system according to claim 60, wherein said first terminal apparatus further comprises second display means for displaying the program information received from said program information providing apparatus.

62. The program recording preset system according to claim 57, wherein said second terminal apparatus further comprises third receiving means for receiving the program.

63. The program recording preset system according to claim 62, wherein said second terminal apparatus comprises at least one recording means by which the program received by said third receiving means is recorded to a recording medium.

64. The program recording preset system according to claim 63, wherein said second terminal apparatus further comprises control means for drivingly controlling said at least one recording means so as to record the program received by said third receiving means onto said recording medium in accordance with the program recording preset control signal converted by said signal converting means.

65. The program recording preset system according to claim 57, wherein said program information providing apparatus further comprises second storage means for storing, for each user, a program recording preset script generation log generated by said program recording preset script generating means.

66. The program recording preset system according to claim 65, wherein, if at least one program recording preset script has already been generated by said program recording preset script generating means, said address generating and attaching means of said program information providing apparatus generates a recording means change mode address which links with the program recording preset script generation log of a corresponding user of the program recording preset script generation logs stored in said second storage means and attaches the generated recording means change mode address to the program introducing electronic mail message.

67. The program recording preset system according to claim 66, wherein the recording means change mode address generated by said address generating and attaching means is an address for shifting to a mode in which said recording means is changed to another and visually displays information for identifying a user who performs a recording apparatus change operation.

68. The program recording preset system according to claim 67, wherein said searching means of said program information providing apparatus searches said second storage means for the program recording preset script generation log of the corresponding user in accordance with access input information inputted to the recording means change mode address.

69. The program recording preset system according to claim 68, wherein said electronic mail generating means of said program information providing apparatus generates a recording means change program selecting electronic mail message attached with the program recording preset script generation log retrieved by said searching means.

70. The program recording preset system according to claim 69, wherein said address generating and attaching means of said program information providing apparatus attaches a recording means change program selecting address linked with the program information stored in said first storage means to each log of the recording apparatus change program selecting electronic mail message attached with the program recording preset script generation log.

71. The program recording preset system according to claim 70, wherein the recording apparatus change program selecting address generated by said addressing generating and attaching means is an address for selecting the program for which said recording means is changed to another and visually displays information for identifying a user who selects the program for which said recording means is changed to another and information about the program for which said recording apparatus is changed to another.

72. The program recording preset system according to claim 69, wherein said first sending means of said program information providing apparatus sends the recording means change program selecting electronic mail message generated by said electronic mail generating means to said first terminal apparatus.

73. The program recording preset system according to claim 70, wherein said program recording preset script generating means of said program information providing apparatus modifies, in accordance with access input information inputted to the recording means change program selecting address, the program recording preset script such that said recording means by which the program is to be recorded is changed to another.

74. The program recording preset system according to claim 65, wherein, if at least one program recording preset script has already been generated by said program recording preset script generating means, said address generating and attaching means of said program information providing apparatus generates a program recording preset cancel mode address which links with the program recording preset script generation log of a corresponding user of the program recording preset script generation logs stored in said second storage means and attaches the generated program recording preset cancel mode address to the program introducing electronic mail message.

75. The program recording preset system according to claim 74, wherein the program recording preset cancel mode address generated by said address generating and attaching means is an address for shifting to a mode in which the program recording preset of the program is canceled and visually displays information for identifying a user who cancels the recording preset of the program.

76. The program recording preset system according to claim 75, wherein said searching means of said program information providing apparatus searches said second storage means for the program recording preset script generation log of the user in accordance with access input information inputted to said program recording preset cancel mode address.

77. The program recording preset system according to claim 76, wherein said electronic mail generating means of said program information providing apparatus generates a cancel electronic mail message attached with the program recording preset script generation log retrieved by said searching means.

78. The program recording preset system according to claim 77, wherein said address generating and attaching means of said program information providing apparatus attaches the program recording preset cancel address linked with the program information stored in said first storage means to each log of the cancel electronic mail message attached with the program recording preset script generation log.

79. The program recording preset system according to claim 78, wherein the program recording preset cancel address generated by said address generating and attaching means is an address for canceling the program recording preset for the program and visually displays information for identifying a user who cancels the program recording preset and information about the program of which program recording preset is canceled.

80. The program recording preset system according to claim 77, wherein said first sending means of said program information providing apparatus sends the cancel electronic mail message generated by said electronic mail generating means to said first terminal apparatus.

81. The program recording preset system according to claim 79, wherein said searching means of said program information providing apparatus searches said first storage means for said program information in accordance with access input information inputted to the program recording preset cancel address.

82. The program recording preset system according to claim 81, further comprising program recording preset cancel script generating means for generating a program recording preset cancel script, which is a control command for invalidating the program recording preset script on the basis of the program information retrieved by said searching means.

83. The program recording preset system according to claim 82, wherein said second sending means of said program information providing apparatus sends the program recording preset cancel script generated by said program recording preset cancel script generating means to said second terminal apparatus.

84. The program recording preset system according to claim 83, wherein said second receiving means of said second terminal apparatus receives the program recording preset cancel script from the second sending means.

85. The program recording preset system according to claim 84, wherein said signal converting means of said second terminal apparatus converts the program recording preset cancel script received by said second receiving means into a program recording preset cancel control signal.

86. The program recording preset system according to claim 85, wherein said control means of said second terminal apparatus invalidates the program recording preset control signal in accordance with the program recording preset cancel control signal converted by said signal converting means.

87. The program recording preset system according to claim 84, wherein said second terminal apparatus further comprises script reception information sending means for sending, upon receiving one of the program recording preset script and the program recording preset cancel script by said second receiving means, script reception information thereof to said program information providing apparatus.

88. The program recording preset system according to claim 87, wherein said program providing apparatus further comprises script reception information receiving means for receiving the script reception information sent from said script reception information sending means of said second terminal apparatus.

89. The program recording preset system according to claim 88, wherein said electronic mail generating means of said program information providing apparatus generates a script reception result report electronic mail message indicative of the reception of one of the program recording preset script and the program recording preset cancel script by said second terminal apparatus upon reception of the script reception information by said script reception information receiving means.

90. The program recording preset system according to claim 89, wherein said first sending means of said program information providing apparatus sends the script reception result report electronic mail message generated by said electronic mail generating means to said first terminal apparatus.

91. The program recording preset system according to claim 90, wherein said first receiving means of said first terminal apparatus receives the script reception result report electronic mail message sent from said first sending means of said program information providing apparatus.

92. The program recording preset system according to claim 88, wherein said program information providing apparatus further comprises charging processing means for executing a charging process on the program recording preset of the program upon reception of the script reception information by said script reception information receiving means.

93. A program recording preset method for a program recording preset system comprising a program information providing apparatus storing a plurality of items of program information, which is attribute information about a program and sending said plurality of items of program information, a first terminal apparatus for receiving the program information sent from the program information providing apparatus, and a second terminal apparatus for recording presetting of the program having the program information sent to said first terminal apparatus as the attribute information, said program information providing apparatus, said first terminal apparatus, and said second terminal apparatus being interconnected by a network, wherein said program recording preset method in said program information providing apparatus comprising the steps of:
generating an electronic mail message attached with at least one item of program introducing information for introducing the program of the stored plurality of items of program information;
generating a program recording preset address to be linked with any one of the stored plurality of items of program information;
attaching the generated program recording preset address to the program introducing electronic mail message for each item of program introducing information to said program information providing apparatus; and
sending the program introducing electronic mail message attached with the program recording preset address to said first terminal apparatus at a predetermined time;
said program recording preset method in said first terminal apparatus comprising the steps of:
receiving the program introducing electronic mail message;
displaying the received program introducing electronic mail message;
inputting access input information for accessing the program recording preset address attached to the received program introducing electronic mail message; and
sending the inputted access input information to said program information providing apparatus;
said program recording preset method in said program information providing apparatus comprising the steps of:
searching for specified one of the stored plurality of items of program information in accordance with access input information inputted to the program recording preset address;
generating, on the basis of the retrieved program information, a program recording preset script, which is a control command for causing a recording apparatus to record the program to a recording medium; and
sending the generated program recording preset script to said second terminal apparatus; and
said program recording preset method in said second terminal apparatus comprising the steps of:
receiving the program recording preset script; and
converting the received program recording preset script into a program recording preset control signal.

94. The program recording preset method according to claim 93, wherein the generated program recording preset address is an address for recording presetting of the program and visually displays information for identifying a user who recording presets the program and information about the program which is preset for recording.

95. The program recording preset method according to claim 93, wherein said second terminal apparatus receives the program.

96. The program recording preset method according to claim 95, wherein said second terminal apparatus records the received program to said recording medium in accordance with the program recording preset control signal.

97. The program recording preset method according to claim 93, wherein said program information providing apparatus stores a program recording preset script generation log.

98. The program recording preset method according to claim 93, wherein said first terminal apparatus requests to send the retrieved program information.

99. The program recording preset method according to claim 98, wherein said program information providing apparatus sends the retrieved program information to said first terminal apparatus in response to the request therefrom.

100. The program recording preset method according to claim 99, wherein said first terminal apparatus displays the program information received from said program information providing apparatus.

101. The program recording preset method according to claim 97, wherein, if at least one program recording preset script has already been generated, said program information providing apparatus generates a recording means change mode address which links with the program recording preset script generation log of a corresponding user of the stored program recording preset script generation logs and attaches the generated recording means change mode address to the program introducing electronic mail message.

102. The program recording preset method according to claim 101, wherein the generated recording apparatus change mode address is an address for shifting to a mode in which said recording means is changed to another and visually displays information for identifying a user who performs a recording means change operation.

103. The program recording preset method according to claim 101, wherein said program information providing apparatus searches for the stored program recording preset script generation log of the corresponding user in accordance with access input information inputted to the recording means change mode address.

104. The program recording preset method according to claim 103, said program information providing apparatus generates a recording apparatus change program selecting electronic mail message attached with the retrieved program recording preset script generation log.

105. The program recording preset method according to claim 104, wherein said program information providing apparatus attaches a recording means change program selecting address linked with the stored program information to each log of the recording means change program selecting electronic mail message attached with the program recording preset script generation log.

106. The program recording preset method according to claim 105, wherein the generated recording means change program selecting address is an address for selecting the program for which said recording apparatus is changed to another and visually displays information for identifying a user who selects the program for which said recording apparatus is changed to another and information about the program for which said recording apparatus is changed to another.

107. The program recording preset method according to claim 104, wherein said program information providing apparatus sends the generated recording means change program selecting electronic mail message to said first terminal apparatus.

108. The program recording preset method according to claim 105, wherein said program information providing apparatus modifies, in accordance with access input information inputted to the recording means change program selecting address, the program recording preset script such that said recording apparatus by which the program is to be recorded is changed to another.

109. The program recording preset method according to claim 97, wherein, if at least one program recording preset script has already been generated, said program information providing apparatus generates a program recording preset cancel mode address which links with the program recording preset script generation log of a corresponding user of the stored program recording preset script generation logs and attaches the generated program recording preset cancel mode address to the program introducing electronic mail message.

110. The program recording preset method according to claim 109, wherein the generated program recording preset cancel mode address is an address for shifting to a mode in which the recording preset of the program is canceled and visually displays information for identifying a user who cancels the recording preset of the program.

111. The program recording preset method according to claim 109, wherein said program information providing apparatus searches for the stored program recording preset script log of the user in accordance with access input information inputted to the program recording preset cancel mode address.

112. The program recording preset method according to claim 111, wherein said program information providing apparatus generates a cancel electronic mail message attached with the retrieved program recording preset script generation log.

113. The program recording preset method according to claim 112, wherein said program information providing apparatus attaches the program recording preset cancel address linked with the stored program information to each log of the cancel electronic mail message attached with the program recording preset script generation log.

114. The program recording preset method according to claim 113, wherein said generated program recording preset cancel address is an address for canceling the recording preset for the program and visually displays information for identifying a user who cancels the program recording preset and information about the program of which recording preset is canceled.

115. The program recording preset method according to claim 112, wherein said program information providing apparatus sends the generated cancel electronic mail message to said first terminal apparatus.

116. The program recording preset method according to claim 113, wherein said program information providing apparatus searches for the stored program information in accordance with access input information inputted to the program recording preset cancel address.

117. The program recording preset method according to claim 116, said program information providing apparatus generates a cancel script, which is a control command for invalidating the program recording preset script on the basis of the retrieved program information.

118. The program recording preset method according to claim 117, wherein said program information providing apparatus sends the generated program recording preset cancel script to said second terminal apparatus.

119. The program recording preset method according to claim 118, wherein said second terminal apparatus receives the program recording preset cancel script.

120. The program recording preset method according to claim 119, wherein said second terminal apparatus converts the received program recording preset cancel script into a program recording preset cancel control signal.

121. The program recording preset method according to claim 120, wherein said second terminal apparatus invalidates the program recording preset control signal in accordance with the program recording preset cancel control signal.

122. The program recording preset method according to claim 119, wherein said second terminal apparatus sends, upon receiving one of the program recording preset script and the program recording preset cancel script, script reception information thereof to said program information providing apparatus.

123. The program recording preset method according to claim 122, wherein said program providing apparatus receives the script reception information from said second terminal apparatus.

124. The program recording preset method according to claim 123, wherein said program information providing apparatus generates an electronic mail message indicative of the reception of one of the program recording preset script and the program recording preset cancel script by said second terminal apparatus upon reception of the script reception information.

125. The program recording preset method according to claim 124, wherein said program information providing apparatus sends the generated electronic mail message to said first terminal apparatus.

126. The program recording preset method according to claim 125, wherein said first terminal apparatus receives the electronic mail message from the program information providing apparatus.

127. The program recording preset method according to claim 123, wherein said program information providing apparatus executes a charging process on the recording preset of the program upon reception of the script reception information.

128. A program recording system having a program information providing apparatus storing a plurality of items of program information, which is attribute information about a program and sending said plurality of items of program information, a first terminal apparatus for receiving the program information from said program information providing apparatus, a second terminal apparatus for recording presetting of the program having the program information sent to said first terminal apparatus as the attribute information, and a recording apparatus for recording the program to a recording medium in accordance with the program recording preset to said second terminal apparatus, said program information providing apparatus, said first terminal apparatus, said second terminal apparatus, and said recording apparatus being interconnected by a network, said program information providing apparatus comprising:

electronic mail generating means for generating an electronic mail message attached with at least one item of program introducing information for introducing the program of said plurality of items of program information stored in said storage means;

address generating and attaching means for generating a program recording preset address to be linked with any one of said plurality of times of program information stored in said storage means and attaching the generated program recording preset address to the program introducing electronic mail message generated by said electronic mail generating means for each item of the program introducing information;

first sending means for sending the program introducing electronic mail message attached with the program recording preset address by said address generating and attaching means to said first terminal apparatus;

searching means for searching said storage means for specified one of said plurality of items of program information in accordance with access input information inputted in order to make an access to the program recording preset address;

program recording preset script generating means for generating, on the basis of the retrieved program information, a program recording preset script, which is a control command for causing a recording apparatus to record said program to a recording medium; and second sending means for sending the program recording preset script generated by said program recording preset script generating means to said second terminal apparatus;

said first terminal apparatus comprising:

first receiving means for receiving an electronic mail message from said first sending means of said program information providing apparatus;

first display means for displaying the electronic mail message received by said first receiving means;

input means for inputting access input information for accessing the program recording preset address attached to the electronic mail message received by said first receiving means; and third sending means for sending the access input information inputted through said input means;

said second terminal apparatus comprising:

second receiving means for receiving the program recording preset script supplied from said second sending means of said program information providing apparatus;

signal converting means for converting the program recording preset script received by said second receiving means into a program recording preset control signal; and fourth sending means for sending the program recording preset control signal converted by said signal converting means; and said recording apparatus comprising:

third receiving means for receiving the program recording preset control signal sent from said fourth sending means of said second terminal apparatus;

fourth receiving means for receiving the program listed in the program chart;

recording means for recording the program received by said fourth receiving means to said recording medium;

and control means for drivingly controlling, in response to the program recording preset control signal received by said third receiving means, said recording means to record the program received by said fourth receiving means to said recording medium.

129. The program recording system according to claim 128, wherein the program recording preset address generated by said address generating and attaching means is an address for recording presetting of the program and visually displays information for identifying a user who recording presets the program and information about the program which is preset for recording.

130. The program recording system according to claim 128, wherein said program information providing apparatus comprises second storage means for storing, for each user, a program recording preset script generation log generated by said program recording preset script generating means.

131. The program recording system according to claim 128, wherein said first terminal apparatus comprises control means for requesting to send the program information retrieved by said searching means of said program information providing apparatus.

132. The program recording according to claim 131, wherein said program information providing apparatus comprises fifth sending means for sending the program information retrieved by said searching means from said first storage means to said first terminal apparatus in response to the request therefrom.

133. The program recording system according to claim 132, wherein said first terminal apparatus comprises second display means for displaying the program information received from said program information providing apparatus.

134. The program recording system according to claim 130, wherein, if at least one program recording preset script has already been generated by said program recording preset script generating means, said address generating and attaching means of said program information providing apparatus generates a recording apparatus change mode address which links with the program recording preset script generation log of a corresponding user of the program recording preset script generation logs stored in said second storage means and attaches the generated recording apparatus change mode address to the program introducing electronic mail message.

135. The program recording system according to claim 134, wherein the recording apparatus change mode address generated by said address generating and attaching means is an address for shifting to a mode in which said recording apparatus is changed to another and visually displays information for identifying a user who performs a recording apparatus change operation.

136. The program recording system according to claim 134, wherein said searching means of said program information providing apparatus searches said second storage means for the program recording preset script generation log of the corresponding user in accordance with access input information inputted to the recording apparatus change mode address.

137. The program recording system according to claim 136, wherein said electronic mail generating means of said program information providing apparatus generates a recording apparatus change program selecting electronic mail message attached with the program recording preset script generation log retrieved by said searching means.

138. The program recording system according to claim 137, wherein said address generating and attaching means of said program information providing apparatus attaches a recording apparatus change program selecting address linked with the program information stored in said first storage means to each log of the recording apparatus change program selecting electronic mail message attached with the program recording preset script generation log.

139. The program recording system according to claim 138, wherein the recording apparatus change program selecting address generated by said addressing generating and attaching means is an address for selecting the program for which said recording apparatus is changed to another and visually displays information for identifying a user who selects the program for which said recording apparatus is changed to another and information about the program for which said recording apparatus is changed to another.

140. The program recording system according to claim 138, wherein said program recording preset script generating means of said program information providing apparatus modifies, in accordance with access input information inputted to the recording apparatus change program selecting address, the program recording preset script such that said recording apparatus by which the program is to be recorded is changed to another.

141. The program recording system according to claim 130, wherein, if at least one program recording preset script has already been generated by said program recording preset script generating means, said address generating and attaching means of said program information providing apparatus generates a program recording preset cancel mode address which links with the program recording preset script generation log of a corresponding user of the program recording preset script generation logs stored in said second storage means and attaches the generated program recording preset cancel mode address to the program introducing electronic mail message.

142. The program recording system according to claim 141, wherein the program recording preset cancel mode address generated by said address generating and attaching means is an address for shifting to a mode in which the program recording preset of the program is canceled and visually displays information for identifying a user who cancels the program recording preset of the program.

143. The program recording system according to claim 141, wherein said searching means of said program information providing apparatus searches said second storage means for the program recording preset script log of the user in accordance with access input information inputted to the program recording preset cancel mode address.

144. The program recording system according to claim 143, wherein said electronic mail generating means of said program information providing apparatus generates a cancel electronic mail message attached with the program recording preset script generation log retrieved by said searching means.

145. The program recording system according to claim 128, wherein said address generating and attaching means of said program information providing apparatus attaches the program recording preset cancel address linked with the program information stored in said first storage means to each log of the cancel electronic mail message attached with the program recording preset script generation log.

146. The program recording system according to claim 145, wherein the program recording preset cancel address generated by said address generating and attaching means is an address for canceling the program recording preset for the program and visually displays information for identifying a user who cancels the program recording preset and information about the program of which program recording preset is canceled.

147. The program recording system according to claim 144, wherein said first sending means of said program information providing apparatus sends the cancel electronic mail message generated by said electronic mail generating means to said first terminal apparatus.

148. The program recording system according to claim 145, wherein said searching means of said program information providing apparatus searches said first storage means for the program information in accordance with access input information inputted to the program recording preset cancel address.

149. The program recording system according to claim 148, wherein said program information providing apparatus comprises program recording preset cancel script generating means for generating a cancel script, which is a control command for invalidating the program recording preset script on the basis of the program information retrieved by said searching means.

150. The program recording system according to claim 149, wherein said second sending means of said program information providing apparatus sends the program recording preset cancel script generated by said program recording preset cancel script generating means to said second terminal apparatus.

151. The program recording system according to claim 150, wherein said second receiving means of said second terminal apparatus receives the program recording preset cancel script from the second sending means.

152. The program recording system according to claim 151, wherein said signal converting means of said second terminal apparatus converts the program recording preset cancel script received by said second receiving means into a program recording preset cancel control signal.

153. The program recording system according to claim 152, wherein said third sending means of said second terminal apparatus sends the cancel control signal converted by said signal converting means to said recording apparatus.

154. The program recording system according to claim 153, wherein said third receiving means of said recording apparatus receives the cancel control signal from said fourth sending means.

155. The program recording system according to claim 154, wherein said control means of said recording apparatus invalidates the corresponding program recording preset control signal in response to the program recording preset cancel control signal received by said third receiving means.

156. The program recording system according to claim 154, wherein said second terminal apparatus comprises control signal reception information sending means for sending, upon reception of one of the program recording preset control signal and the program recording preset cancel control signal from said fourth sending means by said third receiving means of said recording apparatus, control signal reception information thereof to said program information providing apparatus.

157. The program recording system according to claim 156, wherein said program information providing apparatus comprises control signal reception information receiving means for receiving the control signal reception information from said control signal reception information sending means of said second terminal apparatus.

158. The program recording system according to claim 157, wherein said electronic mail generating means of said program information providing apparatus generates a control signal reception report electronic mail message indicative of the reception of one of the program recording preset control signal and the cancel control signal by said recording apparatus upon reception of the control signal reception information by said control signal reception information receiving means.

159. The program recording system according to claim 158, wherein said first sending means of said program information providing apparatus sends the control signal reception report electronic mail message generated by said electronic mail generating means to said first terminal apparatus.

160. The program recording system according to claim 159, wherein said first receiving means of said first terminal apparatus receives the control signal reception report electronic mail message from said first sending means of said program information providing apparatus.

161. The program recording system according to claim 157, wherein said program information providing apparatus comprises charging processing means for executing a charging process on the program recording preset of the program upon reception of the control signal reception information by said control signal reception information receiving means.

162. A program recording method for a program recording system having a program information providing apparatus storing a plurality of items of program information, which is attribute information about a program and sending said plurality of items of program information, a first terminal apparatus for receiving the program information from said program information providing apparatus, a second terminal apparatus for recording presetting of the program having the program information sent to said first terminal apparatus as the attribute information, and a recording apparatus for recording the program to a recording medium in accordance with the program recording preset to said second terminal apparatus, said program information providing apparatus, said first terminal apparatus, said second terminal apparatus, and said recording apparatus being interconnected by a network, said program recording method in said program information providing apparatus comprising the steps of:

generating a program introducing electronic mail message attached with at least one item of program introducing information for introducing the program of the stored plurality of items of program information;

generating a program recording preset address to be linked with any one of the stored plurality of items of program information;

attaching the generated program recording preset address to the program introducing electronic mail message for each item of the program introducing information; and sending the program introducing electronic mail message attached with the program recording preset address to said first terminal apparatus at the predetermined time;

said program recording method in said first terminal apparatus comprising the steps of:

receiving the program introducing electronic mail message from said program information providing apparatus;

displaying the received program introducing electronic mail message;

inputting access input information for accessing the program recording preset address attached to the received program introducing electronic mail message; and sending the access input information to said program information providing apparatus;

said program recording method in said program information providing apparatus comprising the steps of:

searching for specified one of the stored plurality of items of program information in accordance with access input information inputted to the program recording preset address;

generating, on the basis of the retrieved program information, a program recording preset script, which is a control command for recording the program to a recording medium; and sending the program recording preset script to said second terminal apparatus;

said program recording method in said second terminal apparatus comprising the steps of:

receiving the program recording preset script; and converting the received program recording preset script into a program recording preset control signal; and sending the program recording preset control signal to said recording apparatus;

said program recording method in said recording apparatus comprising the steps of:

receiving the program recording preset control signal;

receiving the program; and recording the received program to a recording medium in accordance with the program recording preset control signal.

163. The program recording method according to claim 162, wherein the program recording preset address is an address for recording presetting of the program and visually displays information for identifying a user who recording presets the program and information about the program which is preset for recording.

164. The program recording method according to claim 162, wherein said program information providing apparatus stores, for each user, a generated program recording preset script generation log.

165. The program recording method according to claim 162, wherein said first terminal apparatus requests to send the retrieved program information.

166. The program recording method according to claim 165, wherein said program information providing apparatus sends the retrieved program information to said first terminal apparatus in response to the request therefrom.

167. The program recording method according to claim 166, wherein said first terminal apparatus displays the program information received from said program information providing apparatus.

168. The program recording method according to claim 164, wherein, if at least one program recording preset script has already been generated by said program recording preset script generating means, said program information providing apparatus generates a recording apparatus change mode address which links with the program recording preset script generation log of a corresponding user of the stored program recording preset script generation logs and attaches the generated recording apparatus change mode address to the program introducing electronic mail message.

169. The program recording method according to claim 168, wherein the recording apparatus change mode address is an address for shifting to a mode in which said recording apparatus is changed to another and visually displays information for identifying a user who performs a recording apparatus change operation and the information about the program which is preset for recording.

170. The program recording method according to claim 168, wherein said program information providing apparatus searches for the stored program recording preset script generation log of the corresponding user in accordance with access input information inputted to the recording apparatus change mode address.

171. The program recording method according to claim 170, wherein said program information providing apparatus generates a recording apparatus change program selecting electronic mail message attached with the retrieved program recording preset script generation log.

172. The program recording method according to claim 171, wherein said program information providing apparatus attaches a recording apparatus change program selecting address linked with the stored program information to each log of the recording apparatus change program selecting electronic mail message attached with the program recording preset script generation log.

173. The program recording method according to claim 172, wherein the recording apparatus change program selecting address is an address for selecting the program for which said recording apparatus is changed to another and visually displays information for identifying a user who selects the program for which said recording apparatus is changed to another and information about the program for which said recording apparatus is changed to another.

174. The program recording method according to claim 171, wherein said program information providing apparatus sends the recording apparatus change program selecting electronic mail message generated by said electronic mail generating means to the first terminal apparatus.

175. The program recording method according to claim 172, wherein said program information providing apparatus modifies, in accordance with access input information inputted to the recording apparatus change program selecting address, the program recording preset script such that said recording apparatus by which the program is to be recorded is changed to another.

176. The program recording method according to claim 164, wherein, if at least one program recording preset script has already been generated, said program information providing apparatus generates a program recording preset cancel mode address which links with the program recording preset script generation log of a corresponding user of the stored program recording preset script generation logs and attaches the generated program recording preset cancel mode address to the program introducing electronic mail message.

177. The program recording method according to claim 176, wherein the program recording preset cancel mode address is an address for shifting to a mode in which the program recording preset of the program is canceled and visually displays information for identifying a user who cancels the program recording preset of the program.

178. The program recording method according to claim 176, wherein said program information providing apparatus searches for the stored program recording preset script log of the user in accordance with access input information inputted to the program recording preset cancel mode address.

179. The program recording method according to claim 178, wherein said program information providing apparatus generates a cancel electronic mail message attached with the retrieved program recording preset script generation log.

180. The program recording method according to claim 162, wherein said program information providing apparatus attaches the program recording preset cancel address linked with the stored program information to each log of the cancel electronic mail message attached with the program recording preset script generation log.

181. The program recording method according to claim 180, wherein the program recording preset cancel address is an address for canceling the program recording preset for the program and visually displays information for identifying a user who cancels the program recording preset and information about the program of which program recording preset is canceled.

182. The program recording method according to claim 179, wherein said program information providing apparatus sends the cancel electronic mail message to said first terminal apparatus.

183. The program recording method according to claim 180, wherein said program information providing apparatus searches for the stored program information in accordance with access input information inputted to the program recording preset cancel address.

184. The program recording method according to claim 183, wherein said program information providing apparatus generates a cancel script, which is a control command for invalidating the program recording preset script on the basis of the retrieved program information.

185. The program recording method according to claim 184, wherein said program information providing apparatus sends the program recording preset cancel script to said second terminal apparatus.

186. The program recording method according to claim 185, wherein said second terminal apparatus receives the program recording preset cancel script.

187. The program recording method according to claim 186, wherein said second terminal apparatus converts the received program recording preset cancel script into a program recording preset cancel control signal.

188. The program recording method according to claim 187, wherein said second terminal apparatus sends the cancel control signal to said recording apparatus.

189. The program recording method according to claim 188, wherein said recording apparatus receives the cancel control signal.

190. The program recording method according to claim 189, wherein said recording apparatus invalidates the corresponding program recording preset control signal in response to the received program recording preset cancel control signal.

191. The program recording method according to claim 189, wherein said second terminal apparatus sends, upon reception of one of the program recording preset control signal and the program recording preset cancel control signal by said recording apparatus, control signal reception information thereof to said program information providing apparatus.

192. The program recording method according to claim 191, wherein said program providing apparatus receives the control signal reception information from said second terminal apparatus.

193. The program recording method according to claim 192, wherein said program information providing apparatus generates a control signal reception report electronic mail message indicative of the reception of one of the program recording preset control signal and the cancel control signal by said recording apparatus upon reception of the control signal reception information.

194. The program recording method according to claim 193, wherein said program information providing apparatus sends the control signal reception report electronic mail message to said first terminal apparatus.

195. The program recording method according to claim 194, wherein said first terminal apparatus receives the control signal-reception report electronic mail message from said program information providing apparatus.

196. The program recording method according to claim 192, wherein said program information providing apparatus executes a charging process on the program recording preset of the program upon reception of the control signal reception information.

* * * * *